US012715004B2

(12) United States Patent
Miller et al.

(10) Patent No.: US 12,715,004 B2
(45) Date of Patent: Aug. 25, 2026

(54) METHOD AND APPARATUS FOR REMOVING CONTAMINANTS FROM A FLUID STREAM

(71) Applicant: MAGE LLC, North Canton, OH (US)

(72) Inventors: Robert E. Miller, North Canton, OH (US); Scott E. Miller, North Canton, OH (US); Franklin N. Koontz, Hampstead, MD (US)

(73) Assignee: Mage LLC, North Canton, OH (US)

( * ) Notice: Subject to any disclaimer, the term of this patent is extended or adjusted under 35 U.S.C. 154(b) by 1229 days.

(21) Appl. No.: 17/671,836

(22) Filed: Feb. 15, 2022

(65) Prior Publication Data

US 2023/0182145 A1 Jun. 15, 2023

Related U.S. Application Data

(60) Provisional application No. 63/288,010, filed on Dec. 10, 2021.

(51) Int. Cl.
*B02C 19/18* (2006.01)
*B01D 43/00* (2006.01)
(Continued)

(52) U.S. Cl.
CPC .............. *B02C 19/18* (2013.01); *B01D 43/00* (2013.01); *B02C 23/36* (2013.01); *C02F 1/36* (2013.01);
(Continued)

(58) Field of Classification Search
CPC ......... B02C 19/18; B02C 23/36; B01D 43/00; C02F 1/36; C02F 2101/163;
(Continued)

(56) References Cited

U.S. PATENT DOCUMENTS 2,738,172 A 3/1956 Spiess, Jr. et al.
4,000,001 A * 12/1976 Toth ........................ C13B 20/02 127/11

(Continued)

FOREIGN PATENT DOCUMENTS

CN 112390324 A 2/2021
GB 2500664 A 10/2013

(Continued)

OTHER PUBLICATIONS

English language machine translation of WO2008018323, 9 pages, accessed on Sep. 14, 2023.

(Continued)

*Primary Examiner* — Regina M Yoo
(74) *Attorney, Agent, or Firm* — Sand, Sebolt & Wernow Co., LPA

(57) ABSTRACT

A solids dissociation apparatus that is used to remove various types of contaminants from a continuous fluid stream. The solids dissociation apparatus includes a housing. The solids dissociation apparatus also includes at least one insert that is operably engaged with the housing where the at least one insert is adapted to receive a continuous fluid stream. The solids dissociation apparatus also includes a transducer that is operably engaged with the housing and disposed about the at least one insert at a distance away from the at least one insert inside of the housing. The transducer is configured to create cavitation inside of the housing, via sonic waves, to eviscerate contaminants in the continuous fluid stream flowing through the at least one insert.

20 Claims, 18 Drawing Sheets

(51) Int. Cl.
*B02C 23/36* (2006.01)
*C02F 1/36* (2023.01)
*C02F 101/16* (2006.01)
*C02F 103/00* (2006.01)
*C02F 103/08* (2006.01)

(52) U.S. Cl.
CPC .. *C02F 2101/163* (2013.01); *C02F 2103/007* (2013.01); *C02F 2103/08* (2013.01); *C02F 2201/002* (2013.01); *C02F 2301/024* (2013.01); *C02F 2301/08* (2013.01); *C02F 2303/04* (2013.01)

(58) Field of Classification Search
CPC ............ C02F 2103/007; C02F 2103/08; C02F 2201/002; C02F 2301/024; C02F 2301/08; C02F 2303/04; C02F 2101/10; C02F 2101/32; C02F 2209/006
See application file for complete search history.

(56) References Cited

U.S. PATENT DOCUMENTS 4,365,518 A * 12/1982 Zacharias, Jr. ........... G01F 1/66 73/861.31
4,369,100 A * 1/1983 Sawyer ..................... C22B 3/02 204/157.42
5,395,592 A 3/1995 Bolleman et al.
5,611,993 A 3/1997 Babaev
5,951,456 A 9/1999 Scott
6,083,387 A 7/2000 LeBlanc et al.
6,290,778 B1 9/2001 Zugibe
6,547,935 B2 4/2003 Scott
6,878,288 B2 4/2005 Scott
7,022,505 B2 4/2006 Chandler et al.
7,083,764 B2 8/2006 Scott
7,504,075 B2 * 3/2009 Marhasin ................ B02C 19/18 310/322
2002/0164274 A1 11/2002 Haggett et al.
2003/0075512 A1 * 4/2003 Scott ......................... C02F 1/36 422/186
2005/0077227 A1 * 4/2005 Kirker ....................... C02F 1/44 210/321.89
2007/0006892 A1 1/2007 Olesen et al.
2008/0105625 A1 * 5/2008 Rosenberg ................ B08B 3/12 210/748.11
2011/0123392 A1 5/2011 Dionne et al.
2012/0205301 A1 * 8/2012 McGuire ................... C02F 1/36 210/151
2012/0325727 A1 12/2012 Dionne et al.
2013/0026108 A1 * 1/2013 Yager .................. C02F 1/46114 210/748.04
2014/0290957 A1 * 10/2014 McGuire ................... C02F 9/00 210/243
2014/0299529 A1 10/2014 Govind et al.
2015/0139853 A1 * 5/2015 Zolezzi-Garreton ........................ C02F 1/4608 422/186.23
2017/0217794 A1 8/2017 Lipkens et al.
2017/0298316 A1 10/2017 Kennedy, III et al.
2018/0163321 A1 6/2018 Nottke et al.
2018/0353876 A1 12/2018 Chen et al.
2019/0284073 A1 9/2019 Yost et al.
2020/0399147 A1 * 12/2020 Yost ...................... C02F 1/4672

FOREIGN PATENT DOCUMENTS

WO WO-03101609 A1 * 12/2003 .............. B01F 31/86
WO 2008018323 A1 2/2008
WO WO-2017203451 A2 * 11/2017 ............... B08B 3/12

OTHER PUBLICATIONS

English language machine translation of CN112390324, 6 pages, accessed on Sep. 14, 2023.
International Searching Authority, International Search Report for International Application No. PCT/US22/52248, mailed on Jun. 15, 2023.

* cited by examiner 132
70,74A
96
98
1
76
76
130
12
77
77
74C
74E
86,86B
75
90,90B
74D
82B
100
90,90B
88,88B
93,93B
93,93A
94,94A
94,94B
140
142
142
72,
72B
92,92B
92,92A
90,90A
86,86A
100
82A
90,90A
72,
72A
88,88A 110
112
78,78B
78,78A
80,80B
80,80A
114
74B
116
119
26,26A
52,52A
118
20A
20
10
60
52,52B
26,26B
62
66
42
64
67
40
20C
24,24A
50,50A
22
US
20B
24,24B
50,50B 132
70,74A
130
1
LS,LS4
LS4
98
82,82B,85B
74C
115A
74E
90,90B
115B
86,86B
115
115A
90,90B
12
100
S2
S2
72,
72B
82,82B,85B
88,88B
74D
LS,LS3
140
94,94A
94,94B
142
142
LS,LS3
82,82A,85A
115A
115B
86,86A
115
115A
90,90A
100
S1
S1
72,
72A
82,82A,85A
88,88A
74D
110
75
112

METHOD AND APPARATUS FOR REMOVING CONTAMINANTS FROM A FLUID STREAM

CROSS REFERENCE TO RELATED APPLICATIONS

This application claims the benefit of U.S. Provisional Application Ser. No. 63/288,010, filed on Dec. 10, 2021; the disclosure of which is incorporated herein by reference.

TECHNICAL FIELD

This disclosure is directed to system for treating a continuous flow of fluid-based medium. More particularly, this disclosure is directed to a system applying sonic energy to a continuous flow of fluid-based medium for treating said continuous flow of fluid-based medium. Specifically, this disclosure is directed to a system using sonic energy for dissociating complex substances in a continuous flow of fluid-based medium and separating the dissociated complex substances from continuous flow of fluid-based medium.

BACKGROUND

Fluid and fluid streams provided from various sources may include contaminants or solids that are entrained, suspended, or dissolved in these fluid and fluid streams. The removal of these contaminates or solids are frequently of considerable interest since the streams containing these solids may otherwise be useable once cleaned. For example, in the case of fluids, cleaning may render the fluids useful for process applications, human consumption or the like.

Generally, treatment and purification of fluid streams including contaminants or solids therein requires a vast amount of systems and assemblies to make such streams usable. In one example, treatment and purification of waste water streams from water sources (e.g., rivers, lakes, oceans, etc.) requires the act of removing and/or neutralizing vast amounts of microorganisms and various types of chemical compounds found in these waste water streams. Current practices and methods generally treat these waste water stream issues by applying or using chemical additives to disintegrate or neutralize specific contaminants or solids found in these waste water streams. Even though these systems are in place, the continuous application of chemical additives to these waste water streams is costly, time consuming, and marginally effective given the state of the waste water streams.

Moreover, separation or removal of these contaminants or solids provided in these fluid streams is another issue in various parts of the world. For example, the separation of salt from seawater or separation of dissolved, suspended, and entrained solids (such as microorganisms and chemical compounds) in waste water streams requires vast systems to produce useable and clean fluids like clean drinking water for human consumption. In these fields, current separation processes to produce freshwater are mainly thermal based or micro-filtration systems based on multiple stages using numerous amounts of standard and membrane filters, particularly reverse osmosis desalination for removal of salt from seawater. Even though these systems are in place, the continuous application of thermal and use of standard and membrane filters to clean fluid streams is also costly, time consuming, and marginally effective given the state of the waste water streams.

SUMMARY

In one aspect, an exemplary embodiment of the present disclosure may provide a solids dissociation apparatus. The solids dissociation apparatus may comprise a housing; at least one insert operably engaged with the housing, wherein the at least one insert is adapted to receive a continuous fluid stream; and a transducer operably engaged with the housing and disposed about the at least one insert at a distance away from said at least one insert inside of the housing, wherein the transducer is configured to create cavitation inside of the housing, via sonic waves, to eviscerate contaminants in the continuous fluid stream flowing through the at least one insert.

This exemplary embodiment or another exemplary embodiment may further provide that the distance measured between the at least one insert and the transducer is about at least one-half wavelength of a frequency of the sonic waves transmitted by said transducer. This exemplary embodiment or another exemplary embodiment may further provide a pressurized chamber defined by the housing, wherein the pressurized chamber is configured to hold a continuous sonic optimization fluid to allow the transducer to generate cavitation in the continuous sonic optimization fluid stream. This exemplary embodiment or another exemplary embodiment may further provide at least one fluid passage defined by the at least one insert, wherein the at least one fluid passage is adapted to eviscerating contaminants in the continuous fluid stream inside of the at least one insert isolated from the pressurized chamber and remote from the transducer. This exemplary embodiment or another exemplary embodiment may further provide that the transducer further comprises a first end; an opposing second end; and a passageway defined therebetween, wherein the passageway is adapted to house a portion of the at least one insert inside of the passageway, and wherein the at least one insert is free from contacting the transducer. This exemplary embodiment or another exemplary embodiment may further provide a first longitudinal axis defined by the at least one insert; and a second longitudinal axis defined by the transducer; wherein the at least one insert and the transducer are coaxial with one another. This exemplary embodiment or another exemplary embodiment may further provide at least one inlet connection operably engaged with the housing and the at least one insert, wherein the at least one inlet connection is adapted to allow the continuous fluid stream with contaminants to flow into the at least one insert; and at least one outlet connection operably engaged with the housing and the at least one insert, wherein the at least one outlet connection is adapted to allow a continuous fluid stream with eviscerated contaminants to flow out from the at least one insert to at least one output device. This exemplary embodiment or another exemplary embodiment may further provide a second inlet connection operably engaged with the housing, wherein the second inlet connection is adapted to allow a continuous sonic optimization fluid to flow into the pressurized chamber; and a second outlet connection operably engaged with the housing for allowing, wherein the second outlet connection is adapted to allow the continuous sonic optimization fluid stream to flow out from the pressurized chamber. This exemplary embodiment or another exemplary embodiment may further provide that the at least one insert is made of a flexible material to allow the sonic waves generated by the transducer to transfer into the at least one insert to create cavitation inside of the at least one insert. This exemplary embodiment or another exemplary embodiment may further provide at least one director operably engaged with the at least one insert; wherein the director is configured to direct the continuous fluid stream with contaminants in a non-laminar flow inside of the at least one insert. This exemplary embodiment or another exemplary embodiment may further provide a first director operably engaged with a first wall of the at least one insert; and a second director operably engaged with an opposing second wall of the at least one insert; wherein the first director and the second director is configured to direct the continuous fluid stream with contaminants in a laminar flow inside of the at least one insert. This exemplary embodiment or another exemplary embodiment may further provide a third outlet connection operably engaged with the housing and the at least one insert, wherein the third outlet connection is adapted to allow a continuous fluid stream with eviscerated contaminants to flow out from the at least one insert to a second output device. This exemplary embodiment or another exemplary embodiment may further provide that the at least one insert further comprises an outer wall extending between a first wall and an opposing second wall of the at least one insert; and an inner wall extending between the first wall and the second wall of the at least one insert; wherein the at least one fluid passage is defined between the outer wall and the inner wall; and wherein the at least one fluid passage is adapted to isolate cavitation of the continuous fluid stream with contaminants inside of the at least one insert remote from the transducer. This exemplary embodiment or another exemplary embodiment may further provide a second fluid passage defined by the inner wall of the at least one insert, wherein the second fluid passage is adapted to isolate cavitation of a second continuous fluid stream inside of the inner wall remote from the transducer and remote from the at least one fluid passage. This exemplary embodiment or another exemplary embodiment may further provide that the second continuous fluid stream contains one of contaminants and eviscerated containments. This exemplary embodiment or another exemplary embodiment may further provide a first flow director operably engaged with the at least one insert inside of the at least one fluid passage; and a second flow director operably engaged with the at least one insert inside of the second fluid passage; wherein the first flow director and the second flow director are configured to direct the continuous fluid stream and the second continuous fluid stream with contaminants in a non-laminar flow inside of the at least one insert. This exemplary embodiment or another exemplary embodiment may further provide that the frequency of the sonic waves generated by the transducer is between about 3 kHz up to about 200 kHz.

In another aspect, an exemplary embodiment of the present disclosure may provide a method of eviscerating contaminants in a continuous fluid stream. The method further comprises steps of pumping at least one continuous fluid stream into a solids dissociation apparatus, wherein the at least one continuous fluid stream includes contaminants; guiding the at least one continuous fluid stream, via at least one inlet connection, into at least one insert of the solids dissociation apparatus; transmitting sonic waves, via a transducer of the solids dissociation apparatus, inside of a housing of the solids dissociation apparatus, wherein the transducer is positioned at a distance away from the at least one insert; cavitating a continuous sonic stream inside of the housing; cavitating the at least one continuous fluid stream inside of the at least one insert, wherein the at least one continuous fluid stream is isolated from the continuous sonic stream; and eviscerating the contaminants in the at least one continuous fluid stream.

This exemplary embodiment or another exemplary embodiment may further provide a step of directing the at least one continuous fluid stream with eviscerated contaminants, via at least one outlet connection of the solids dissociation apparatus, to at least one output device. This exemplary embodiment or another exemplary embodiment may further provide a step of directing the at least one continuous fluid stream with eviscerated contaminants, via a second outlet connection of the solids dissociation apparatus, to a second output device. This exemplary embodiment or another exemplary embodiment may further provide steps of pumping a second continuous fluid stream into the fluid treatment apparatus, wherein the second continuous fluid stream includes one of contaminants and eviscerated contaminants; guiding the second continuous fluid stream, via a second inlet connection of the solids dissociation apparatus, into a second insert of the fluid treatment apparatus; cavitating the second continuous fluid stream inside of the at least one insert, wherein the at least one continuous fluid stream is isolated from the continuous sonic stream; eviscerating one of the contaminants and the eviscerated contaminants in the second continuous fluid stream; and directing the second fluid stream with eviscerated contaminants, via a second outlet connection of the solids dissociation apparatus, to a second output device. This exemplary embodiment or another exemplary embodiment may further provide a step of directing the at least one continuous fluid stream, via at least one director, in one of a non-laminar flow and a laminar flow.

In another aspect, an exemplary embodiment of the present disclosure may provide a solids separation apparatus. The solids separation apparatus may comprise a tower; a transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids removal stage of the tower, wherein the at least one set of ports is positioned at anti-nodes of the standing sonic wave to recover solids concentrate from a fluid stream flowing through the tower; wherein the transducer and the reflector are linearly moveable relative to the tower to linearly move the standing sonic wave.

This exemplary embodiment or another exemplary embodiment may further provide that the transducer and the reflector are independently moveable relative to one another along a longitudinal axis defined between the first end and the second end of the tower. This exemplary embodiment or another exemplary embodiment may further provide that each port of the at least one set of ports defines a V-shaped configuration. This exemplary embodiment or another exemplary embodiment may further provide at least one set of shutters operably engaged with the interior wall of the tower, wherein each shutter of the at least one set of shutters is moveable relative to the tower to control the flow rate of the fluid stream in the tower. This exemplary embodiment or another exemplary embodiment may further provide that the tower further comprises an effluent outlet defined by the tower, wherein the effluent outlet is in fluid communication with each port of the at least one set of ports, and wherein the effluent outlet is configured to direct recovered solids concentrate from the fluid stream to at least one effluent output. This exemplary embodiment or another exemplary embodiment may further provide at least one set of passageways defined in the interior wall, wherein each passageway of the at least one set of passageways provides fluid communication between a port of the at least one set of ports and the effluent outlet, and wherein each passage of the at least one set of passages is configured to accept solids concentrate with a first configuration. This exemplary embodiment or another exemplary embodiment may further provide that each shutter of the at least one set of shutters is independently moveable relative to one another. This exemplary embodiment or another exemplary embodiment may further provide that the at least one set of shutters is one of longitudinally moveable, laterally moveable, radially moveable, and circumferentially moveable relative to the tower. This exemplary embodiment or another exemplary embodiment may further provide a diaphragm operably engaged with the tower between the first end and the second end of the tower; wherein the diaphragm is configured to transmit the standing sonic wave through the tower between the transducer and the reflector. This exemplary embodiment or another exemplary embodiment may further provide that the diaphragm is independently moveable relative to the tower along a longitudinal axis defined between the first end and the second end of the tower. This exemplary embodiment or another exemplary embodiment may further provide at least one transfer connection operably engaged with the tower; wherein the at least one transfer connection provides fluid communication for the fluid stream between the at least one solids removal stage of the tower and a second solids removal stage of the tower. This exemplary embodiment or another exemplary embodiment may further provide a second set of ports defined in an interior wall of the second solids removal stage of the tower, wherein the second set of ports is positioned at anti-nodes of the standing sonic wave to recover solids concentrate with a second configuration from the fluid stream flowing through the tower. This exemplary embodiment or another exemplary embodiment may further provide that each port of the second set of ports defines a V-shaped configuration. This exemplary embodiment or another exemplary embodiment may further provide a second set of shutters operably engaged with the interior wall of the tower; wherein each shutter of the second set of shutters is moveable relative to the tower to control the flow rate of the fluid stream in the tower. This exemplary embodiment or another exemplary embodiment may further provide that each shutter of the second set of shutters is independently moveable relative to one another. This exemplary embodiment or another exemplary embodiment may further provide that the second set of shutters is one of longitudinally moveable, laterally moveable, radially moveable, and circumferentially moveable relative to the tower. This exemplary embodiment or another exemplary embodiment may further provide that a second effluent outlet defined by the tower, wherein the second effluent outlet is in fluid communication with each port of the second set of ports, and wherein the second effluent outlet is configured to direct recovered solids concentrate from the fluid stream to a second effluent output. This exemplary embodiment or another exemplary embodiment may further provide a second set of passageways defined in the interior wall, wherein each passageway of the second set of passageways provides fluid communication between a port of the second set of ports and the second effluent outlet, and wherein each passageway of the second set of passageways is configured to accept solids concentrate with a second configuration smaller than the solids concentrate with a first configuration.

In another aspect, an exemplary embodiment of the present disclosure may provide a method of removing solid concentrates from a fluid stream. The method may comprise the steps of pumping the fluid stream into a tower of a solids separation apparatus, wherein the fluid stream includes solid concentrates of at least one configuration; transmitting a standing sonic wave, via a transducer of the solids separation apparatus, inside of the tower; reflecting the standing sonic wave, via a reflector of the solids separation apparatus, back to the transducer; adjusting one or both of the transducer and the reflector until the anti-nodes of the standing sonic wave are aligned with at least one set of ports defined in the tower; forcing the solid concentrates of the at least one configuration in the fluid stream, via the standing sonic wave, into the at least one set of ports of at least one solids removal stage of the tower; and removing the solid concentrates of the at least one configuration from the fluid stream into the at least one set of ports.

This exemplary embodiment or another exemplary embodiment may further provide a step of directing the solid concentrates of the at least one configuration, via an effluent outlet, from the tower to at least one effluent output. This exemplary embodiment or another exemplary embodiment may further provide a step of transferring the standing sonic wave, via a diaphragm, from the at least one solids removal stage to a second solids removal stage of the tower. This exemplary embodiment or another exemplary embodiment may further provide a step of directing the fluid stream, via at least one transfer connection, from the at least one solids removal stage of the tower to at least one additional solids removal stage of the tower. This exemplary embodiment or another exemplary embodiment may further provide a step of moving at least one set of shutters along an interior wall of the tower to control the flow rate of the fluid stream in the tower. This exemplary embodiment or another exemplary embodiment may further provide steps of forcing solid concentrates of a second configuration in the fluid stream, via the standing sonic wave, into a second set of ports of the second stage of the tower, wherein the solid concentrates of a second configuration are smaller than the solid concentrates of the at least one configuration; and removing the solid concentrates of the second configuration from the fluid stream into second set of ports. This exemplary embodiment or another exemplary embodiment may further provide a step of directing the solid concentrates of the second configuration, via a second effluent outlet, from the tower to a second effluent output.

In another aspect, an exemplary embodiment of the present disclosure may provide a fluid cleaning system. The fluid cleaning system may comprise at least one solids dissociation apparatus adapted to receive a continuous fluid stream from a fluid source; wherein the at least one solids dissociation apparatus further comprises: a housing; at least one insert operably engaged with the housing, wherein the at least one insert is adapted to receive the continuous fluid stream; a transducer operably engaged with the housing and disposed about the at least one insert at a distance away from the said at least one insert inside of the housing, wherein the transducer is configured to create cavitation inside of the housing, via sonic waves, to eviscerate contaminants in the continuous fluid stream flowing through the at least one insert; and at least one solids separation apparatus operably connected with the at least one fluid treatment apparatus for receiving the eviscerated contaminants provided in the fluid stream, wherein the at least one solids separation apparatus is adapted to separate the eviscerate contaminants from the fluid stream for at least one separation process.

This exemplary embodiment or another exemplary embodiment may further provide that a portion of the solids separation apparatus is provided inside of the at least one solids dissociation apparatus. This exemplary embodiment or another exemplary embodiment may further provide that the distance measured between the at least one insert and the transducer, wherein the distance is about at least one-half wavelength of a frequency of the sonic waves generated by said transducer. This exemplary embodiment or another exemplary embodiment may further provide that the at least one solids dissociation apparatus further comprises a pressurized chamber defined by the housing, wherein the pressurized chamber is configured to hold a continuous sonic optimization fluid to allow the transducer to generate cavitation in the continuous sonic optimization fluid. This exemplary embodiment or another exemplary embodiment may further provide that the at least one solids dissociation apparatus further comprises at least one fluid passage defined by the at least one insert, wherein the at least one fluid passage is adapted to isolated the continuous fluid stream inside of the at least one insert from the pressurized chamber and remote from the transducer to allow for cavitation inside of the at least one fluid passage via the traveling sonic wave. This exemplary embodiment or another exemplary embodiment may further provide that the at least one solids dissociation apparatus further comprises at least one inlet connection operably engaged with the housing and the at least one insert, wherein the at least one inlet connection is adapted to allow the continuous fluid stream with contaminants to flow into the at least one insert; and at least outlet connection operably engaged with the housing and the at least one insert, wherein the at least one outlet connection is adapted to allow a continuous fluid stream with eviscerated contaminants to flow out from the at least one insert to at least one output device. This exemplary embodiment or another exemplary embodiment may further provide that the at least one solids dissociation apparatus further comprises a second inlet connection operably engaged with the housing, wherein the second inlet connection is adapted to allow a continuous sonic optimization fluid to flow into the pressurized chamber; and a second outlet connection operably engaged with the housing for allowing, wherein the second outlet connection is adapted to allow the continuous sonic optimization fluid to flow out from the pressurized chamber. This exemplary embodiment or another exemplary embodiment may further provide that the at least one insert is made of a rigid or flexible material to allow the sonic waves generated by the transducer to transfer into the at least one insert to create cavitation inside of the at least one insert. This exemplary embodiment or another exemplary embodiment may further provide that the at least one solids dissociation apparatus further comprises at least one director operably engaged with at least one insert; wherein the director is configured to direct the continuous fluid stream with contaminants in a non-laminar flow inside of the at least one insert. This exemplary embodiment or another exemplary embodiment may further provide that the at least one solids separation apparatus further comprises a tower; a second transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids separation stage of the tower, wherein the at least one set of ports is positioned at anti-nodes of the standing sonic wave to recover solids concentrate from a fluid stream flowing through the tower; wherein the transducer and the reflector are linearly moveable relative to the tower to linearly move the standing sonic wave. This exemplary embodiment or another exemplary embodiment may further provide that the at least one solids separation apparatus further comprises at least one set of shutters operably engaged with the interior wall of the tower inside of the effluent outlet; wherein each shutter of the at least one set of shutters is moveable relative to the tower to control the flow rate of the fluid stream in the tower. This exemplary embodiment or another exemplary embodiment may further provide that the at least one solids separation apparatus further comprises an effluent outlet defined by the tower, wherein the effluent outlet is in fluid communication with each port of the at least one set of ports, and wherein the effluent outlet is configured to direct recovered solids concentrate from the fluid stream to at least one effluent output. This exemplary embodiment or another exemplary embodiment may further provide that the at least one solids separation apparatus further comprises at least one set of passageways defined in the interior wall, wherein each passageway of the at least one set of passageways provides fluid communication between a port of the at least one set of ports and the effluent outlet, and wherein each passage of the at least one set of passages is configured to accept solids concentrate with a first configuration. This exemplary embodiment or another exemplary embodiment may further provide a second solids dissociation apparatus operably connected with the at least one solids separation apparatus, wherein the second fluid treatment apparatus is configured to eviscerate contaminants provided in the fluid stream for a second evisceration process. This exemplary embodiment or another exemplary embodiment may further provide that the at least one solids separation apparatus further comprises a second separation process operably connected with the second fluid treatment apparatus, wherein the at least one solids separation apparatus is adapted to separate the eviscerated contaminants from the fluid stream for a second separation process.

In another aspect, an exemplary embodiment of the present disclosure may provide a method of separating contaminants from a continuous fluid. The method may comprise the steps of pumping at least one continuous fluid stream into a fluid treatment apparatus, wherein the at least one continuous fluid stream includes contaminants; generating a traveling sonic wave, via a transducer of the apparatus, inside of a housing of the fluid treatment apparatus; cavitating the at least one continuous fluid stream inside of the at least one insert, wherein the at least one continuous fluid stream is isolated from the continuous sonic stream; eviscerating the contaminants in the at least one continuous fluid stream; pumping the at least one continuous fluid stream into a tower of a solids separation apparatus, wherein the fluid stream includes eviscerated contaminants of at least one configuration; generating a standing sonic wave, via a transducer of the solids separation apparatus, inside of the tower; adjusting one or both of the transducer and the reflector until the anti-nodes of the standing sonic wave are aligned with at least one set of ports defined in the tower; forcing the eviscerated contaminants of the at least one configuration, via the standing sonic wave, into the at least one set of ports of at least one removal stage of the tower; and removing the eviscerated contaminants of the at least one configuration from the fluid stream into the at least one set of ports.

This exemplary embodiment or another exemplary embodiment may further provide steps of pumping the at least one continuous fluid stream into a second fluid treatment apparatus; generating a second traveling sonic wave, via a second transducer of the second fluid treatment apparatus, inside of a second housing of the second fluid treatment apparatus; cavitating the at least one continuous fluid stream inside of a second insert, wherein the at least one continuous fluid stream is isolated from a second continuous sonic stream; and eviscerating the contaminants in the at least one continuous fluid stream. This exemplary embodiment or another exemplary embodiment may further provide a step of transferring the standing sonic wave, via a diaphragm, from the at least one solids removal stage to a second solids removal stage of the tower. This exemplary embodiment or another exemplary embodiment may further provide a step of directing the fluid stream, via at least one plumbing member, from the first solids separation stage of the tower to at least one additional solids separation stage of the tower. This exemplary embodiment or another exemplary embodiment may further provide steps of forcing eviscerated contaminants of a second configuration in the fluid stream, via the standing sonic wave, into a second set of ports of the second stage of the tower, wherein the eviscerated contaminants of a second configuration are smaller than the eviscerated contaminants of the at least one configuration; and removing the eviscerated contaminants of the second configuration from the fluid stream into second set of ports.

In another aspect, an exemplary embodiment of the present disclosure may provide a fluid cleaning system. The fluid cleaning system may comprise at least one solids dissociation apparatus adapted to receive a continuous fluid stream from a fluid source, wherein the at least one solids dissociation apparatus is configured to eviscerate contaminants provided in the fluid stream for at least one evisceration process; and at least one solids separation apparatus operably connected with the at least one fluid treatment apparatus for receiving the eviscerated contaminants provided in the fluid stream, the at least one solids separation apparatus comprising a housing (tower); a transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids removal stage of the tower, wherein the at least one set of ports is positioned at anti-nodes of the standing sonic wave to recover solids concentrate from a fluid stream flowing through the tower; wherein the transducer and the reflector are linearly moveable relative to the tower to linearly move the standing sonic wave.

This exemplary embodiment or another exemplary embodiment may further provide that a portion of the solids separation apparatus is provided inside of the at least one solids dissociation apparatus. This exemplary embodiment or another exemplary embodiment may further provide that the at least one solids separation apparatus further comprises at least one set of shutters operably engaged with the interior wall of the tower inside of the effluent outlet; wherein each shutter of the at least one set of shutters is moveable relative to the tower to control the flow rate of the fluid stream in the tower. This exemplary embodiment or another exemplary embodiment may further provide that the at least one solids separation apparatus further comprises an effluent outlet defined by the tower, wherein the effluent outlet is in fluid communication with each port of the at least one set of ports, and wherein the effluent outlet is configured to direct recovered solids concentrate from the fluid stream to at least one effluent output. This exemplary embodiment or another exemplary embodiment may further provide that the at least one solids separation apparatus further comprises at least one set of passageways defined in the interior wall, wherein each passageway of the at least one set of passageways provides fluid communication between a port of the at least one set of ports and the effluent outlet, and wherein each passage of the at least one set of passages is configured to accept solids concentrate with a first configuration. This exemplary embodiment or another exemplary embodiment may further provide that the at least one solids dissociation apparatus further comprises a housing; at least one insert operably engaged with the housing, wherein the at least one insert is adapted to receive the continuous fluid stream; and a transducer operably engaged with the housing and disposed about the at least one insert at a distance away from the said at least one insert inside of the housing, wherein the transducer is configured to create cavitation inside of the housing, via sonic waves, to eviscerate contaminants in the continuous fluid stream flowing through the at least one insert.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 10 is a method flowchart of separating contaminants from a continuous fluid.

Similar numbers refer to similar parts throughout the drawings.

DETAILED DESCRIPTION

Figure 1A:
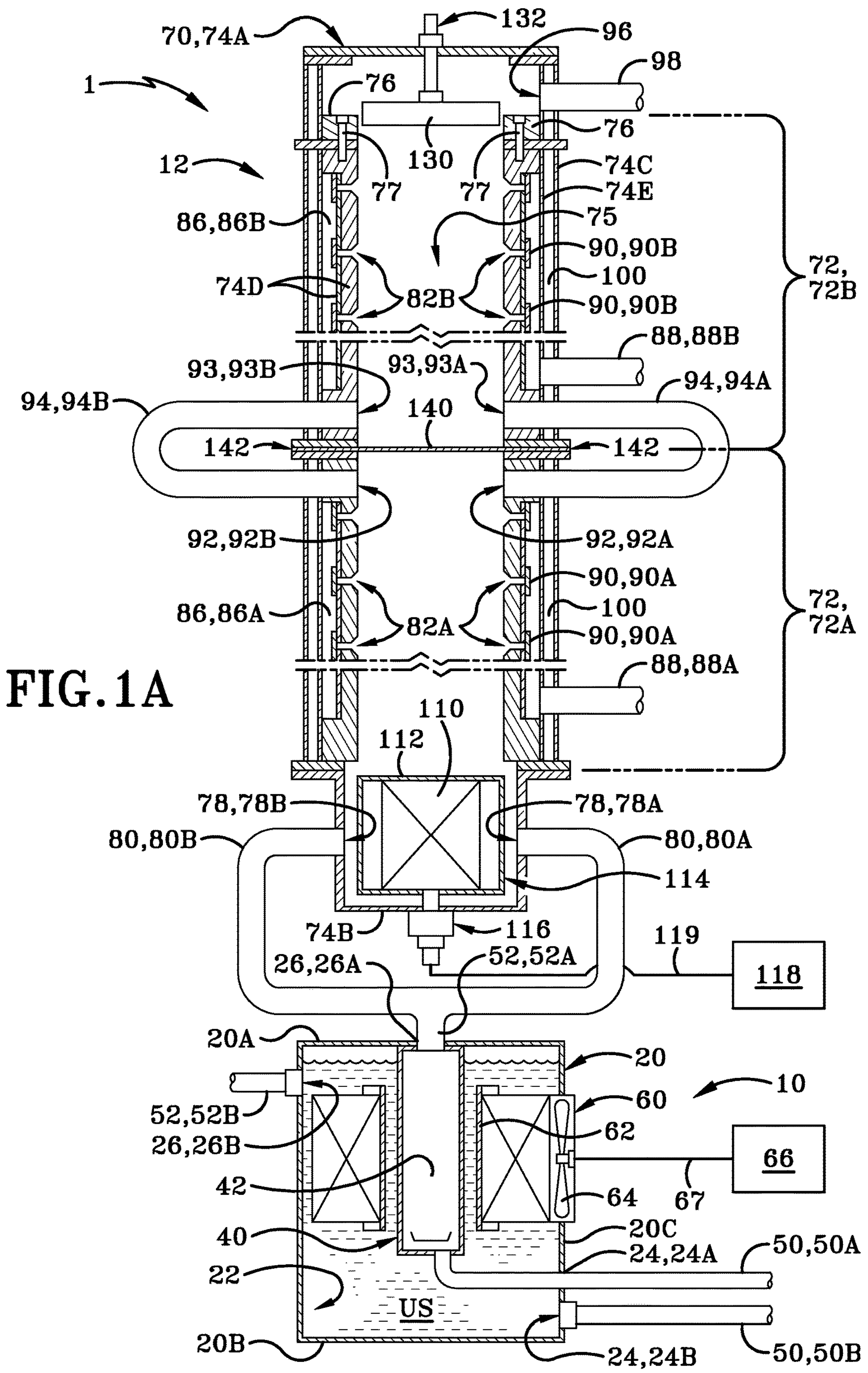
FIG. 1A is diagrammatic sectional view of a fluid cleaning system having a solids dissociation apparatus (SDA) and a solids separation apparatus (SSA).

FIGS. 1A-1B, 2, 3, and 4A-4B illustrate a fluid treatment system generally referred to as 1. The fluid treatment system 1 may include at least one solids dissociation apparatus (or "SDA" hereinafter) which is generally referred to as 10. The at least one solids dissociation apparatus 10 is configured to dissociate and/or disintegrate complex substances or solids into simpler constituents and/or elements. In other words, the at least one solids dissociation apparatus 10 is configured to eviscerate and/or break up complex substances found in a fluid source for cleaning and decontaminating said fluid source. Such dissociation of complex substances and solids via the at least one solids dissociation apparatus 10 is described in more detail below.

The fluid treatment system 1 may also include at least one solids separation apparatus (or hereinafter "SSA") which is generally referred to as 12. The at least one solids separation apparatus 12 is operably engaged with the at least one solids dissociation apparatus 10 where the at least one SDA 10 and the at least one SSA 12 are in fluid communication with one another. Due to this fluid communication, the at least one SSA 12 is configured to separate simple constituents (i.e., dissociated complex substances) from the fluid stream subsequent to the dissociation operation caused by the at least one SDA 10. Such separation of simple constituents from the fluid stream via the at least one solids separation apparatus 12 is described in more detail below.

The complex substances, contaminants, or solids referenced herein that are dissociated and/or disintegrated into simple constituents by the at least one SDA 10 and separated from a fluid stream (e.g., a water source or other types of fluid of the like) by the at least SSA 12 may be any complex substances or solids found in said fluid source. The constituents may be totally dissolved solids (e.g., totally dissolved minerals and salts in the fluid) and may be totally suspended solids (e.g., solids that float or suspend in water and affect the turbidity and/or transparency of the water). Examples of complex substances or solids that may be dissociate and/or disintegrated by at least one SDA include microorganisms (e.g., Dinoflagellates (ceratium), Rotifers, Copepod Adults, Copepodites, Copepod Nauplii, Bivalve Larve, Cladocerans, Polychaete Larve, Ostracods, Protozoan, Decapod Larve, *Staphylococcus, E. coli*, substantially all bacteria, molds, and/or viruses), chemical compounds (e.g., nitrate compounds to manufacture fertilizer, oil compounds, and other of the like), and solids provided in seawater (e.g., salt solids, sediment, clay, sand, minerals, metals, and other solids of the like found in seawater). Moreover, the at least one SDA 10 may be configured to neutralize basic and acidic compounds through its dissociation and disintegration capabilities.

As described herein, the term "fluid" herein is a substance, as a fluid or a gas, that is capable of flowing and capable of changing its shape at a steady rate when acted upon by a force tending to changes its shape. As such, any fluid known may be used herein when experiencing the at least one SDS 10 and the at least one SSA 12.

It should be understood that FIGS. 1A-1B, 2, 3, and 4A-4B are diagrammatic only for the fluid treatment system 1 and do not illustrate exact and precise dimensions of any component, assembly, or apparatus provided herein. Such diagrammatic illustrations of the at least one SDA 10 and the at least one SSA 12 of the fluid treatment system 1 shown in FIGS. 1A-1B, 2, 3, and 4A-4B should not limit the exact positioning, orientation, or location of the at least one SDA 10 and the at least one SSA 12 relative to one another.

As illustrated in FIGS. 1A-1B and 4A-4B, the fluid treatment system 1 includes a single SDA 10 operably engaged with a single SSA 12 for treating a continuous fluid stream. The continuous fluid stream is denoted by arrows labeled "LS" in FIGS. 1B, 2 and 3. In other exemplary embodiments, any suitable number of SDAs and SSAs may be used in a fluid treatment system, which is described in more detail below.

While the SDA 10 and the SSA 12 are oriented in upright, vertical positions as illustrated in FIGS. 1A-1B, 2, 3, and 4A-4B, the SDA 10 and the SSA 12 may be oriented in any suitable position. In one exemplary embodiment, at least one SDA and at least one SSA of a fluid treatment system may be oriented in lateral, horizontal position. In another exemplary embodiment, at least one SDA of a fluid treatment system may be oriented in a first position (upright, vertical position) and at least one SSA of the fluid treatment system may be oriented in a second position (lateral, horizontal position). In another exemplary embodiment, at least one SDA and at least one SSA of a fluid treatment system may be oriented in any suitable position based on the particular application of said fluid treatment system.

Figure 1B:
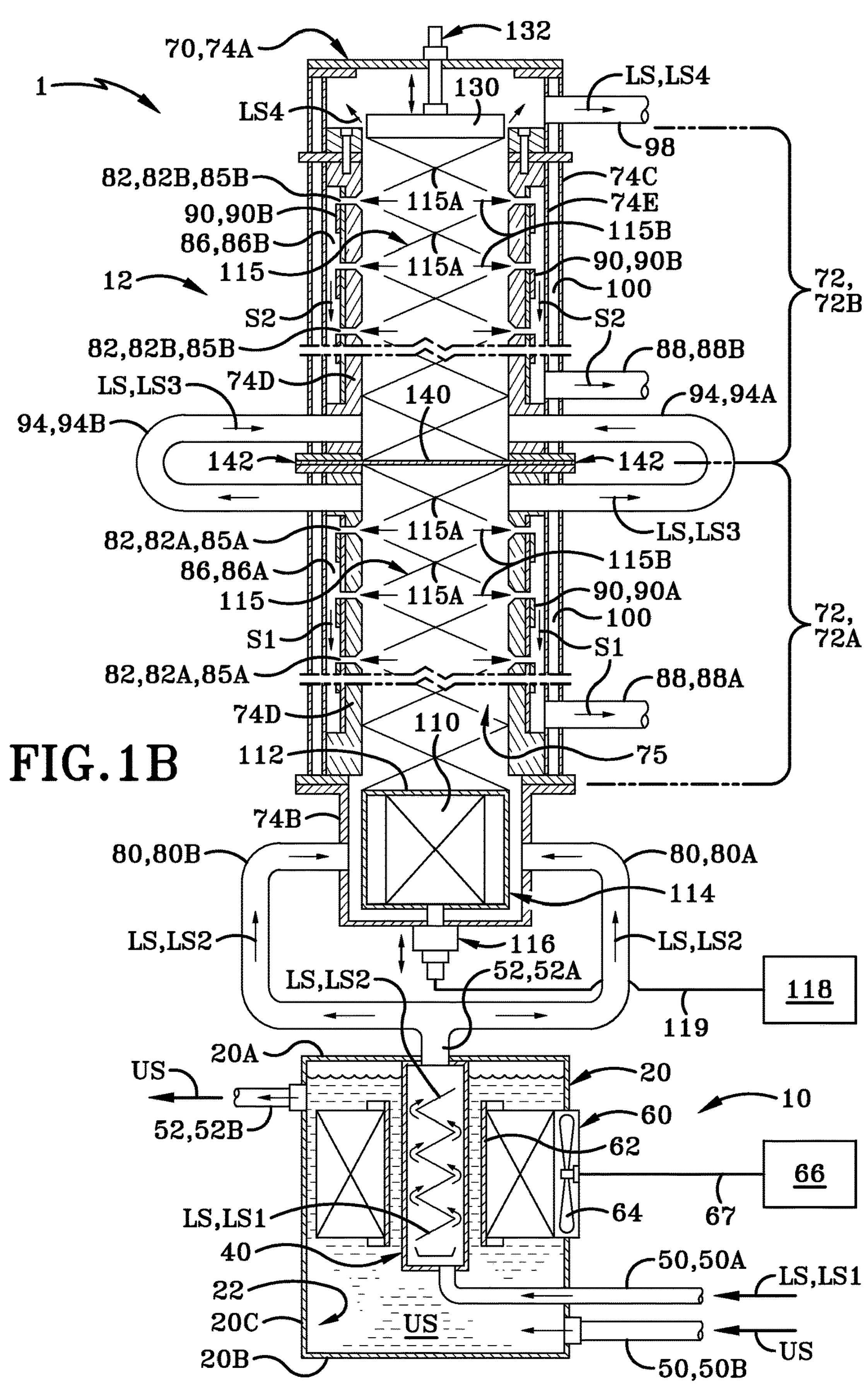
FIG. 1B is a diagrammatic sectional view of the fluid cleaning system similar to FIG. 1A, with the fluid cleaning system performing a fluid cleaning operation for a continuous fluid stream.
Figure 2:
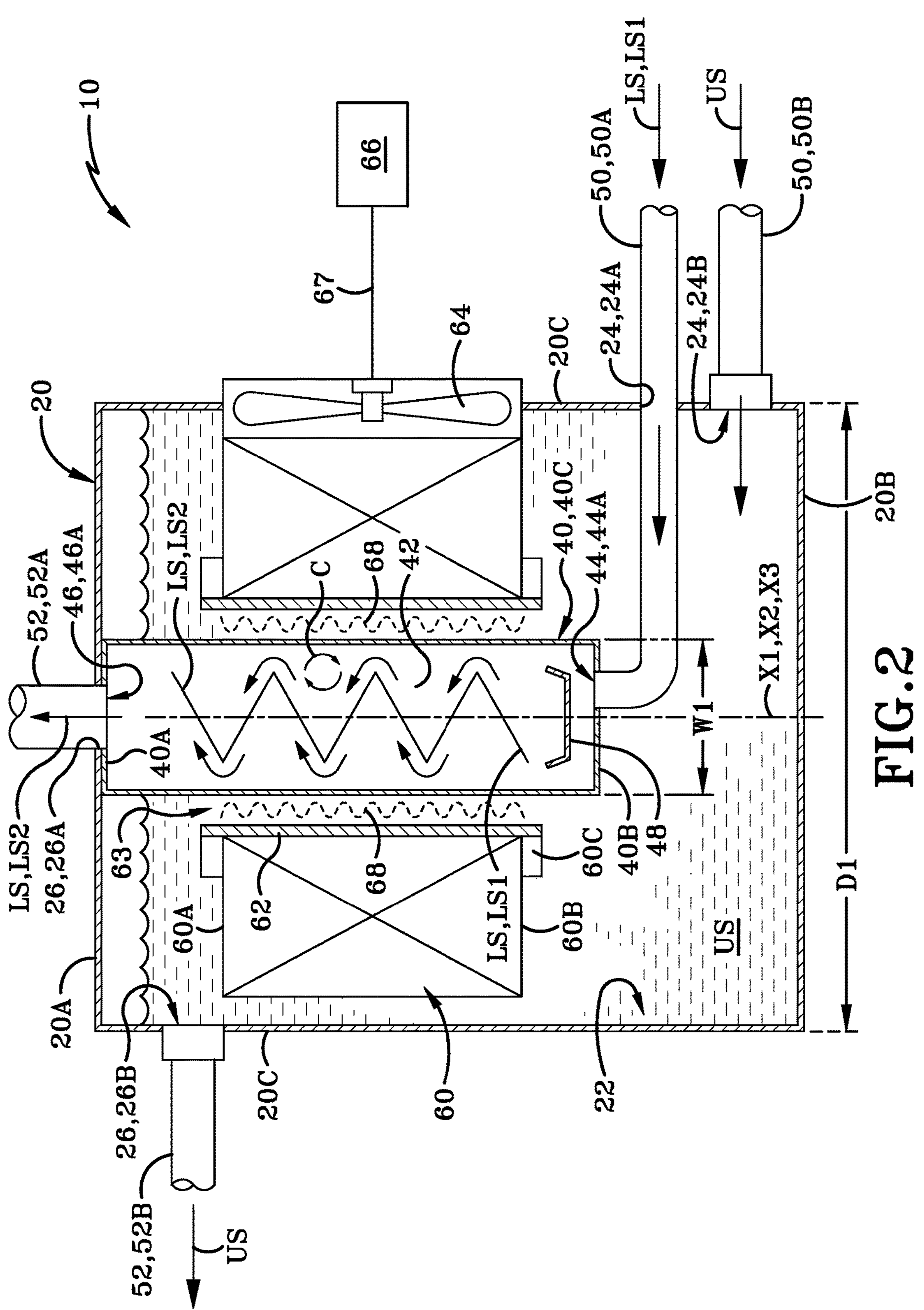
FIG. 2 is a diagrammatic sectional view of the SDA of the fluid cleaning system shown in FIG. 1A.

As illustrated in FIGS. 1A-2, the SDA 10 includes a housing 20. The housing 20 has a first or top wall 20A, an opposing second or bottom wall 20B, and a longitudinal axis "X1" defined therebetween. The housing 20 also includes a circumferential wall 20C that extends between the top wall 20A and the bottom wall 20B along an axis parallel with the longitudinal axis "X1" of the housing 20. The circumferential wall 20C also defines a diameter or width "D1" that is continuous between the top and bottom walls 20A, 20B as shown in FIG. 2. In the illustrated embodiment, the housing 20 is tubular and/or cylindrically-shaped. In other exemplary embodiments, a housing may have any shape or configuration based on various considerations. Examples of suitable shapes or configuration for a housing include spherical, cubical, cuboidal, conical, triangular, torus-shaped, pyramidal, polyhedron-shaped, and other suitable shapes or configuration for a housing of a SDA.

Referring to FIG. 2, the housing 20 also defines a pressurized reservoir 22 that is collectively defined by the top wall 20A, the bottom wall 20B, and the circumferential wall 20C. In one exemplary embodiment, the pressurized reservoir 22 may be held at a pressure that is greater than the surrounding atmospheric pressure for various process reasons, which are described in more detail below. In another exemplary embodiment, the pressurized reservoir 22 may be held at a pressure that is less than the surrounding atmospheric pressure. In another exemplary embodiment, the pressurized reservoir 22 may be held at a pressure that is substantially equal to the surrounding atmospheric pressure. The housing 20 also defines at least one inlet 24 that allows fluid communication between the pressurized reservoir 22 and the external environment without depressurizing the pressurized reservoir 22. In the illustrated embodiment, the housing 20 defines a first inlet 24A at a first position in the circumferential wall 20C between the top and bottom ends 20A, 20B. The housing 20 also defines a second inlet 24B at a second position in the circumferential wall 20C between the top and bottom ends 20A, 20B. In the illustrated embodiment, the first and second inlets 24A, 24B are defined proximate to the bottom end 20B. Such uses of the first and second inlets 24A, 24B defined in the housing 20 are described in more detail below.

While the first and second inlets 24A, 24B of the housing 20 are defined at first and second positions in the circumferential wall 20C, first and second inlets of a housing may be defined along any portion of the housing. In one exemplary embodiment, first and second inlets of a housing may be defined in a bottom wall of the housing. In another exemplary embodiment, first and second inlets of a housing may be defined in a top wall of the housing. In another exemplary embodiment, a first inlet of a housing may be defined in a first wall of the housing and the second inlet of a housing may be defined a second different wall of the housing.

Still referring to FIG. 2, the housing 20 also defines at least one outlet 26 that allows fluid communication between the pressurized reservoir 22 and the external environment without depressurizing the pressurized reservoir 22. In the illustrated embodiment, the housing 20 defines a first outlet 26A in the top wall 20A to provide fluid communication between the pressurized reservoir 22 and the external environment without depressurizing the pressurized reservoir 22. The housing 20 also defines a second outlet 26B at a third position in the circumferential wall 20C opposite to the second position of the second inlet 24B between the pressurized reservoir 22 and the external environment without depressurizing the pressurized reservoir 22. Such uses of the first and second outlets 26A, 26B defined in the housing 20 are described in more detail below.

While the first outlet 26A is defined in the top wall 20A and the second outlet 26B is the circumferential wall 20C, first and second outlets of a housing may be defined in any portion of the housing. In one exemplary embodiment, first and second outlets of a housing may be defined in a bottom wall of the housing. In another exemplary embodiment, first and second outlets of a housing may be defined in a top wall of the housing. In another exemplary embodiment, first and second outlets of a housing may be defined in a circumferential wall of the housing. In another exemplary embodiment, a first outlet of a housing may be defined a first wall of the housing and the second outlet of a housing may be defined a second different wall of the housing.

Still referring to FIG. 2, the SDA 10 also includes at least one insert 40. The at least one insert 40 is operably engaged with the housing 20 inside of the pressure reservoir 22. In the illustrated embodiment, the at least one insert 40 is operably engaged with an interior surface of the top wall 20A of the housing 20. In other exemplary embodiments, at least one insert may be operably engaged with any portion of the housing, more particularly an interior surface of any portion of the housing. In addition, the at least one insert 40 is configured to receive a continuous fluid stream "LS" from an external fluid source to help isolate dissociation and disintegration of complex substances and solids. Such dissociation and disintegration of complex substances and solids inside of the at least one insert 40 is described in more detail below.

In the illustrated embodiment, the insert 40 is a made and/or formed of a flexible, resilient material that is able to deform when pressure is applied to the insert 40, which is described in more detail below. In other exemplary embodiments, an insert described and illustrated herein may be made and/or formed of a rigid, resilient material.

As illustrated in FIG. 2, the SDA 10 includes a single insert to help isolate dissociation and disintegration of complex substances and solids. In other exemplary embodiments, any suitable number of inserts may be used in a SDA to help isolate dissociation and disintegration of complex substances and solids, which is described in more detail below.

Referring to FIG. 2, the insert 40 includes a first or upper wall 40A, an opposing second or bottom wall 40B, and a longitudinal axis "X2" defined therebetween. As shown in FIG. 2, the longitudinal axis "X2" of the insert 40 is parallel with the longitudinal axis "X1" of the housing 20. The insert 40 also includes a peripheral wall 40C that extends between the upper wall 40A and the lower wall 40B along an axis parallel with the longitudinal axis "X2" of insert 40. The peripheral wall 40C also defines a diameter or width "W1" as shown in FIG. 2. In the illustrated embodiment, the insert 40 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIG. 2, a fluid passage 42 is collectively defined by the upper wall 40A, the lower wall 40B, and the peripheral wall 40C of the insert 40. The fluid passage 42 is accessible via at least one inlet opening 44 and at least one outlet opening 46. In the illustrated embodiment, the fluid passage 42 is accessible via an inlet opening 44A defined in the lower wall 40B of the insert 40. The fluid passage 42 is accessible via an outlet 46A defined in the upper wall 40A of the insert 40. Such uses of the inlet opening 44A and the outlet opening 46A are described in more detail below.

While the first inlet 44A is defined in the lower wall 40B of the insert 40 and the first outlet 46A is defined in the upper wall 40A, a first inlet and a first outlet of an insert may be defined in any portion of the insert. In one exemplary embodiment, a first inlet and a first outlet of an insert may both be defined in a bottom wall of the insert. In another exemplary embodiment, a first inlet and a first outlet of an insert may both be defined in a top wall of the insert. In another exemplary embodiment, a first inlet and a first outlet of an insert may both be defined in a peripheral wall of the insert. In another exemplary embodiment, a first inlet of an insert may be defined in a first wall of the insert and a first outlet of an insert may be defined in a second different wall of the insert.

Still referring to FIG. 2, the insert 40 may also include a flow director or baffle 48. The flow director 48 is operably engaged with the peripheral wall 40C of the insert 40 proximate to the lower wall 40B and the first inlet 44A of the insert 40. As described in more detail below, the flow director 48 creates a specific flow to a continuous fluid stream "LS" that is pumped into the insert 40. In this illustrated embodiment, the flow director 48 creates a non-laminar flow pattern on the continuous fluid stream "LS" shown in FIGS. 1B and 2. In other exemplary embodiments, a flow director or baffle may be omitted from an insert. The use of the flow director 48 is considered advantageous at least because the flow pattern caused by the flow direction 48 on the continuous fluid stream "LS" creates a longer dwell time on the continuous fluid stream "LS" to travel through the insert 40. Such dwell time allows the continuous fluid stream "LS" to experience more cavitation inside of the insert 40 to further dissociate and/or disintegrate complex contaminants in the continuous fluid stream "LS", which is described in more detail below.

While a single flow director 48 is provided with the insert 40, any suitable number of flow directors may be installed in an insert for various considerations, including the desired dwell time of the continuous fluid stream inside of the insert, the intensity and desired turbulence of a continuous fluid stream, and other various considerations. While a flow director 48 is positioned proximate to the first inlet 44A of the insert 40, a flow director may be positioned along any suitable position inside of an insert for various considerations, including the desired dwell time of the continuous fluid stream inside of the insert, the intensity and desired turbulence of a continuous fluid stream, and other various considerations.

Still referring to FIG. 2, at least one inlet connection 50 may be operably engaged with the housing 20 and/or insert 40 for delivering a continuous fluid stream "LS" or a continuous sonic optimization fluid stream "US" for dissociation operations. In the illustrated embodiment, a first inlet connection 50A is operably engaged with the housing 20, via the first inlet 24A, and operably engaged with the insert 40, via the first inlet opening 44A. As shown in FIG. 2, the first inlet connection 50A is configured to direct the continuous fluid stream "LS" pumped from a fluid source (i.e., a body of water or fluid) and into the fluid passage 42 of the insert 40 via the fluid communication between the first inlet connection 50A and the insert 40. In addition, a second inlet connection 50B is operably engaged with the housing 20 via the second inlet 26A. As shown in FIG. 2, the second inlet connection 50B is configured to direct the continuous sonic optimization fluid stream "US" pumped from a sonic optimization fluid source and into the pressurized reservoir 22 of the housing 20 via the fluid communication between the second inlet connection 50B and the housing 20. As illustrated in FIG. 2, the first inlet connection 50A isolates the continuous fluid stream "LS" from the continuous sonic optimization fluid stream "US" pumped into the pressure reservoir 22 to prevent any mixing of or interaction between the continuous fluid stream "LS" and the continuous sonic optimization fluid stream "US" during dissociation processes, which is described in more detail below.

Still referring to FIG. 2, at least one outlet connection 52 may be operably engaged with the housing 20 and/or insert 40 for delivering a continuous fluid stream "LS" with dissociated substances and/or solids or delivering a continuous sonic optimization fluid stream "US" from the housing 20 for dissociation purposes. In the illustrated embodiment, a first outlet connection 52A is operably engaged with the housing 20, via the first outlet 26A, and operably engaged with the insert 40 via the first outlet opening 46A. As shown in FIG. 2, the second outlet connection 52A is configured to direct the continuous fluid stream "LS" with dissociated substances and/or solids from the fluid passage 42 of the insert 40 to an output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be a waste facility for receiving dissociated substances and/or solids. In another exemplary embodiment, an output device may be another solids dissociation apparatus, such as SDA 10, for providing another process of dissociation.

Still referring to FIG. 2, a second outlet connection 52B is operably engaged with the housing 20 via the second outlet 26B. The second outlet connection 52B is configured to direct the continuous sonic optimization fluid stream "US" from the pressurized reservoir 22 of the housing 20 to a sonic optimization fluid output device or to the original sonic inlet device. Such pumping and removing of sonic optimization fluid "US" allows for a continuous flow of sonic optimization fluid into the pressure reservoir 22 for adequate generation of sonic waves during dissociation processes, which is described in more detail below.

Still referring to FIG. 2, the SDA 10 also includes at least one transducer 60 operably engaged inside of the housing 20. In particular, the transducer 60 is operably engaged with the circumferential wall 20C of the housing 20 inside of the pressured reservoir 22 of said housing 20. In the illustrated embodiment, the at least one transducer 60 includes a first or top end 60A, an opposing second or bottom end 60B, and a longitudinal axis "X3" extending between the top and bottom ends 60A, 60B of the transducer 60. The longitudinal axis "X3" of the transducer 60 is parallel with the longitudinal axes "X1", "X2" of the housing 20 and the inlet 40.

Still referring to FIG. 2, the at least one transducer 60 includes a collar 60C extending between the top and bottom end 60A, 60B of the at least one transducer 60. The at least one transducer 60 also defines a reflector plate 62 operably engaged with the collar 60C for allowing the transducer to generate sonic waves inside of the housing 20 via the sonic optimization fluid stream "US", which is described in more detail below. As illustrated in FIG. 2, the collar 60C and the reflector plate 62 collectively define a passageway 63 extending between the top and bottom ends 60A, 60B of the transducer 60 along an axis parallel with the longitudinal axis "X3" of the at least one transducer 60. The at least one transducer 60 includes a heat exhaust fan 64 to disseminate heat generated by the transducer when generating sonic waves inside of the housing 20.

As illustrated in FIG. 2, a single transducer 60 is provided with the SDA 1 in this embodiment. In other exemplary embodiments, any suitable number of transducers may be provided in a SDA for various considerations, including the size, shape, and configuration of an SDA.

As illustrated in FIGS. 1B and 2, the transducer 60 may be operatively connected with a generator 66 via an electrical connection or wire 67. The connection between the transducer 60 and the generator 66 allows the transducer 60 to send a traveling sonic wave 68 inside of the housing 20 and against the insert 40 for creating cavitation and causing dissociation and/or evisceration of the complex substances into simple substances, which is described in more detail below. The generator 66 may be any suitable generator that is capable of generating a range of frequencies to cause a transducer to create cavitation resulting in dissociation and/or evisceration of complex substances into simple substances. In one exemplary embodiment, a suitable range of frequency generated by a generator for creating cavitation and causing dissociation and/or evisceration of complex substances into simple constituents is a frequency range from about 3 kHz up to about 200 kHz.

Referring to FIG. 2, the transducer 60 is disposed about a portion of the insert 40 via the passageway 63 defined collectively by the collar 60C and the reflector plate 62. In the illustrated embodiment, the transducer 60 is disposed at a distance away from the insert 40. In one example, the insert 40 and the transducer 60 may be disposed at a distance of about at least one-half wavelength of a frequency of the sonic waves transmitted by the transducer 60. Such configuration of the insert 40 inside of the transducer 60 allows the transducer 60 to direct and send the traveling sonic wave 68 against the insert 40 to cause cavitation inside of said insert 40 during dissociation operations. Here, the traveling sonic wave 68 generated by the transducer 60, via power from the generator 66, creates a first or primary cavitation in the continuous sonic optimization fluid stream "US" inside of the passageway 63 of the transducer 60. This cavitation remains inside of the passageway 63 of the transducer 60 until the transducer 60 is powered off. Upon this cavitation, the energy on the sonic optimization fluid stream "US" creates micro-mechanical implosions on the sonic fluid stream.

Upon this cavitation, a second or secondary cavitation occurs inside of the insert 40 upon the continuous fluid stream "LS" via the traveling sonic wave 68 generated by the transducer 60. As shown in FIG. 2, traveling sonic wave 68 penetrates against the outer wall of the insert 40 causing the second cavitation to occur on the continuous fluid stream "LS" as said continuous fluid stream "LS" flows through the insert 40. The second cavitation caused by sonic waves generated by the transducer 60 is denoted by rotating arrows labeled "C" in FIG. 2. As described in more detail below, the combination of both non-laminar flow and the second cavitation "C" on the continuous fluid stream "LS" allow for dissociation and/or disintegration of the complex substances and solids provided in the continuous fluid stream "LS." As the complex substances and solids reach the first outlet 46A of the inlet 40, substantially all or all of the complex substances and solids are dissociated in that the complex substances are simple constituents that no longer making up a specific substance or solid recognized prior to such dissociation operations.

The configuration of the SDA 10 is considered advantageous at least because the cavitations caused by the traveling sonic wave 68, via the wave frequency generated by the generator 66, is able to dissociate complex substances of the continuous fluid stream "LS" into simple constituents when being bombarded with the traveling sonic wave 68 of the transducer 60. The cavitation created by the transducer 60 produces cavitation with pressures of at least 20,000 psi and with temperatures of at least 10,000 degrees Fahrenheit with each cavitation energy implosion occurring every wave cycle (e.g., every second). Moreover, the configuration of the SDA 10 is considered advantageous at least because the cavitation caused by the traveling sonic wave 68, via the wave frequency generated by the generator 66, is able to create a uniform cavitation in the continuous fluid stream "LS" for dissociating the complex substances of the continuous fluid stream "LS" into simple constituents.

In the illustrated embodiment, the traveling sonic wave 68 transmitted by the transducer 60 is provided in a sinusoidal wave form. In other exemplary embodiments, a transducer may transmit a traveling sonic wave having any suitable wave form to create cavitation inside of a housing and inside of an insert of a SDA. Examples of suitable wave forms to create cavitation inside of a housing and inside of an insert of a SDA include square wave form, a triangle wave form, a sawtooth wave form, or other suitable waveforms to create cavitation inside of a housing and inside of an insert of a SDA.

In the illustrated embodiment, the transducer 60 of the SDA 10 may be constructed of any suitable materials for transmitting a traveling sonic wave (such as traveling sonic wave 68) inside of the housing 20. In one exemplary embodiment, a transducer of a SDA may be constructed of magnetostrictive-type construction with magnetostrictive materials. In another exemplary embodiment, a transducer of a SDA may be constructed of a electrostrictive-type construction with piezoelectric or electrostrictive materials. In another exemplary embodiment, a transducer of a SDA may be constructed of smart materials. In another exemplary embodiment, a transducer of a SDA may be constructed of ferromagnetic materials.

Figure 3:
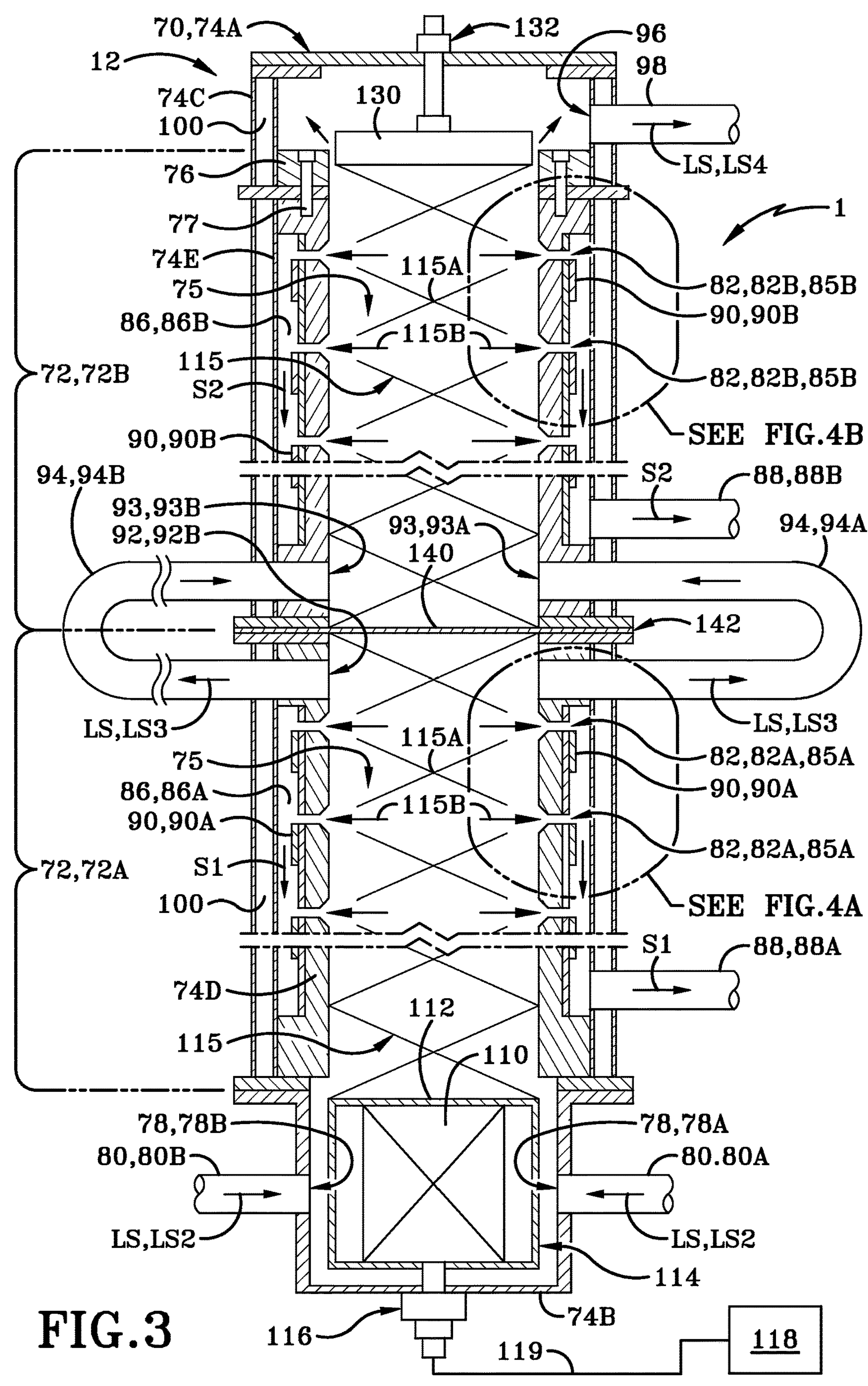
FIG. 3 is a diagrammatic sectional view of the SSA of the fluid cleaning system shown in FIG. 1B.

Referring to FIGS. 1A-1B and 3, the SSA 12 may include a column or tower 70 operably connected with the SDA 10. The tower 70 includes at least one stage 72 for separating or removing the simple constituents dissociated by the SDA 10. In the illustrated embodiment, the tower 70 includes a first stage 72A for removing a first set of simple constituents from the fluid stream "LS" and a second stage 72B for removing a second set of simple constituents from the fluid stream "LS" where the second set of simple constituents have a smaller configuration than the first set of simple constituents. Such removal of first and second sets of constituents from the fluid stream is described in more detail below. The first and second stages 72A, 72B of the tower 70 are similar to one another, except as detailed below. Inasmuch as the first and second stages 72A, 72B are similar, the following description will relate to the first stage 72A. It should be understood, however, that the description of the first stage 72A applies substantially equally to the second stage 72B, except as detailed below.

Referring to FIGS. 1A-1B and 3, the tower 70 includes a top or first wall 74A, an opposing bottom or second wall 74B, and a longitudinal axis defined therebetween. The tower 70 also includes a first or exterior circumferential wall 74C extending along the longitudinal axis of the tower 70 between the top wall 74A and the bottom wall 74B. The tower 70 also includes a second or interior circumferential wall 74D extending along the longitudinal axis of the tower 70 between the top wall 74A and the bottom wall 74B. The tower 70 also includes a third or medial circumferential wall 74E extending along the longitudinal axis of the tower between the top wall 74A and the bottom wall 74B. The medial circumferential wall 74E is positioned between the exterior circumferential wall 74C and the interior circumferential wall 74D. The top wall 74A, the bottom wall 74B, and the interior circumferential wall 74D collectively define a pressurized chamber 75 that extends along the longitudinal axis of the tower 70. In one exemplary embodiment, the pressurized chamber 75 may be held at a pressure that is greater than the surrounding atmospheric pressure for various process reasons, which are described in more detail below. In another exemplary embodiment, the pressurized chamber 75 may be held at a pressure that is less than the surrounding atmospheric pressure. In another exemplary embodiment, the pressurized chamber 75 may be held at a pressure that is substantially equal to the surrounding atmospheric pressure.

Referring to FIG. 1A, the tower 70 may include a peripheral engagement wall 76 that operably engages with each of the exterior circumferential wall 74A, the interior circumferential wall 74B, and the medial circumferential wall 74C via attachment mechanisms 77 (e.g., a connector and a nut). Such use of the peripheral engagement wall 76 with attachment mechanisms 77 provides a structural configuration to hold each of the exterior circumferential wall 74A, the interior circumferential wall 74B, and the medial circumferential wall 74C together. In one exemplary embodiment, any suitable number of peripheral engagement walls may be used to provide additional support between an exterior circumferential wall, an interior circumferential wall, and a medial circumferential wall.

Still referring to FIGS. 1A-1B through 3, the tower 70 may define at least one fluid stream inlet 78 defined in the bottom wall 74B of the tower 70. The at least one fluid stream inlet 78 may be configured to allow at least one inlet connection 80 to be operably engaged with the tower 80 to allow the continuous fluid stream "LS" to be directed from the SDA 10 to the SSA 12 for separating the simple constituents from said fluid stream "LS." In the illustrated embodiment, a first fluid stream inlet 78A is defined in the bottom wall 74B of the tower 70. The first fluid stream inlet 78A is configured to allow a first inlet connection 80A to be operably connected with the tower 70 to allow the fluid stream "LS" to flow from the SDA 10 into the SSA 12 (see FIG. 1B). Additionally, a second fluid stream inlet 78B is defined in the bottom wall 74B of the tower 70 where the second fluid stream inlet 78B is coaxial with the first fluid stream inlet 78A. The second fluid stream inlet 78B is configured to allow a second inlet connection 80B to be operably connected with the tower 70 to allow the fluid stream "LS" to flow from the SDA 10 into the SSA 12 (see FIG. 1B).

As illustrated herein, the first outlet connection 52A of the SDA 10 may be continuous with the first and second inlet connections 80A, 80B of the SSA 12 such that the connections 52A, 80A, 80B are a single unitary connection. In other exemplary embodiments, a first outlet connection of a SDA may be coupled with first and second inlet connections of a SSA via various coupling devices and/or connectors (e.g., pipe couplers, flanges, valves, etc.)

Figure 4A:
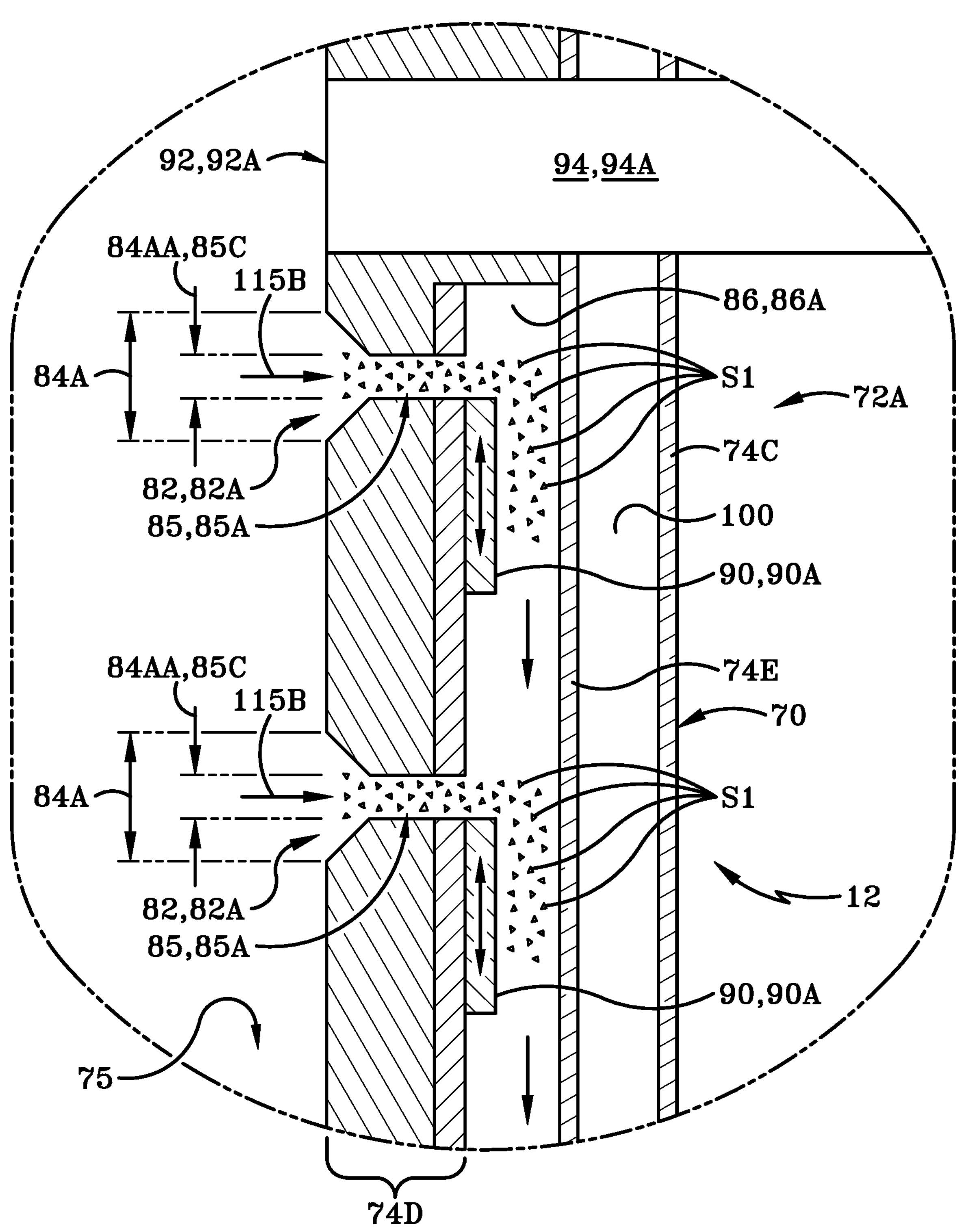
FIG. 4A is an enlargement view of the highlighted region shown in FIG. 3.

Referring to FIG. 3, the tower 70 may define at least one set of ports 82 in the interior circumferential wall 74D of at least one stage 72 of said tower 70. In the illustrated embodiment, the tower 70 defines a first set of ports 82A in the interior circumferential wall 74D of the first stage 72A of said tower 70. As illustrated in FIG. 4A, each port of the first set of ports 82A includes a first diameter 84A defined in the interior circumferential wall 74D along the inner surface of the interior circumferential wall 74D proximate to the pressurized chamber 75. Still referring to FIG. 4A, each port of the first set of ports 82A also includes a second diameter 84AA defined in the interior circumferential wall 74A inside of the interior circumferential wall 74D remote from the pressurized chamber 75; the second diameter 84AA is less than the first diameter 84A. As such, the first set of ports 82A defined by the interior circumferential wall 74D are V-shaped or funnel-shaped in which the first diameter 84A of each port 82A tapers to the second diameter 84AA.

Figure 4B:
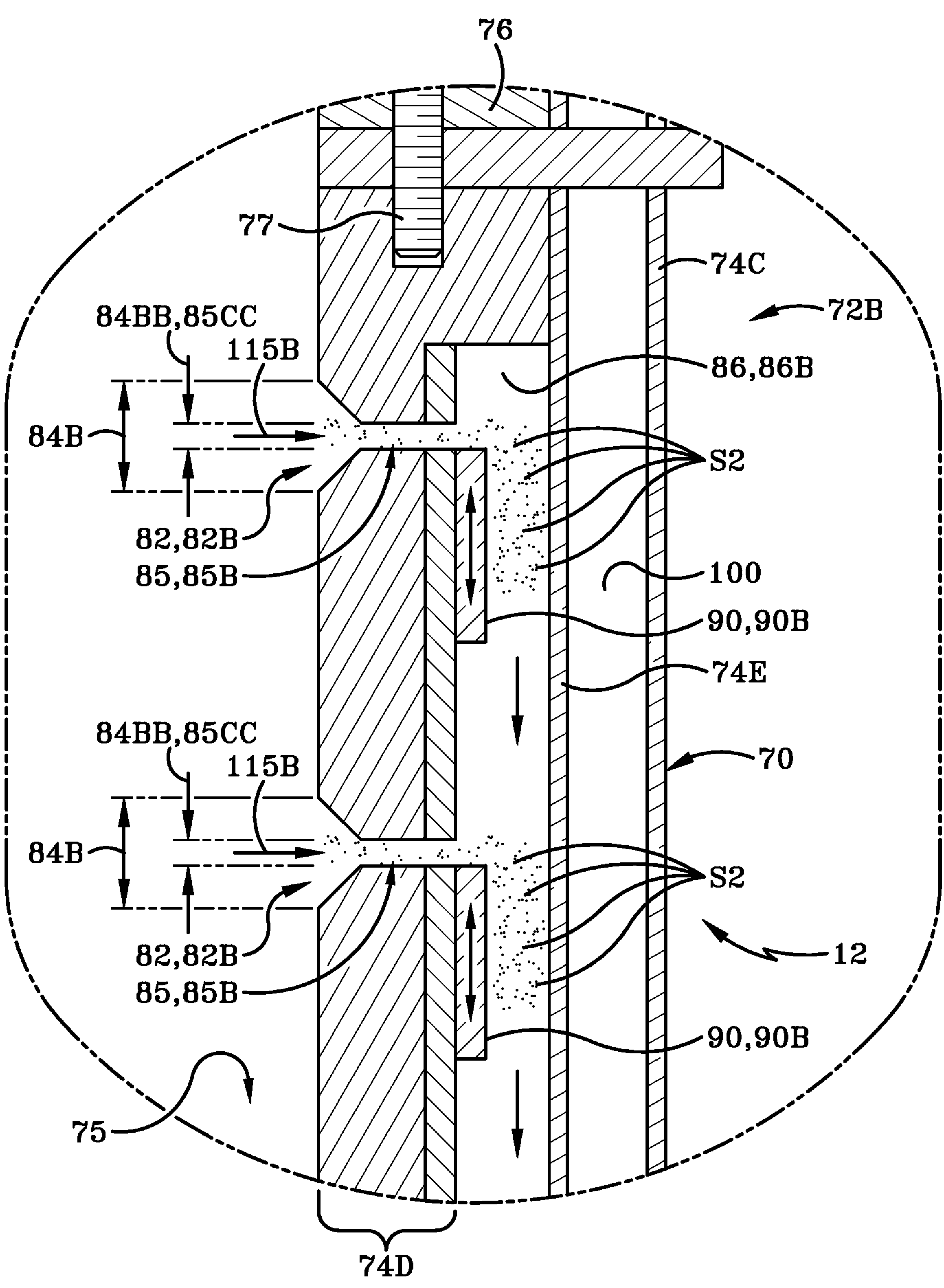
FIG. 4B is an enlargement view of the highlighted region shown in FIG. 3.

Referring to FIG. 4B, the tower 70 defines a second set of ports 82B in the interior circumferential wall 74D of the second stage 72B of said tower 70. As illustrated in FIG. 4B, each port of the second set of ports 82B includes a first diameter 84B defined in the interior circumferential wall 74D along the inner surface of the interior circumferential wall 74D proximate to the pressurized chamber 75. Still referring to FIG. 4B, each port of the second set of ports 82B also includes a second diameter 84BB defined in the interior circumferential wall 74A inside of the interior circumferential wall 74D remote from the pressurized chamber 75; the second diameter 84BB is less than the first diameter 84B. Additionally, the second diameter 84BB of each port of the second set of ports 84B is less than the second diameter 84AA of each port of the first set of ports 84A for receiving constituents of a smaller size than the first set of ports 82A, which is described in more detail below. As such, the second set of ports 82B defined by the interior circumferential wall 74D are also V-shaped or funnel-shaped in which the first diameter 84B of each port 82B tapers to the second diameter 84BB.

Still referring to FIG. 4A, the interior circumferential wall 74D also defines at least one set of passageways 85 that is in fluid communication with the at least one set of ports 82. In the illustrated embodiment, the interior circumferential wall 74D defines a first set of passageways 85A that is in fluid communication with the first set of ports 82A in the first stage 72A of the tower 70. Each passageway of the first set of passageways 85A defines a third diameter 85C that extends along the entire length of each passageway of the first set of passageways 85A. In the illustrated embodiment, the third diameter 85C of each passageway of the first set of passageways 85A is equal to the second diameter 84AA of each port of the first set of ports 82A. The configuration between the first set of ports 82A and the first set of passageways 85A allows the first set of ports 82A to capture and recover first simple constituents "51" from the fluid stream "LS" dissociated by the SDA 10 in previous operations. Such operations of capturing and recovering the first simple constituents "51" from the fluid stream "LS" dissociated by the SDA 10 is described in more detail below.

Referring to FIG. 4B, the interior circumferential wall 74D defines a second set of passageways 85B that is in fluid communication with the second set of ports 82B in the second stage 72B of the tower 70. Each passageway of the second set of passageways 85B defines a third diameter 85CC that extends along the entire length of each passageway of the second set of passageway 85B. In the illustrated embodiment, the third diameter 85CC of each passageway of the second set of passageways 85B is equal to the second diameter 84BB of each port of the second set of ports 82B. The configuration between the second set of ports 82B and the second set of passageways 85B allows the second set of ports 82B to capture and recover second simple constituents "S2" from the fluid stream "LS" dissociated by the SDA 10 in previous operations where the second simple constituents are smaller in size than the first simple constituents "S1." Such operations of capturing and recovering the second simple constituents "S2" from the fluid stream "LS" dissociated by the SDA 10 is described in more detail below.

Referring to FIGS. 3 and 4A, the tower 70 also includes at least one effluent and/or concentrated waste stream outlet 86 defined by the exterior circumferential wall 74C and the medial circumferential wall 74E for at least one stage 72 of the tower 70. The at least one effluent outlet 86 is in fluid communication with the pressurized chamber 75 of the tower 70 for disposing of simple constituents recovered by the at least one set of ports 82. Additionally, the at least one effluent outlet 86 may be configured to allow at least one effluent outlet connection 88 to operably engage with the tower 70 for dispensing simple constituents to an output location (e.g., waste facility, another SDA such as SDA 10, etc.).

Referring to FIGS. 3 and 4A, the tower 70 includes a first effluent outlet 86A defined between the exterior circumferential wall 74C and the medial circumferential wall 74E for the first stage 72A of the tower 70. The first effluent outlet 86A is in fluid communication with the pressurized chamber 75 of the tower 70 via the first set of ports 82A and the first set of passageways 85A. Such communication with the pressurized chamber 75, the first set of ports 82A, and the first set of passageways 85A allows the first effluent outlet 86A to dispose of the first simple constituents "S1" recovered by the first set of ports 82A. The first effluent outlet 86A may also be configured to allow the tower 70 to operably engage with a first effluent outlet connection 88A for dispensing the first simple constituents "S1" in an output location.

Referring to FIGS. 3 and 4B, the tower 70 also includes a second effluent outlet 86B defined between the exterior circumferential wall 74C and the medial circumferential wall 74E for the second stage 72B of the tower 70. The second effluent outlet 86B is in fluid communication with the pressurized chamber 75 of the tower 70 via the second set of ports 82B and the second set of passageways 85B. Such communication with the pressurized chamber 75, the second set of ports 82B, and the second set of passageways 85B allows the second effluent outlet 86B to dispose of the second simple constituents "S2" recovered by the second set of ports 82B. The second effluent outlet 86B may also be configured to allow the tower 70 to operably engage with a second effluent outlet connection 88B for dispensing the second simple constituents "S2" in an output location.

As illustrated in FIGS. 1A-1B and 3-4B, the SSA 12 includes at least one set of shutters 90 operably engaged with the tower 70 in the the at least one stage 72. Each shutter of the at least one set of shutters 90 is moveable relative to the tower 70 for controlling the flow rate of the fluid stream "LS" depending on the position of each shutter of the at least one set of shutters 90 relative to a respective passageway of the at least one set of passageways 85.

As illustrated in FIGS. 3 and 4A, the SSA 12 includes a first set of shutters 90A operably engaged with the tower 70 in the first stage 72A. As illustrated in FIG. 4A, each shutter of the first set of shutters 90A is operably engaged with the interior circumferential wall 74D of the tower 70 inside of the first effluent outlet 86A. As illustrated herein, each shutter of the first set of shutters 90A is linearly moveable between a covered position and an uncovered position relative to first set of ports 82A and the first set of passageways 85A defined in the interior circumferential wall 74D of the tower 70. Such linear movement of the first set of shutters 90A is denoted by arrows labeled "LM1" in FIG. 4A. Prior to operation, each shutter of the first set of shutters 90A may be provided in the covered position to fully cover a respective passageway of the first set of passageways 85A for preventing any first simple constituents "S1" and fluid stream "LS" from entering into the first effluent outlet 86A (see FIG. 1A). During a separation operation, each shutter of the first set of shutter 90A may be provided in the uncovered position to uncover (see FIG. 4A) a respective passageway of the first set of passageways 85A for allowing first simple constituents "S1" and fluid stream "LS" to enter into the first effluent outlet 86A. While not illustrated herein, the shutters of first sets of shutters 90A may be configured to partially cover and/or uncover a respective passageway of the first set of passageways 85A for controlling a desired flow rate through the first set of ports 82A and the first set of passageways 85A. While not illustrated herein, each shutter of the second sets of shutters 90B may also be configured to move independently of one another.

As illustrated in FIGS. 3 and 4B, the SSA 12 includes a second set of shutters 90B operably engaged with the tower 70 in the second stage 72B. As illustrated in FIG. 4B, each shutter of the second set of shutters 90B is operably engaged with the interior circumferential wall 74D of the tower 70 inside of the second effluent outlet 86B. As illustrated herein, each shutter of the second set of shutters 90B is linearly moveable between a covered position and an uncovered position relative to second set of ports 82B and the second set of passageways 85B defined in to the interior circumferential wall 74D of the tower 70. Such linear movement of the second set of shutters 90B is denoted by arrows labeled "LM2" in FIG. 4B. Prior to operation, each shutter of the second set of shutters 90B may be provided in the covered position to fully cover a respective passageway of the second set of passageways 85B for preventing any second simple constituents "S2" and fluid stream "LS" from entering into the second effluent outlet 86B (see FIG. 1A). During a separation operation, each shutter of the second set of shutter 90B may be provided in the uncovered position to uncover (see FIG. 4B) a respective passageway of the second set of passageways 85B for allowing second simple constituents "S2" and fluid stream "LS" to enter into the second effluent outlet 86B. While not illustrated herein, the shutters of second sets of shutters 90B may be also configured to partially cover and/or uncover a respective passageway of the second set of passageways 85B for controlling a desired flow rate through the second set of ports 82B and the second set of passageways 85B. While not illustrated herein, each shutter of the second sets of shutters 90B may also be configured to move independently of one another.

While the shutters in the first and second sets of shutters 90A, 90B are longitudinally moveable along the interior circumferential wall 74D of the tower 70 relative to the longitudinal axis of said tower 70, shutters of first and second sets of shutters may be moveable along an interior circumferential wall of a tower relative to any suitable axis of said tower. In one exemplary embodiment, shutters of one or both of first and second sets of shutters may be radially or transversally moveable along an interior circumferential wall of a tower relative to a horizontal or transverse of said tower. In another exemplary embodiment, shutters of one or both of first and second sets of shutters may be circumferentially moveable about an interior circumferential wall of a tower relative to a longitudinal axis of said tower. In another exemplary embodiment, shutters of one of both of first and second sets of shutters may be rotatably moveable on an interior circumferential wall of a tower relative to a longitudinal axis of said tower. In another exemplary embodiment, shutters of one or both of first and second sets of shutters may be laterally moveably on an interior circumferential wall of a tower relative to a longitudinal axis of said tower.

While the shutters in the first and second sets of shutters 90A, 90B are longitudinally moveable along the interior circumferential wall 74D of the tower 70, any suitable mechanism and/or drive systems may be used to move shutters in first and second sets of shutters. Examples of suitable mechanisms and/or drive systems for moving shutters in first and second sets of shutters include linkage mechanisms, slider-crank mechanisms, cam mechanisms, gear mechanisms, and other suitable mechanism and/or drive systems for moving shutters in first and second sets of shutters. Additionally, any suitable device or machine may be used to move shutters in first and second sets of shutters for controlling flow rate in a tower. In one exemplary embodiment, devices or machines operably engaged with first and second sets of shutters may be manually operated for moving shutters of the first and second sets of shutters to control flow rate in a tower. In another exemplary embodiment, devices or machines operably engaged with first and second sets of shutters may be automated and/or autonomously controlled for moving shutters of the first and second sets of shutters to control flow rate in a tower.

As illustrated in FIGS. 1A-1B and 3, the SSA 12 includes at least one transfer inlet 92 defined in the interior circumferential wall 74D of the first stage 72A of the tower 70. The SSA 12 also includes at least one transfer outlet 93 defined in the interior circumferential wall 74D of the second stage 72B of said tower 70. The at least one transfer inlet 92 and the least one transfer outlet 93 are configured to allow at least one transfer connection 94 to be operably engaged with the interior circumferential wall 74D of the tower 70. Due to this configuration between the at least one transfer connection 94 and the tower 70, the at least one transfer connection 94 is able to transfer and/or direct the fluid stream "LS" having second simple constituents "S2" from the first stage 72A of the tower to the second stage 72B of the tower 70 via the at least one transfer inlet 92 and the at least one transfer outlet 93.

In the illustrated embodiment, the SSA 12 has a first transfer inlet 92A that is defined in the interior circumferential wall 74D of first stage 72A of the tower 70. The SSA 12 also has a first transfer outlet 93A that is defined in the interior circumferential wall 74D of the second stage 72B of the tower 70. As illustrated in FIG. 3, the first transfer inlet 92A and the first transfer outlet 93A are configured to allow a first transfer connection 94A to be operably engaged with the interior circumferential wall 74D of the tower 70. Due to this configuration between the first transfer connection 94A and the tower 70, the first transfer connection 94A is able to transfer and/or direct the fluid stream "LS" having second simple constituents "S2" from the first stage 72A of the tower to the second stage 72B of the tower 70 via the first transfer inlet 92A and the first transfer outlet 93A.

Similarly, the SSA 12 may also have a second transfer inlet 92B that is defined in the interior circumferential wall 74D of first stage 72A of the tower 70. The SSA 12 also has a second transfer outlet 93B that is defined in the interior circumferential wall 74D of the second stage 72B of the tower 70. As illustrated in FIG. 3, the second transfer inlet 92B and the second transfer outlet 93B are configured to allow a second transfer connection 94B to be operably engaged with the interior circumferential wall 74D of the tower 70. Due to this configuration between the second transfer connection 94B and the tower 70, the second transfer connection 94A is able to transfer and/or direct the fluid stream "LS" having second simple constituents "S2" from the first stage 72A of the tower to the second stage 72B of the tower 70 via the second transfer inlet 92B and the second transfer outlet 93B. Such inclusion of the second transfer connection 94B allows for a greater volume of the fluid stream "LS" having second simple constituents "S2" to be directed from the first stage 72A of the tower into the second stage 72B of the tower 70.

Referring to FIGS. 1A-1B and 3, the SSA 12 may include at least one cleaned fluid outlet 96 defined in the interior circumferential wall 74D of the tower 70. The at least one cleaned fluid outlet 96 may be configured to allow at least one cleaned fluid outlet connection 98 to operably engage with the tower 70. The configuration between the at least one cleaned fluid outlet connection 98 and the tower 70 allows the at least one fluid outlet connection 98 to be in fluid communication with the pressurized chamber 75 in the second stage 72B of the tower 70. The at least one fluid outlet connection 98 is also in fluid communication with an output device or facility for holding the clean or permeate fluid stream "LS" subsequent the separation process performed by the SSA 12.

As illustrated in FIGS. 1A-1B, 3, and 4A-4B, the tower 70 may define at least one air space 100 circumferential disposed about the pressurized chamber 75 of the tower 70. More particularly, the at least one air space 100 may be defined between the exterior circumferential wall 74C and the medial circumferential wall 74E. The at least one air space 100 is considered advantageous at least because the at least one air space 100 separates and isolates sonic waves being used in the SSA 12 from sonic waves being used in the SDA 10, which is described in more detail below.

As illustrated in FIGS. 1A-1B and 3, the SSA 12 may include at least one transducer 110 operably engaged with the tower 70 inside of the pressurized chamber 75. The at least one transducer 110 is selectively adjustable relative to the tower 70, which is described in more detail below. In the illustrated embodiment, a single transducer 110 is operably engaged with the tower 70 inside of the pressurized chamber 75.

Referring to FIGS. 1A-1B and 3, the transducer 110 includes a reflector plate 112 operably engaged with a pressurized housing 114 encapsulating the transducer 110. Such configuration between the reflector plate 112 and the pressurized housing 114 allows the transducer 110 to generate a standing sonic wave 115 along the entire length of the tower 70 inside of the pressurized chamber 75.

Figure 3A:
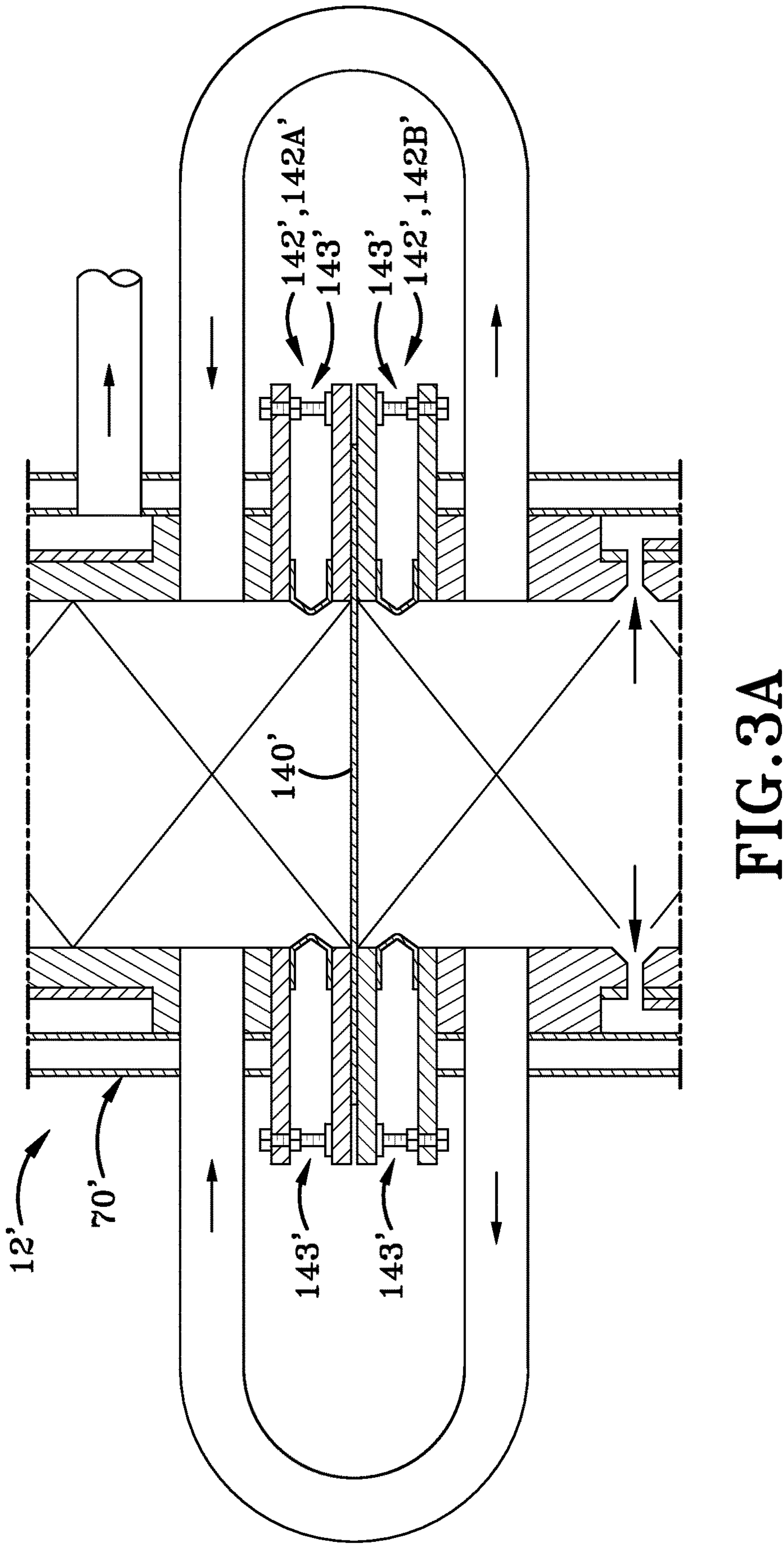
FIG. 3A is a partial diagrammatic sectional view of an alternative adjustment assembly for a diaphragm of the SSA of the fluid cleaning system shown in FIG. 1B.

As shown in FIGS. 1B and 3, the standing sonic wave 115 generated by the transducer 110 includes a plurality of nodes 115A and a plurality of anti-nodes 115B positioned along the longitudinal axis of the tower 70. As illustrated in FIGS. 3 and 3A, the plurality of nodes 115A signifies a first pressure being exerted against the simple constituents "S1", "S2" generated by the standing sonic wave 115. The plurality of nodes 115A is also positioned between each port of the first and second sets of ports 82A, 82B to allow the fluid stream "LS" to flow through the pressurized chamber 75. As illustrated in FIGS. 3 and 4A-4B, the plurality of anti-nodes 115B signify a second pressure being exerted against the simple constituents "S1", "S2" generated by the standing sonic wave 115; the second pressure of the plurality of anti-nodes 115B is greater than the first pressure of the plurality of nodes 115A. Each anti-node of plurality of anti-nodes 115B is positioned directly over a port of one or both of the first and second sets of ports 82A, 82B to direct simple constituents "S1", "S2" into a respective port 82A, 82B in the first or second stages 72A, 72B of the tower 70. In other exemplary embodiments, each anti-node of a plurality of anti-nodes may be positioned outside of a port of one or both of first and second sets of ports due to the size of constituents, the velocity of the fluid, and other similar considerations of the like.

As illustrated in FIG. 3, the transducer 110 is also moveable relative to the tower 70. In the illustrated embodiment, an adjustment mechanism 116 (e.g., a nut threadably engaged with a threaded shaft) is operably engaged with the transducer 110 (more particularly the pressurized housing 114) for linearly moving the transducer 110 along the longitudinal axis of the tower 70. Such movement of the transducer 110 is considered advantageous at least because the linear movement of the transducer 110 allows a user to fine-tune or precisely adjust on the standing sonic wave 115 inside of the tower 70. With this adjustment capability, a user of the SSA 12 may adjust the positioning of the standing sonic wave 115 so that the plurality of nodes 115A are positioned directly between each port of the first and second sets of ports 82A, 82B and the plurality of anti-nodes 115B are positioned directly inside of each port of the first and second sets of ports 82A, 82B. The adjustment capability via the adjustment mechanism 116 is helpful when the transducer 110 becomes misaligned causing the plurality of nodes 115A and the plurality of anti-nodes 115B of standing sonic wave 115 to be misaligned with the ports of the first and second sets of ports 82A, 82B.

While the transducer 110 is moveable relative to the tower 70 via the adjustment mechanism 116 described and illustrated herein, any suitable adjustment mechanism may be used to move a transducer relative to a tower. In one exemplary embodiment, a transducer may be moveable relative to a tower via an adjustment mechanism that is manually adjusted for moving the transducer. In another exemplary embodiment, a transducer may be moveable relative to a tower via an adjustment mechanism that is mechanical adjusted via a machine enabled to move the transducer via the adjustment mechanism; examples of suitable machines that are able to move the transducer via the adjustment mechanism include motors, actuators, and other suitable types of machines for moving the transducer.

As illustrated in FIGS. 1B and 3, the transducer 110 may be operatively connected with a generator 118 via an electrical connection or wire 119. The connection between the transducer 110 and the generator 118 allows the transducer 110 to transmit the standing sonic wave 115 inside of the tower 70 for separating and removing simple constituents "S1", "S2" from the fluid stream "LS" flowing in the pressurized chamber 75 of the tower 70. The generator 118 may be any suitable generator that is capable of generating a range of frequencies to cause the separation of simple constituents from a continuous fluid stream inside of a tower. In one exemplary embodiment, a suitable range of frequency generated by a generator for separating simple substances from a continuous fluid stream is a frequency range from about 3 kHz up to about 200 kHz. More particularly, a suitable range of frequency generated by a generator for separating simple substances from a continuous fluid stream is a frequency range from about 10 kHz up to about 40 kHz. Specifically, a suitable range of frequency generated by a generator for separating simple substances from a continuous fluid stream is a frequency range from about 19 kHz up to about 25 kHz.

In the illustrated embodiment, the transducer 110 of the SSA 12 may be constructed of any suitable materials for transmitting a standing sonic wave (such as standing sonic wave 115) inside of the tower 70. In one exemplary embodiment, a transducer of a SSA may be constructed of magnetostrictive-type construction with magnetostrictive materials. In another exemplary embodiment, a transducer of a SSA may be constructed of a electrostrictive-type construction with piezoelectric or electrostrictive materials. In another exemplary embodiment, a transducer of a SSA may be constructed of smart materials. In another exemplary embodiment, a transducer of a SSA may be constructed of ferromagnetic materials.

While the generator 118 is shown being a separate component from the tower 70 and the transducer 110, any suitable configuration may be used between a generator and a tower and a transducer. In one exemplary embodiment, a generator may be operably engaged with a tower of a SSA where the generator is positioned inside of or on the tower.

Referring to FIGS. 1B-3, the SSA 12 also includes a reflector 130. In the illustrated embodiment, the reflector 130 is operably engaged with a top wall 74A of the tower 70 directly opposite to the transducer 110 relative to the longitudinal axis of the tower 70. The reflector 130 is configured to reflect the standing sonic wave 115, transmitted by the transducer 110, back to the transducer 110 along the longitudinal axis of the tower 70. Such reflection creates a mirrored wave inside of the tower 70 in order for the standing sonic wave 115 to be consistent along the entire length of the tower 70 inside of the pressurized chamber 75.

Similar to the transducer 110, the reflector 130 is also moveable relative to the tower 70 via an adjustment mechanism 132 (e.g., a nut threadably engaged with a threaded shaft) operably engaged with the reflector 130. In the illustrated embodiment, the adjustment mechanism 132 is able to linearly move the reflector 130 along the longitudinal axis of the tower 70 similar to the movement of the transducer 110. Such movement of the reflector 130 is considered advantageous at least because the linear movement of the reflector 130 allows a user to fine-tune or precisely adjust on the standing sonic wave 115 inside of the tower 70. With this adjustment capability, a user of the SSA 12 may adjust the positioning of the standing sonic wave 115 so that the plurality of nodes 115A are positioned directly between each port of the first and second sets of ports 82A, 82B and the plurality of anti-nodes 115B are positioned directly inside of each port of the first and second sets of ports 82A, 82B. The adjustment capability via the adjustment mechanism 132 is helpful when the reflector 130 becomes misaligned causing the plurality of nodes 115A and the plurality of anti-nodes 115B of standing sonic wave 115 to be misaligned with the ports of the first and second sets of ports 82A, 82B. As such, the adjustment capability of both the transducer 110 and the reflector 130 provides a user with two independent options in fine tuning and precisely adjusting the standing sonic wave 115 inside of the pressurized chamber 75 due to the transducer 110 and the reflector 130 being independently moveable relative to one another.

Referring to FIGS. 1B through 3, the SSA 12 may also include at least one diaphragm 140. In the illustrated embodiment, a single diaphragm 140 is operably engaged with the tower 70 between the transducer 110 and the reflector 130. The diaphragm 140 is configured to transfer the standing sonic wave 115 between the first stage 72A and the second stage 72B. during a separation operation inside of the tower 70. The use of the diaphragm is considered advantageous at least because a single transducer 110 may only be used in the SSA 12 for generating a standing sonic wave. While the SSA 12 may include at least one diaphragm 140 operably engaged with the tower 70 inside of the pressurized chamber 75 for transferring the standing sonic wave 115 between the first and second stages 72A, 72B, any suitable number of diaphragms may be used for transferring a standing sonic wave between any suitable number of stages included in a tower. As such, the number of diaphragms may be dependent upon the number of stages defined in a tower for a separation operation.

Similar to the transducer 110 and the reflector 130, the diaphragm 140 is also moveable relative to the tower 70 via an adjustment mechanism 142 operably engaged with the diaphragm 140 (see FIG. 3A). In the illustrated embodiment, the adjustment mechanism 142 is able to linearly move the diaphragm 140 along the longitudinal axis of the tower 70 similar to the movement of the transducer 110 and the reflector 130. The adjustment mechanism 142 may allow the diaphragm 140 to be selectively adjustable along the tower 70 for various considerations, including collecting excessive first simple constituents "S1" from the fluid stream "LS" that were not forced through the first set of ports 82A via the standing sonic wave 115, aligning with the standing sonic wave 115 inside of the tower 70, and other various considerations for selectively adjusting the diaphragm 170.

While the diaphragm 140 is moveable along the tower 70 and is selectively adjustable along the tower 70 via the adjustment mechanism 142, any suitable adjustment mechanism may be operably engaged with a diaphragm. In one exemplary embodiment, a mechanical assembly or system may be operably engaged with a diaphragm and a tower of a SSA to allow a user to manually adjust the diaphragm relative to the tower. In another exemplary embodiment, a mechanical assembly or system powered by at least one machine or apparatus may be operably engaged with a diaphragm and a tower of a SSA to allow a user to automatically adjust the diaphragm relative to the tower via inputs placed on the at least one machine or apparatus.

As illustrated in FIG. 3A, an alternative adjusting mechanism 142' may use a first jackscrew assembly 142A' and an opposing second jackscrew assembly 142B' for selectively adjusting an alternative diaphragm 140' substantially similar to the diaphragm 140 described above. In this alternative embodiment, each jackscrew mechanism 143' in the first and second jackscrew assemblies 142A', 142B' is able to incrementally move the diaphragm 140' along the tower 70 relative to the longitudinal axis of the tower 70. Additionally, each jackscrew mechanism 143' in the first and second jackscrew assemblies 142A', 142B' are independently moveable to allow a user to selectively adjust one more of the jackscrew mechanisms 143' based on the misalignment scenario.

Such movement of the diaphragm 140 is considered advantageous at least because the linear movement of the diaphragm 140 allows a user fine-tune or precisely adjust on the standing sonic wave 115 inside of the tower 70. With this adjustment capability, a user of the SSA 12 may adjust the positioning of the standing sonic wave 115 so that the plurality of nodes 115A are positioned directly between each port of the first and second sets of ports 82A, 82B and the plurality of anti-nodes 115B are positioned directly inside of each port of the first and second sets of ports 82A, 82B. The adjustment capability via the adjustment mechanism 142 is helpful when the diaphragm 140 becomes misaligned causing the plurality of nodes 115A and the plurality of anti-nodes 115B of standing sonic wave 115 to be misaligned with the ports of the first and second sets of ports 82A, 82B. As such, the adjustment capability of the transducer 110, the reflector 130, and the diaphragm 140 provides a user with three independent options in fine tuning and precisely adjusting the standing sonic wave 115 inside of the pressurized chamber 75 due to the transducer 110, the reflector 130, and the diaphragm 140 being independently moveable relative to one another.

Having now described the fluid treatment system 1 having at least one SDA 10 and at least one SSA 12, a method of use is described in more detail below.

Upon operation, the continuous fluid stream "LS" is pumped from a contaminated or polluted fluid source (e.g., water stream, pond, lake, ocean, etc.) and into the SDA 10 via the first inlet connection 50A. At this period, the continuous fluid stream "LS" is of a first fluid stream state "LS1" where the first fluid stream state "LS1" includes various types of complex substances and solids (examples of such complex substances and solids are provided above).

Prior to or upon the introduction of the first fluid stream state "LS1" into the SDA 10, the continuous sonic optimization fluid stream "US" is pumped into the pressurized reservoir 22 of the housing 20 via the second inlet connection 50B. The sonic optimization fluid stream "US" is continuously pumped into and out of the pressurized reservoir 22 during operation of the SDA 10 where the pressurized reservoir 22 remains pressurized.

Prior to introduction of the first fluid stream state "LS1" into the SDA 10, the transducer 60 and the generator 66 are activated from an OFF state to an ON state for generating the traveling sonic wave 68 and causing cavitation inside of the housing 20 and the insert 40 subsequent to the introducing of the continuous sonic optimization fluid "US". Upon activation from the OFF state to the ON state, the generator 66 is able to generate and transmit the desired traveling sonic wave 68 frequency to the transducer 60 via the electrical connection 67. Once received, the transducer 60 transmits the traveling sonic wave 68 into the pressurized reservoir 22 of the housing 20 causing the primary cavitation "C1" on the continuous sonic optimization fluid stream "US" shown in FIG. 2. With the assistance of the primary cavitation "C1" in the pressurized reservoir 22, the transducer 60 is able transmit the secondary cavitation "C2" inside of the insert 40 to dissociate various types of complex substances and solids included in the first fluid stream state "LS1", which is described in more detail below.

Once pumped through the first inlet connection 50A, the fluid stream "LS1" passes through the first inlet 44A of the insert 40 and contacts the flow director 48. Upon this contact, the flow director 48 directs the fluid stream "LS1" into a non-laminar flow state when traveling through the fluid passage 42 of the insert 40. As stated previously, the non-laminar flow state caused by the flow director 48 on the fluid stream "LS1" creates a longer dwell time on the fluid stream "LS1" when traveling through fluid passage 42. Such excessive dwell times allows the secondary cavitation "C2" generated by the traveling sonic wave 68 on the fluid stream "LS1" to dissociate and disintegrate the complex substances and solids provided in the fluid stream "LS1". As the fluid stream "LS1" reaches the first outlet 46A of the insert 40, the continuous fluid stream "LS" transitions from the first fluid stream state "LS1" to a second fluid stream state "LS2" including dissociated and disintegrated complex substances and solids. In other words, the fluid stream "LS" in the second fluid stream state "LS2" includes simple constituents from the secondary cavitation "C2" caused on the continuous fluid stream "LS" when passing through the insert 40 and the transducer 60.

Prior to introducing the fluid stream "LS2" into the SSA 12 from the SDA 10, the transducer 110 and the generator 120 are actuated from an OFF state to an ON state for generating the standing sonic wave 115 inside of the pressurized chamber 75 of the housing 70. Upon being actuated from the OFF state to the ON state, the generator 120 is able to generate and transmit the desired standing sonic wave 115 frequency to the transducer 110 via the electrical connection 118. Once received, the transducer 110 transmits the standing sonic wave 115 into the pressurized chamber 75 of the tower 70 along the longitudinal axis of the tower 70. As the standing sonic wave 115 is transmitted from the transducer 110, the standing sonic wave 115 travels through the diaphragm 140 and towards the reflector 130. As the standing sonic wave 115 contacts the reflector 130, the reflector 130 reflects the standing sonic wave 115 back through the diaphragm 140 and to the transducer 110. Such configuration between the transducer 110, the reflector 130, and the diaphragm 140 allows for a uniform standing sonic wave 1116 to continuously transmit through the tower 70 for separating simple substances and solids from the fluid stream "LS2".

Optionally, a user of the SSA 12 may selectively adjust the transducer 110, the reflector 130, and the diaphragm 140 in order for the plurality of anti-nodes 115B of the standing sonic wave 115 to be directly aligned with the first and second sets of ports 82A, 82B of the tower 70. As illustrated in FIGS. 3 and 4A-4B, at least one of the transducer 110, the reflector 130, and the diaphragm 140 may be selectively adjusted by the user so that the plurality of anti-nodes 115B are aligned with the first set of ports 82A in the first stage 72A of the tower 70 and/or aligned with the second set of ports 82A in the second stage 72B of the tower 70. As such, a user may cause at least one of the transducer 110, the reflector 130, and the diaphragm 140 to be linearly moved along the tower 70 relative to the longitudinal axis of the tower 70 until the plurality of anti-nodes 115B of the standing sonic wave 115 is directly aligned with the first and second sets of ports 82A, 82B of the tower 70.

Once the standing sonic wave 115 is generated inside of the tower 70, the fluid stream "LS2" may be pumped from the fluid passage 42 of the insert 40 of the SDA 10 and into the pressurized chamber 75 of the tower 70 via the first and second inlet connection 80 being in fluid communication with the insert 40 and the tower 70. As the fluid stream "LS2" is pumped into the pressurized chamber 75 of the tower 70, the fluid stream "LS2" flows towards the diaphragm 140 in the first stage 72A. As the fluid stream "LS2" travels through the pressurized chamber 75, the plurality of anti-nodes 115B of the standing sonic wave 115 force the first plurality of constituents "S1" of the fluid stream "LS2" into the first set of ports 82A.

As illustrated in FIGS. 1B, 3, and 4A, the first set of shutters 90A are provided in the uncovered position in which the first set of shutters 90A are completely removed away from the first set of ports 82A and the first set of passageways 85A. In this position, the first set of shutters 90A creates the greatest amount of flow through the first set of ports 82A the first set of passageways 85A in the tower 70 for removing the largest volume of first plurality of constituents "51" and effluent fluid. As discussed above, the first set of shutters 90A may be positioned at any suitable position between the covered position (see FIG. 1A) and the uncovered position (FIGS. 1B, 3, and 4A) for a desired flow rate of effluent fluid and the first plurality of constituents "51." Once the first plurality of constituents "51" passes through the first set of ports 82A, the first plurality of constituents "51" passes through the first set of passageways 85A and into the first effluent outlet 86A. The first plurality of constituents "51", along with effluent fluid, is outputted to an output container or facility via the first effluent outlet connection 88A.

Upon the separation of the first plurality of constituents "51" from the fluid stream "LS2", the fluid stream "LS" transitions from the second fluid stream state "LS2" to a third fluid stream state "LS3" as the fluid stream "LS" is pumped from the first stage 72A to the second stage 72B via one of both of the first and second transfer connections 94A, 94B. Once pumped into the second stage 72B, the fluid stream "LS3" flows away from the diaphragm 140 and towards the reflector 130. As the fluid stream "LS3" travels through the pressurized chamber 75 in the second stage 72B of the tower 70, the plurality of anti-nodes 115B of the standing sonic wave 115 force the second plurality of constituents "S2" of the fluid stream "LS3" into the second set of ports 82B substantially similar to the first plurality of constituents "S1" of the fluid stream "LS2" into the first set of ports 82A.

As illustrated in FIGS. 1B, 3, and 4B, the second set of shutters 90B are provided in the uncovered position in which the second set of shutters 90B are completely removed from the second set of ports 82B and the second set of passageways 85B. In this position, the second set of shutters 90B creates the greatest amount of flow through the second set of ports 82B in the tower 70 for removing the largest volume of second plurality of constituents "S2" and effluent fluid. As discussed above, the second set of shutters 90B may be positioned at any suitable position between the covered position (see FIG. 1A) and the uncovered position (FIGS. 1B, 3, and 4B) for a desired flow rate of effluent fluid and the second plurality of constituents "S2." Once the second plurality of constituents "S2" passes through the second set of ports 82B, the second plurality of constituents "S2" passes through the second set of passageways 85B and into the second effluent outlet 86B. The second plurality of constituents "S2", along with effluent fluid, is outputted to an output container or facility via the second effluent outlet connection 88B.

Once the second plurality of constituents "S2" is separated from the third fluid stream state "LS3" in the second stage 72B, the fluid stream "LS" transitions from the third fluid stream state "LS3" to a fourth fluid stream state "LS4". Here, the fluid stream "LS4" is separated from first and second pluralities of constituents S1"," "S2" where the fluid stream "LS4" is substantially free of substances and solids and is considered a cleaned fluid. Upon this separation, the fluid stream "LS4" escapes around the reflector 130 and moves towards the at least one cleaned fluid outlet 96. The fluid stream "LS4" is then pumped to a clean fluid output container or facility, via the at least one cleaned fluid outlet connection 98, from the tower 70.

The method of cleaning a fluid stream, such as fluid stream "LS", may be repeated for continuously dissociating complex substances in the fluid stream, via at least one SDA 10, and separating the dissociated complex substances from the fluid stream, via at least one SSA 12.

Figure 5A:
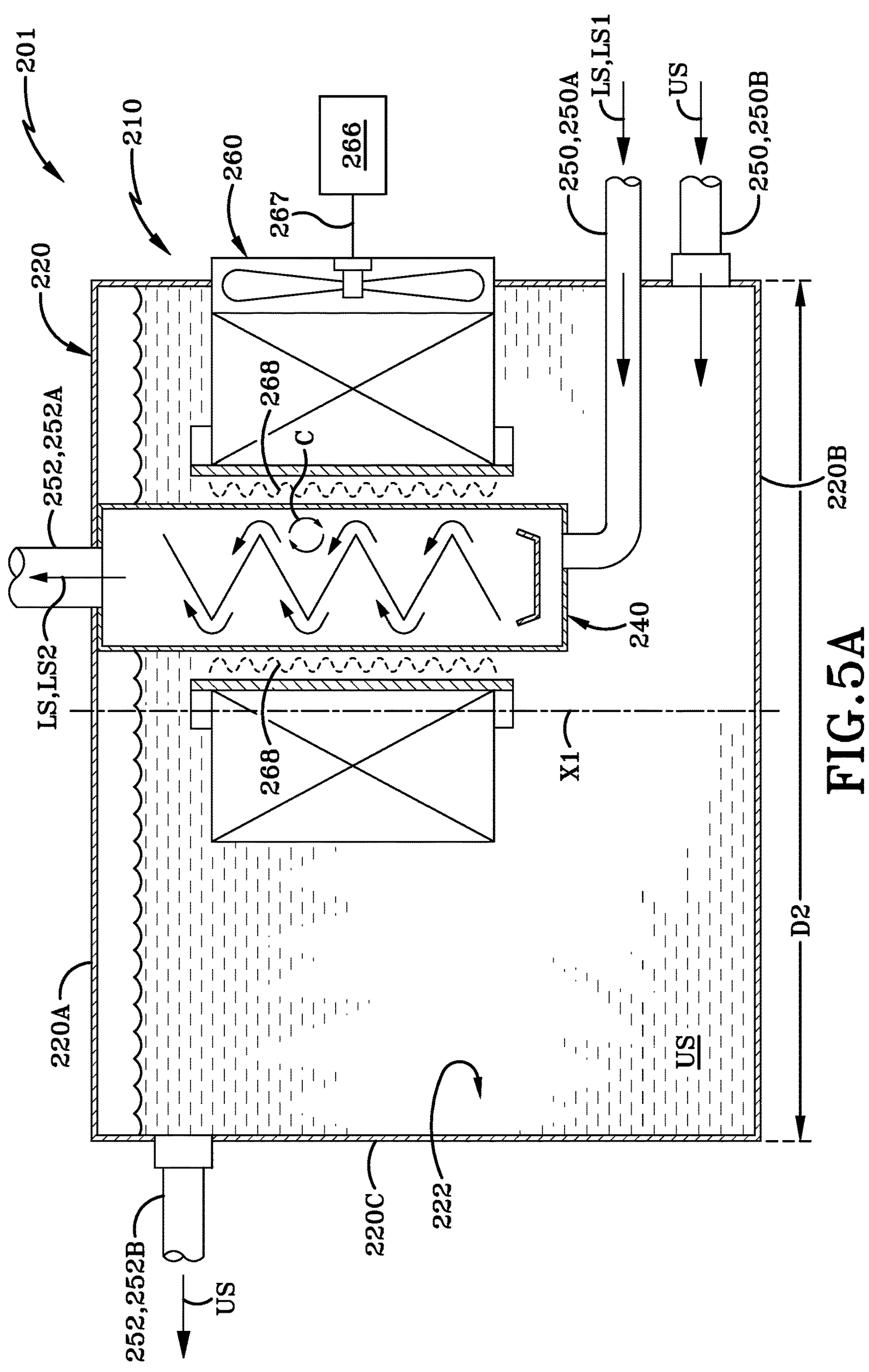
FIG. 5A is a diagrammatic sectional view of an alternative SDA of another fluid cleaning system.

FIG. 5A illustrates another fluid treatment system 201 having at least one SDA 210. The SDA 210 is substantially similar to the SDA 10 of the fluid treatment system 1 described above and illustrated in FIGS. 1A-1B, 2A, and 3, expect as detailed hereinafter. The SDA 210 includes a housing 220, at least one insert 240 operably engaged with the housing 220, at least one inlet connection 250 operably engaged with the housing 220 and/or insert 240 for delivering a continuous fluid stream "LS" or a continuous sonic optimization fluid stream "US" into the housing 220 and/or insert 240 for dissociation operations, at least one outlet connection 252 operably engaged with the housing 220 and/or insert 240 for delivering a continuous fluid stream "LS" or a continuous sonic optimization fluid stream "US" from the housing 220 and/or insert 240 subsequent dissociation operations, and a transducer 260 operably engaged inside of the housing 220 disposed about the insert 240.

It should be understood that FIG. 5A is diagrammatic only for the SDA 210 and does not illustrate exact and precise dimensions of any component or assembly of the SDA 210 provided herein. Such diagrammatic illustrations of the SDA 210 shown in FIG. 5A should not limit the exact positioning, orientation, or location of the SDA 210.

As illustrated in FIG. 5A, the housing 220 has a first or top wall 220A, an opposing second or bottom wall 220B, and a longitudinal axis "X1" defined therebetween. The housing 220 also includes a circumferential wall 220C that extends between the top wall 220A and the bottom wall 220B along an axis parallel with the longitudinal axis "X1" of housing 220. The circumferential wall 220C also defines a diameter or width "D2" as shown in FIG. 5A. The diameter "D2" of the housing 220 is greater than the diameter "D1" of the housing 20 of the SDA 10 described above and illustrated in FIG. 2. The larger diameter "D2" of the housing 220 is considered advantageous at least because the large diameter "D2" allows for more space for the transducer 260 to generate uniform cavitation inside of the housing 220 for dissociating complex substances and solids found in the continuous contaminated fluid stream "LS".

Figure 5B:
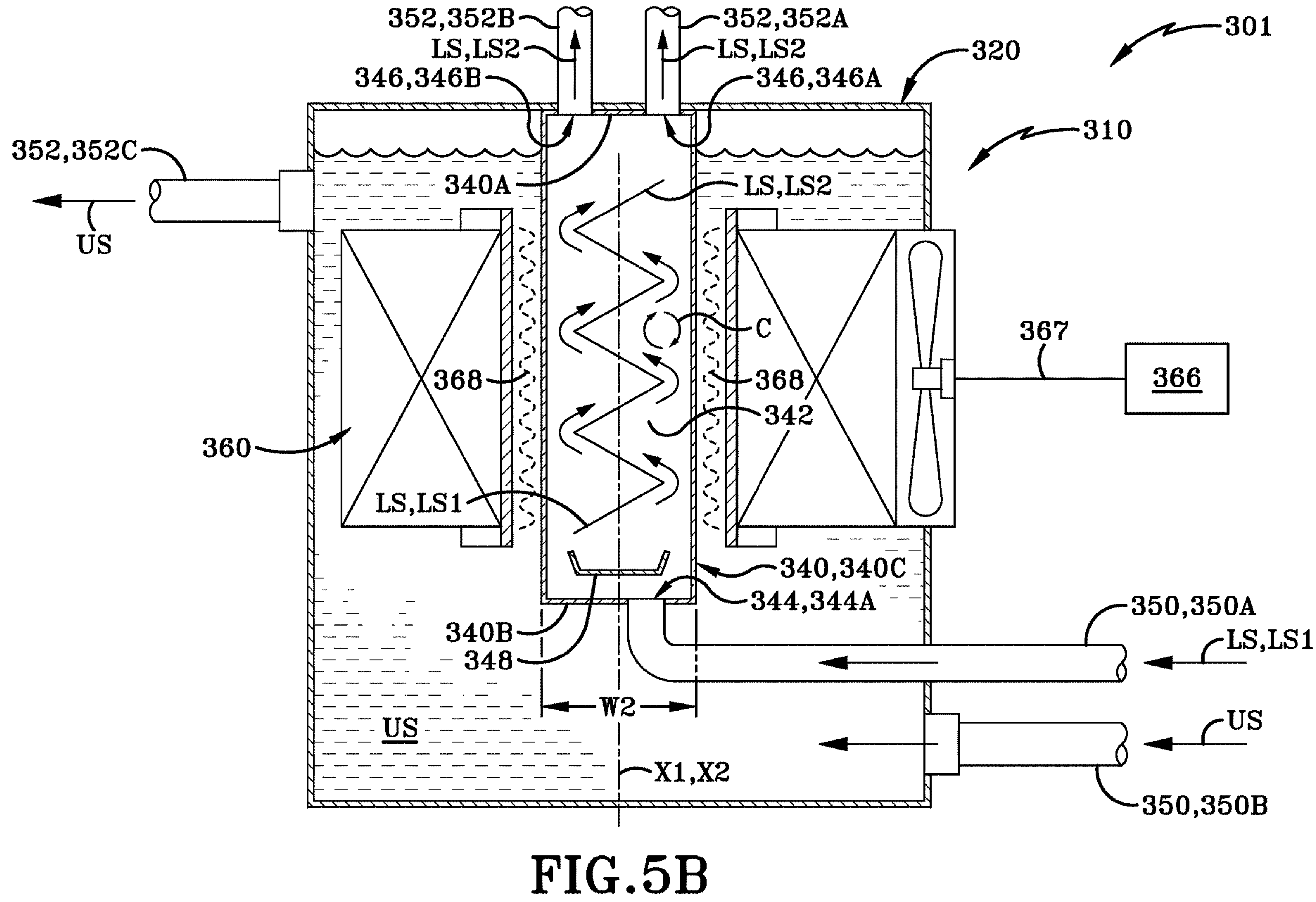
FIG. 5B is a diagrammatic sectional view of an alternative SDA of another fluid cleaning system.

FIG. 5B illustrates another fluid treatment system 301 having at least one SDA 310. The SDA 310 is substantially similar to the SDAs 10, 210 of the fluid treatment systems 1, 201 described above and illustrated in FIGS. 1A-1B, 2, 3, and 5A expect as detailed hereinafter. The SDA 310 includes a housing 320, at least one insert 340 operably engaged with the housing 320, at least one inlet connection 350 operably engaged with the housing 310, at least one outlet connection 352 operably engaged with the housing 310, and a transducer 360 operably engaged inside of the housing 320 disposed about the insert 340 and operatively connected with a generator 366, via an electrical connection 367, to generate a traveling sonic wave 368.

It should be understood that FIG. 5B is diagrammatic only for the SDA 310 and does not illustrate exact and precise dimensions of any component or assembly of the SDA 310 provided herein. Such diagrammatic illustrations of the SDA 310 shown in FIG. 5B should not limit the exact positioning, orientation, or location of the SDA 310.

As illustrated in FIG. 5B, the SDA 10 includes a single insert 340 to help isolate dissociation and disintegration of complex substances and solids into simple constituents. The insert 340 includes a first or upper wall 340A, an opposing second or bottom wall 340B, and a longitudinal axis "X2" defined therebetween. As shown in FIG. 5B, the longitudinal axis "X2" of the insert 340 is parallel with a longitudinal axis "X1" of the housing 320. The insert 340 also includes a peripheral wall 340C that extends between the upper wall 340A and the lower wall 340B along an axis parallel with the longitudinal axis "X2" of insert 340. The peripheral wall 340C also defines a diameter or width "W2" as shown in FIG. 5B. In the illustrated embodiment, the insert 340 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIG. 5B, a fluid passage 342 is collectively defined by the upper wall 340A, the lower wall 340B, and the peripheral wall 340C of the insert 340. The fluid passage 342 is accessible via at least one inlet opening 344 and at least one outlet opening 346. In the illustrated embodiment, the fluid passage 342 is accessible via an inlet opening 344A defined in the lower wall 340B of the insert 340. The fluid passage 342 is also accessible via a first outlet 346A defined in the upper wall 340A of the insert 340 and an adjacent second outlet 346B defined in the upper wall 340A relative to the upper wall 340A. Such uses of the inlet opening 344A and the first and second outlet openings 346A, 346B are described in more detail below.

While the first inlet 344A is defined in the lower wall 340B of the insert 340 and the first and second outlets 346A, 346B are defined in the upper wall 340A, a first inlet and first and second outlets of an insert may be defined in any portion of the insert. In one exemplary embodiment, a first inlet and first and second outlets of an insert may both be defined in a bottom wall of the insert. In another exemplary embodiment, a first inlet and first and second outlets of an insert may both be defined in a top wall of the insert. In another exemplary embodiment, a first inlet and first and second outlets of an insert may both be defined in a peripheral wall of the insert. In another exemplary embodiment, a first inlet of an insert may be defined in one of first, second, and third walls of the insert, a first outlet of an insert may be defined in one of first, second, and third walls of the insert, and a second outlet of an insert may be defined in one of first, second, and third walls of the insert.

Still referring to FIG. 5B, the insert 340 may also include a flow director or baffle 348. The flow director 348 is operably engaged with the peripheral wall 340C of the insert 340 proximate to the lower wall 340B and the first inlet 344A of the insert 340. As described in more detail below, the flow director 348 creates a specific flow to a continuous fluid stream that is pumped into the insert 340; the flow director 348 in this embodiment creates a non-laminar flow pattern on the continuous fluid stream.

While a single flow director 348 is provided with the insert 340, any suitable number of flow directors may be installed in an insert for various considerations, including the desired dwell time of the continuous fluid stream inside of the insert, the intensity and desired turbulence of a continuous fluid stream, and other various considerations. While a flow director 348 is positioned proximate to the first inlet 344A of the insert 340, a flow director may be positioned along any suitable position inside of an insert for various considerations, including the desired dwell time of the continuous fluid stream inside of the insert, the intensity and desired turbulence of a continuous fluid stream, and other various considerations.

Still referring to FIG. 5B, the at least one inlet connection 350 may be operably engaged with the housing 320 and/or insert 340 for delivering a continuous fluid stream "LS" or a continuous sonic optimization fluid stream "US" for dissociation purposes. In the illustrated embodiment, a first inlet connection 350A is operably engaged with the housing 320 (substantially similar to the first inlet connection 50A and housing 20 described above) and operably engaged with the insert 340 via the first inlet opening 344A. As shown in FIG. 5B, the first inlet connection 350A is configured to direct the continuous fluid stream "LS" from a fluid source (i.e., a body of water or fluid) and into the fluid passage 342 of the insert 340 via the fluid communication between the first inlet connection 350A and the insert 340. In addition, a second inlet connection 350B is operably engaged with the housing 320 via the second inlet 326A. As shown in FIG. 5B, the second inlet connection 350B is configured to direct the continuous sonic optimization fluid stream "US" from a sonic optimization fluid source into the housing 320 via the fluid communication between the second inlet connection 350B and the housing 320 (substantially similar to the housing 20 described above). The first inlet connection 350A isolates the continuous fluid stream "LS" from the continuous sonic optimization fluid stream "US" pumped into the housing 320 to prevent any mixing of or interaction between the continuous fluid stream "LS" and the continuous sonic optimization fluid stream "US" during a solids dissociation process as described above.

Still referring to FIG. 5B, at least one outlet connection 352 may be operably engaged with the housing 320 and/or insert 340 for delivering a continuous fluid stream "LS" with dissociated substances and/or solids or delivering a continuous sonic optimization fluid stream "US" from the housing 320 for dissociation purposes. In the illustrated embodiment, a first outlet connection 352A is operably engaged with the housing 320 (substantially similar to the first outlet connection 52A and housing 20 described above) and operably engaged with the insert 340 via the first outlet opening 346A. As shown in FIG. 5B, the first outlet connection 352A is configured to direct the continuous fluid stream "LS" with dissociated substances and/or solids (i.e., simple constituents) from the fluid passage 342 of the insert 340 to a first output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be another solids dissociation apparatus, such as SDA 10, SDA 210, or SDA 310, or other suitable SDAs described herein for providing another process of dissociation.

Additionally, a second outlet connection 352B is operably engaged with the housing 320 (substantially similar to the first outlet connection 52A and housing 20 described above) and operably engaged with the insert 340 via the second outlet opening 346B. As shown in FIG. 5B, the second outlet connection 352B is configured to direct the continuous fluid stream "LS" with dissociated substances and/or solids (i.e., simple constituents) from the fluid passage 342 of the insert 340 to a second output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be another solids dissociation apparatus, such as SDA 10, SDA 210, or SDA 310, or other suitable SDAs described herein, for providing another process of dissociation.

The configuration of the insert 340 with the first and second outlet connections 352A, 352B, via the first and second outlets 346A, 346B, is considered advantageous at least because the fluid stream "LS" with dissociated substances and solids may be outputted to different devices and apparatuses for various fluid cleaning operations. In one instance, the first and second outlet connections 352A, 352B may be in fluid communication with first and second SSAs, such as SSA 12, to allow for more than one SSA to separate dissociated substances from the fluid stream "LS" in the fluid treatment system 301. In another instance, the first outlet connection 352A may be in fluid communication with a SSA, such as SSA 12, to separate dissociated substances from the fluid stream "LS" in the fluid treatment system 301, and the second outlet connection 352B may be in fluid communication with another SDA, such as SDA 10, SDA 210, or SDA 310, to provide further dissociation of the dissociated substances in the fluid stream "LS" in the fluid treatment system 301.

Still referring to FIG. 5B, a third outlet connection 352C is operably engaged with the housing 320 (substantially similar to the second outlet connection 52B operably engaged with the housing 20). The third outlet connection 352C is configured to direct the continuous sonic optimization fluid stream "US" from the housing 320 to a sonic optimization fluid output device or to the original sonic inlet device. Such pumping and removing of sonic optimization fluid "US" allows for a continuous flow of sonic optimization fluid into the housing 320 for adequate generation of sonic waves during dissociation processes, which is described in more detail below.

Figure 5C:
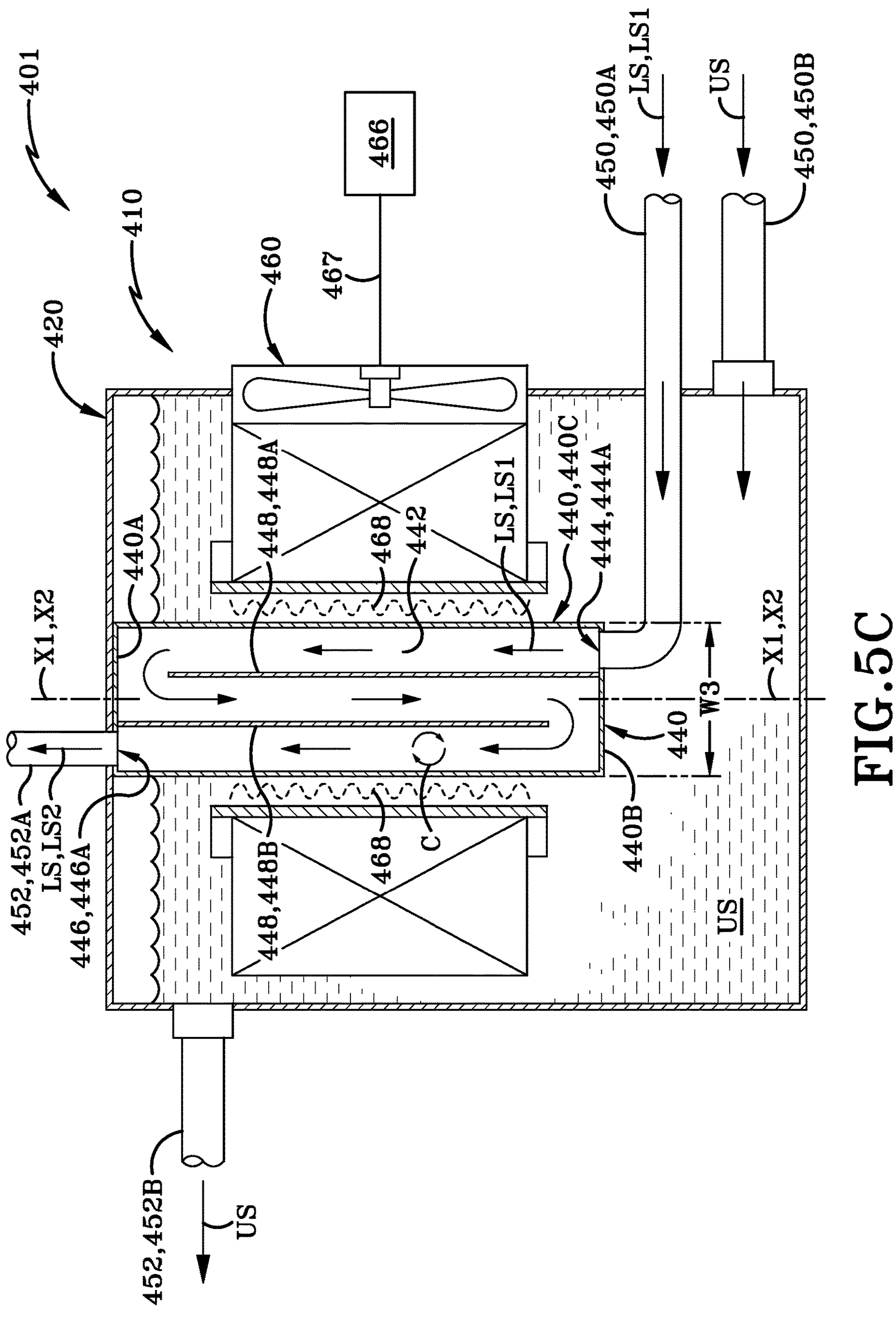
FIG. 5C is a diagrammatic sectional view of an alternative SDA of another fluid cleaning system.

FIG. 5C illustrates another fluid treatment system 401 having at least one SDA 410. The SDA 410 is substantially similar to the SDAs 10, 210, 310 of the fluid treatment systems 1, 201, 301 described above and illustrated in FIGS. 1A-1B, 2, 3, and 5A-5B expect as detailed hereinafter. The SDA 410 includes a housing 420, at least one insert 440 operably engaged with the housing 420, at least one inlet connection 450 operably engaged with the housing 410, at least one outlet connection 452 operably engaged with the housing 410, and a transducer 460 operably engaged inside of the housing 420 disposed about the insert 440 and operatively connected with a generator 466, via an electrical connection 467, to generate a traveling sonic wave 468.

It should be understood that FIG. 5C is diagrammatic only for the SDA 410 and does not illustrate exact and precise dimensions of any component or assembly of the SDA 410 provided herein. Such diagrammatic illustrations of the SDA 410 shown in FIG. 5C should not limit the exact positioning, orientation, or location of the SDA 410.

As illustrated in FIG. 5C, the SDA 410 includes a single insert 440 to help isolate dissociation and disintegration of complex substances and solids. The insert 440 includes a first or upper wall 440A, an opposing second or bottom wall 440B, and a longitudinal axis "X2" defined therebetween. As shown in FIG. 5C, the longitudinal axis "X2" of the insert 440 is parallel with a longitudinal axis "X1" of the housing 420. The insert 440 also includes a peripheral wall 440C that extends between the upper wall 440A and the lower wall 440B along an axis parallel with the longitudinal axis "X2" of insert 440. The peripheral wall 440C also defines a diameter or width "W3" as shown in FIG. 5C; the width "W3" of the insert 440 is equal to the widths "W1", "W2" of the inserts 240, 340 of the SDA 210, 310 described and illustrated herein. In the illustrated embodiment, the insert 440 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIG. 5C, a fluid passage 442 is collectively defined by the upper wall 440A, the lower wall 440B, and the peripheral wall 440C of the insert 440. The fluid passage 442 is accessible via at least one inlet opening 444 and at least one outlet opening 446. In the illustrated embodiment, the fluid passage 442 is accessible via a first inlet opening 444A defined in the lower wall 440B of the insert 440. The fluid passage 442 is also accessible via a first outlet 446A defined in the upper wall 440A of the insert 440. Such uses of the first inlet opening 444A and the first outlet opening 446A are described in more detail below.

While the first inlet 444A is defined in the lower wall 440B of the insert 440 and the first outlet 446A is defined in the upper wall 440A, a first inlet and a first outlet of an insert may be defined in any portion of the insert. In one exemplary embodiment, a first inlet and a first outlet of an insert may both be defined in a bottom wall of the insert. In another exemplary embodiment, a first inlet and a first outlet of an insert may both be defined in a top wall of the insert. In another exemplary embodiment, a first inlet and a first outlet of an insert may both be defined in a peripheral wall of the insert. In another exemplary embodiment, a first inlet of an insert may be defined in one of first, second, and third walls of the insert and a first outlet of an insert may be defined in one of first, second, and third walls of the insert.

Still referring to FIG. 5C, the insert 440 may also include at least one flow director or baffle 448. The at least one flow director 448 of the insert 440 is different than the flow directors 48, 348 of the inserts 40, 340 described above. In the illustrated embodiment, a first flow director 448A operably engages with the lower wall 440B of the insert 440 and extends upwardly away from the lower wall 440B towards the upper wall 440A. A second flow director 448B is operably engaged with the upper wall 440A of the insert 440 and extends downwardly away from the upper wall 440A towards the lower wall 440B. The first and second flow directors 448A, 448B collectively define a flow path 448C inside of the insert 440 where the flow path 448C provides the fluid stream "LS" in a laminar flow state. The configurations of the flow directors 448A, 448B are considered advantageous at least because the flow directors 448A, 448B extend the dwell time of the fluid stream "LS" inside of the insert 440 so that the fluid stream "LS" may experience a desired amount of cavitation inside of the insert 440. Such extended dwell time inside of insert 440 may allow for a greater occurrence of dissociation for the complex substances present in the fluid stream "LS".

While two flow directors 448A, 448B are provided with the insert 440, any suitable number of flow directors may be installed with an insert for various considerations, including the intensity and desired turbulence of a continuous fluid stream. While the first and second flow directors 448A, 448B are oriented on axes parallel with the longitudinal axis "X2" of the insert, any flow director may be oriented at any suitable angle or position inside of an insert for various considerations, including the intensity and desired turbulence of a continuous fluid stream. In one exemplary embodiment, first and second flow directors may be oriented on axes orthogonal to a longitudinal axis of an insert. In another exemplary embodiment, a first flow director may be oriented on an axis parallel to a longitudinal axis of an insert, and a second flow director may be oriented on an axis orthogonal to the longitudinal axis of the insert. In another exemplary embodiment, a first flow director may be oriented on a first axis measured at a first angle relative to a longitudinal axis of an insert, and a second flow director may be oriented on a second axis measured at a second angle measured relative to the longitudinal axis of the insert where the first and second angle are different from one another.

Figure 5D:
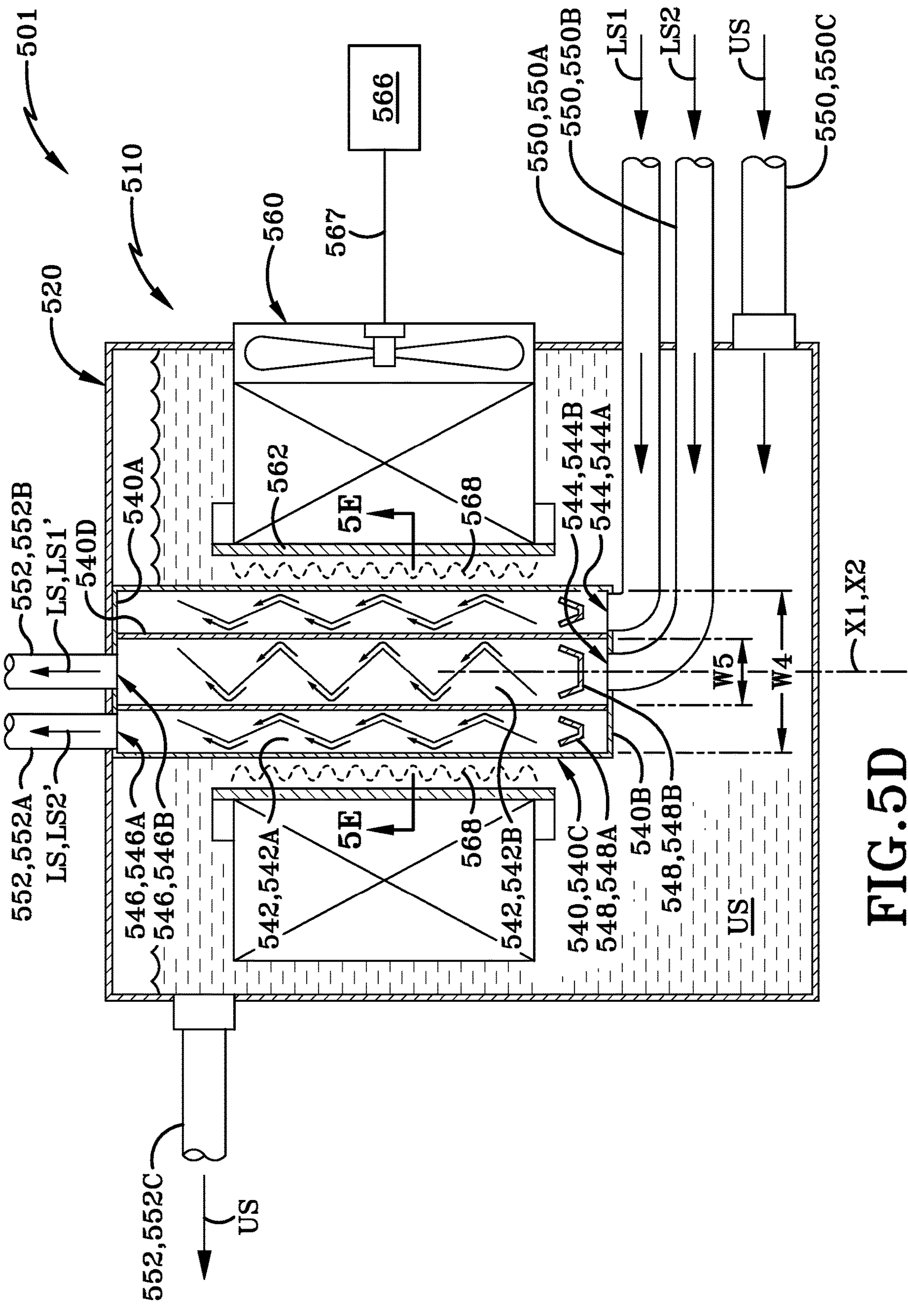
FIG. 5D is a diagrammatic sectional view of an alternative SDA of another fluid cleaning system.
Figure 5E:
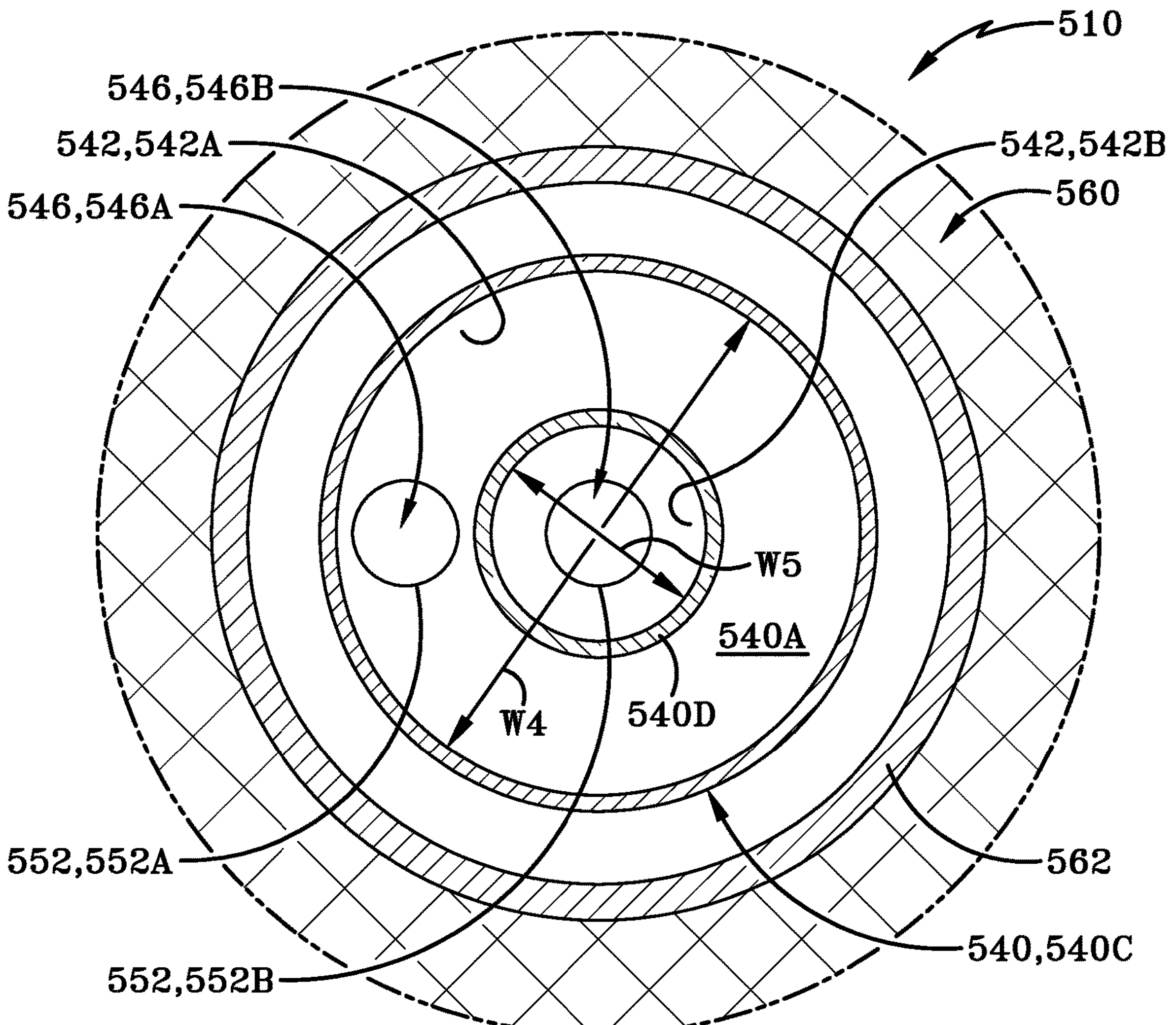
FIG. 5E is a diagrammatic cross-section view of the alternative SDA shown in FIG. 5D taken in the direction of line 5E-5E in FIG. 5D.

FIGS. 5D-5E illustrate another fluid treatment system 501 having at least one SDA 510. The SDA 510 is substantially similar to the SDAs 10, 210, 310, 410 of the fluid treatment systems 1, 201, 301, 401 described above and illustrated in FIGS. 1A-1B, 2, 3, and 5A-5C expect as detailed hereinafter. The SDA 510 includes a housing 520, at least one insert 540 operably engaged with the housing 520, at least one inlet connection 550 operably engaged with the housing 510, at least one outlet connection 552 operably engaged with the housing 510, and a transducer 560 operably engaged inside of the housing 520 disposed about the insert 540 and operatively connected with a generator 566, via an electrical connection 567, to generate a traveling sonic wave 568.

It should be understood that FIGS. 5D-5E are diagrammatic only for the SDA 510 and does not illustrate exact and precise dimensions of any component or assembly of the SDA 510 provided herein. Such diagrammatic illustrations of the SDA 510 shown in FIGS. 5D-5E should not limit the exact positioning, orientation, or location of the SDA 510.

As illustrated in FIG. 5D, the SDA 10 includes a single insert 540 to help isolate dissociation and disintegration of complex substances and solids. The insert 540 includes a first or upper wall 540A, an opposing second or bottom wall 540B, and a longitudinal axis "X2" defined therebetween. As shown in FIGS. 5D-5E, the longitudinal axis "X2" of the insert 540 is parallel with a longitudinal axis "X1" of the housing 520. The insert 540 also includes a first or outer peripheral wall 540C that extends between the upper wall 540A and the lower wall 540B along an axis parallel with the longitudinal axis "X2" of the insert 540. The outer peripheral wall 540C also defines a diameter or width "W4" as shown in FIG. 5E. The insert 540 also includes a second or inner peripheral wall 540D that extends between the upper wall 540A and the lower wall 540B along an axis parallel with the longitudinal axis "X2" of the insert 540. The inner peripheral wall 540D is positioned interior to the outer peripheral wall 540D of the insert 540. The inner peripheral wall 540D also defines a diameter or width "W5" as shown in FIG. 5E; the width "W5" defined by the inner peripheral wall 540D is less than the width "W4" defined by the outer peripheral wall 540C. In the illustrated embodiment, the insert 540 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIGS. 5D-5E, a first or outer fluid passage 542A is collectively defined by the upper wall 540A, the lower wall 540B, and the outer peripheral wall 540C of the insert 540. Additionally, a second or inner fluid passage 542B is collectively defined by the upper wall 540A, the lower wall 540B, and the inner peripheral wall 540D of the insert 540. The outer and inner fluid passages 542A, 542B are accessible via at least one inlet opening 344 and at least one outlet opening 346. In the illustrated embodiment, the outer fluid passage 542A is accessible via a first inlet opening 544A defined in the lower wall 540B of the insert 540. The outer fluid passage 542A is also accessible via a first outlet opening 546A defined in the upper wall 540A of the insert 540. Additionally, the inner fluid passage 542B is accessible via a second inlet opening 544B defined in the lower wall 540B of the insert 540. The inner fluid passage 542B is also accessible via a second outlet opening 546B defined in the upper wall 540A of the insert 540.

While the first and second inlets 544A, 544B are defined in the lower wall 540B of the insert 540 and the first and second outlets 546A, 546B is defined in the upper wall 340A, first and second inlets and first and second outlets of an insert may be defined in any portion of the insert.

Still referring to FIGS. 5D-5E, the insert 540 may also include at least one flow director or baffle 548. In the illustrated embodiment, a first flow director 548A is operably engaged with the outer peripheral wall 540C of the insert 540 proximate to the lower wall 540B and the first inlet 544A of the insert 540. Additionally, a second flow director 548B is operably engaged with the inner peripheral wall 540D of the insert 540 proximate to the lower wall 540B and the second inlet 544B of the insert 540. Each of the first and second flow directors 548A, 548B create a specific flow to first and second continuous fluid streams "LS1", "LS2" that are pumped into the insert 540; the first and second flow directors 548A, 548B in this embodiment create non-laminar flow patterns on the first and second continuous fluid streams "LS1", "LS2". In other exemplary embodiments, flow directors or baffles may be omitted from an insert.

While a single flow director 548A, 548B is provided inside each fluid passage 542A, 542B, any suitable number of flow directors may be installed in a fluid passage of an insert for various considerations, including the desired dwell time of the continuous fluid stream inside of the insert, the intensity and desired turbulence of a continuous fluid stream, and other various considerations. While the first and second flow directors 548A, 542A are positioned proximate to the first and second inlet openings 544A, 544B of the insert 540, flow directors may be positioned along any suitable position inside of an insert for various considerations, including the desired dwell time of the continuous fluid stream inside of the insert, the intensity and desired turbulence of a continuous fluid stream, and other various considerations.

Still referring to FIG. 5D-5E, the at least one inlet connection 550 may be operably engaged with the housing 520 and/or insert 540 for delivering a continuous fluid stream "LS" or a continuous sonic optimization fluid stream "US" for dissociation purposes. As illustrated in FIG. 5D, a first inlet connection 550A is operably engaged with the housing 520 (substantially similar to the first inlet connection 50A and housing 20 described above) and operably engaged with the insert 540 via the first inlet opening 544A. As shown in FIG. 5D, the first inlet connection 550A is configured to direct the first continuous fluid stream "LS1" from a fluid source (i.e., a body of water or fluid) and into the outer fluid passage 542A of the insert 540 via the fluid communication between the first inlet connection 550A and the insert 540. As illustrated in FIG. 5D, a second inlet connection 550B is operably engaged with the housing 520 and operably engaged with the insert 540 via the second inlet opening 544B. As shown in FIG. 5D, the second inlet connection 550B is configured to direct the second continuous fluid stream "LS2" from a fluid source (i.e., a body of water or fluid) or another device in the fluid treatment system 501 (such as a SSA described herein or another SDA 510 or similar SDA described herein) and into the inner fluid passage 542B of the insert 540 via the fluid communication between the second inlet connection 550B and the insert 540.

In addition, a third inlet connection 550C is operably engaged with the housing 320 (substantially similar to the engagement between the second inlet connection 50B and housing 20 described above). As shown in FIG. 5D, the third inlet connection 550C is configured to direct and/or pump the continuous sonic optimization fluid stream "US" from a sonic optimization fluid source into the housing 520 via the fluid communication between the third inlet connection 550C and the housing 520 (substantially similar to the housing 20 described above).

With these configurations, the first and second inlet connections 550A, 550B isolate the first and second continuous fluid streams "LS1", "LS2" from the continuous sonic optimization fluid stream "US" pumped into the housing 520. Such configuration prevents any mixing of or interaction between first and second continuous fluid streams "LS1", "LS2" and the continuous sonic optimization fluid stream "US" during a solids dissociation process as described above in previous solids dissociation processes.

Referring to FIGS. 5D-5E, at least one outlet connection 552 may be operably engaged with the housing 520 and/or insert 540 for delivering a continuous fluid stream "LS" with dissociated substances and/or solids or delivering a continuous sonic optimization fluid stream "US" from the housing 520 for dissociation purposes. In the illustrated embodiment, a first outlet connection 552A is operably engaged with the housing 520 (substantially similar to the first outlet connection 52A and housing 20 described above) and operably engaged with the insert 540 via the first outlet opening 546A. As shown in FIG. 5D, the first outlet connection 552A is configured to direct the first continuous fluid stream "LS1" with dissociated substances and/or solids from the outer fluid passage 542A of the insert 540 to a first output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be another solids dissociation apparatus, such as SDA 10, SDA 210, SDA 310, SDA 410, SDA 510, or other SDAs described and illustrated herein, for providing another process of dissociation.

Additionally, a second outlet connection 552B is operably engaged with the housing 520 (substantially similar to the first outlet connection 52A and housing 20 described above) and operably engaged with the insert 540 via the second outlet opening 546B. As shown in FIG. 5D, the second outlet connection 552B is configured to direct the second continuous fluid stream "LS2" with dissociated substances and/or solids from the inner fluid passage 542B of the insert 540 to a second output device. In one exemplary embodiment, an output device may be a solids separation apparatus, such as SSA 12 or other SSA described and illustrated herein, for separating the dissociated substances and/or solids from the continuous fluid stream for purification/cleaning purpose. In another exemplary embodiment, an output device may be another solids dissociation apparatus, such as SDA 10, SDA 210, SDA 310, SDA 410, SDA 510, or other SDAs described and illustrated herein, for providing another process of dissociation.

The configuration of the insert 540 with the first and second outlet connections 552A, 552B, via the first and second outlets 546A, 546B, is considered advantageous at least because the first and second continuous fluid stream "LS1", "LS2" with dissociated substances and solids may be outputted to different devices and apparatuses for various fluid cleaning operations. In one instance, the first and second outlet connections 552A, 552B may be in fluid communication with first and second SSAs, such as SSA 12, to allow for more than one SSA to separate dissociated substances from the first and second continuous fluid streams "LS1", "LS2" in the fluid treatment system 501. In another instance, the first outlet connection 552A may be in fluid communication with a SSA, such as SSA 12, to separate dissociated substances from the first continuous fluid stream "LS1" in the fluid treatment system 501, and the second outlet connection 552B may be in fluid communication with another SDA, such as SDA 10, SDA 210, SDA 310, SDA 410, or SDA 510, or other SDAs described and illustrated herein, to provide further dissociation of the dissociated substances in the second continuous fluid stream "LS2" in the fluid treatment system 501.

Referring to FIG. 5D, a third outlet connection 552C is operably engaged with the housing 520 (substantially similar to the second outlet connection 52B operably engaged with the housing 20). The third outlet connection 552C is configured to direct and/or pump the continuous sonic optimization fluid stream "US" from the housing 520 to a sonic optimization fluid output device or to the original sonic inlet device. Such pumping and removing of sonic optimization fluid "US" allows for a continuous flow of sonic optimization fluid into the housing 520 for adequate generation of sonic waves during dissociation processes, which are described in more detail below.

Figure 5F:
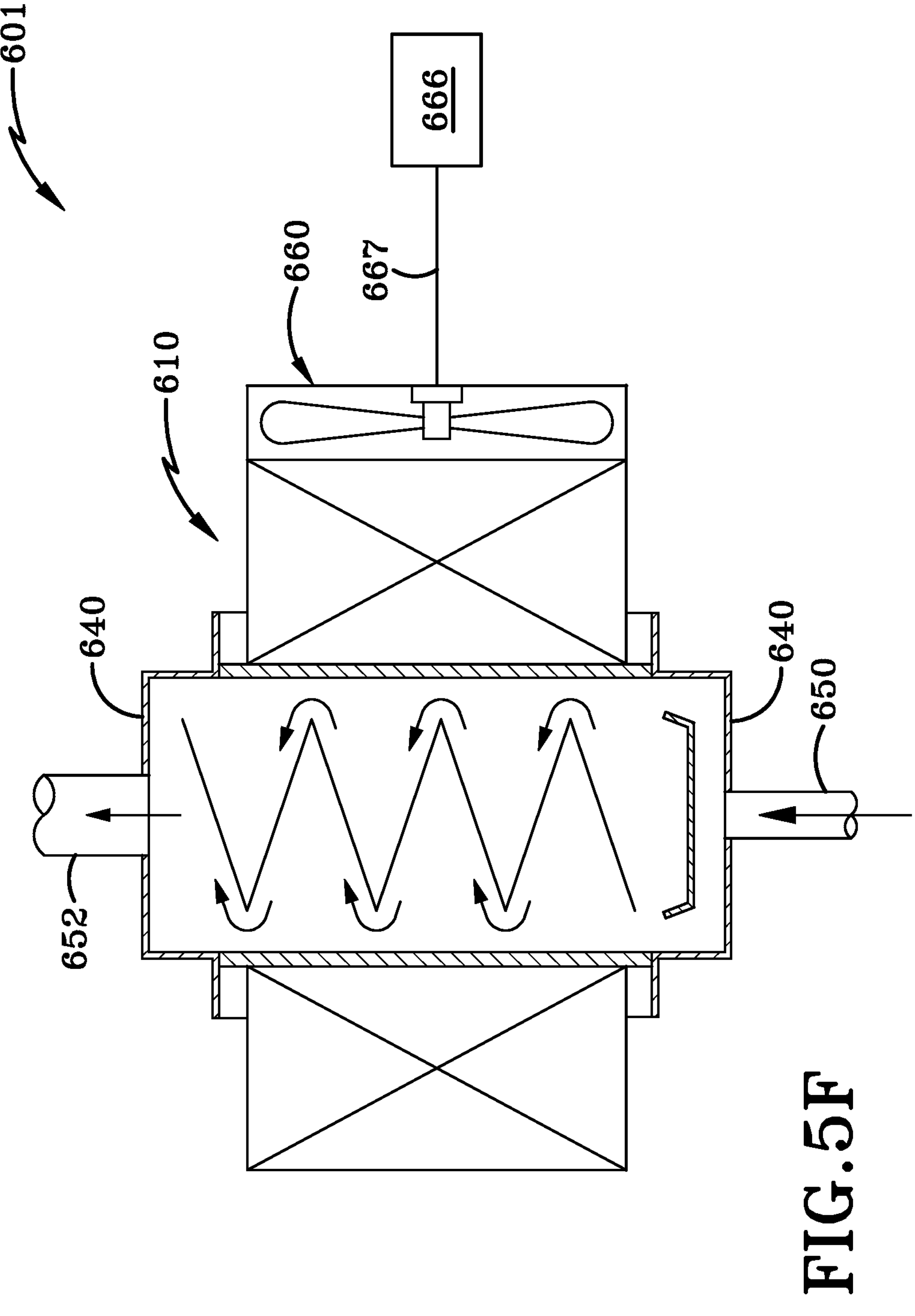
FIG. 5F is a diagrammatic sectional view of an alternative SDA of another fluid cleaning system.

FIG. 5F illustrates another fluid treatment system 601 having at least one SDA 610. The SDA 610 is substantially similar to the SDAs 10, 210, 310, 410, 510 of the fluid treatment systems 1, 201, 301, 401, 501 described above and illustrated in FIGS. 1A-1B, 2, 3, and 5A-5E expect as detailed hereinafter. The SDA 610 includes at least one flange 640, at least one inlet connection 650 operably engaged with the at least one flange 640, at least one outlet connection 652 operably engaged with the at least one flange 640, and a transducer 660 operably engaged with the at least one flange 640 about said at least one flange 640. It should be understood that FIG. 5F is diagrammatic only for the SDA 610 and does not illustrate exact and precise dimensions of any component or assembly of the SDA 610 provided herein. Such diagrammatic illustrations of the SDA 610 shown in FIG. 5F should not limit the exact positioning, orientation, or location of the SDA 610.

In the illustrated embodiment, the SDA 610 includes two flanges 640 operably engaged with the transducer 650 as compared to the insert 40, 240, 340, 440, 540 being operably engaged with the housing 20, 220, 320, 420, 520 and being separate from the transducer 60, 260, 360, 460, 560 as presented in SDAs 10, 210, 310, 410, 510 described and illustrated herein. As such, the flange 640 is directly abutting a circumferential interior wall of the transducer 660 to maximize space between the flanges 640 and the transducer 660. Additional sealing members, such as first and second couples 554A, 554B or other suitable sealing members, may be used for sealing a continuous fluid stream "LS" inside of the flanges 640.

Such configuration between the flanges 640 and the transducer 660 of SDA 610 is considered advantageous at least because this configuration provides a smaller form factor as compared to the other SDAs 10, 210, 310, 410, 510 described and illustrated herein. This small form factor of SDA 610 may be used in tight or small fluid source spaces where the SDA 610 would perform dissociated processes on a smaller volume of fluid stream passing through the SDA 610.

In one exemplary embodiment, an insert of an SDA may have a greater length than the inserts described and illustrated herein, such as inserts 40, 240, 340, 440, 540, 640 of SDAs 10, 210, 310, 410, 510, 610, to prolong dwell time of a continuous fluid stream flowing through the insert. Such additional dwell time allows for the continuous fluid stream to experience a greater time of cavitation inside of the insert for dissociating substances and solids provided in said continuous fluid stream. Additionally, this insert of this exemplary SDA may define any suitable shape to prolong dwell time of a continuous fluid stream flowing through the insert. Examples of suitable shapes and/or configurations for this insert may include coil-shaped, helical-shaped, serpentine-shaped, spiral-shaped, zig-zag-shaped, and any other suitable shapes and/or configurations to prolong dwell time of a continuous fluid stream flowing through the insert.

Figure 6:
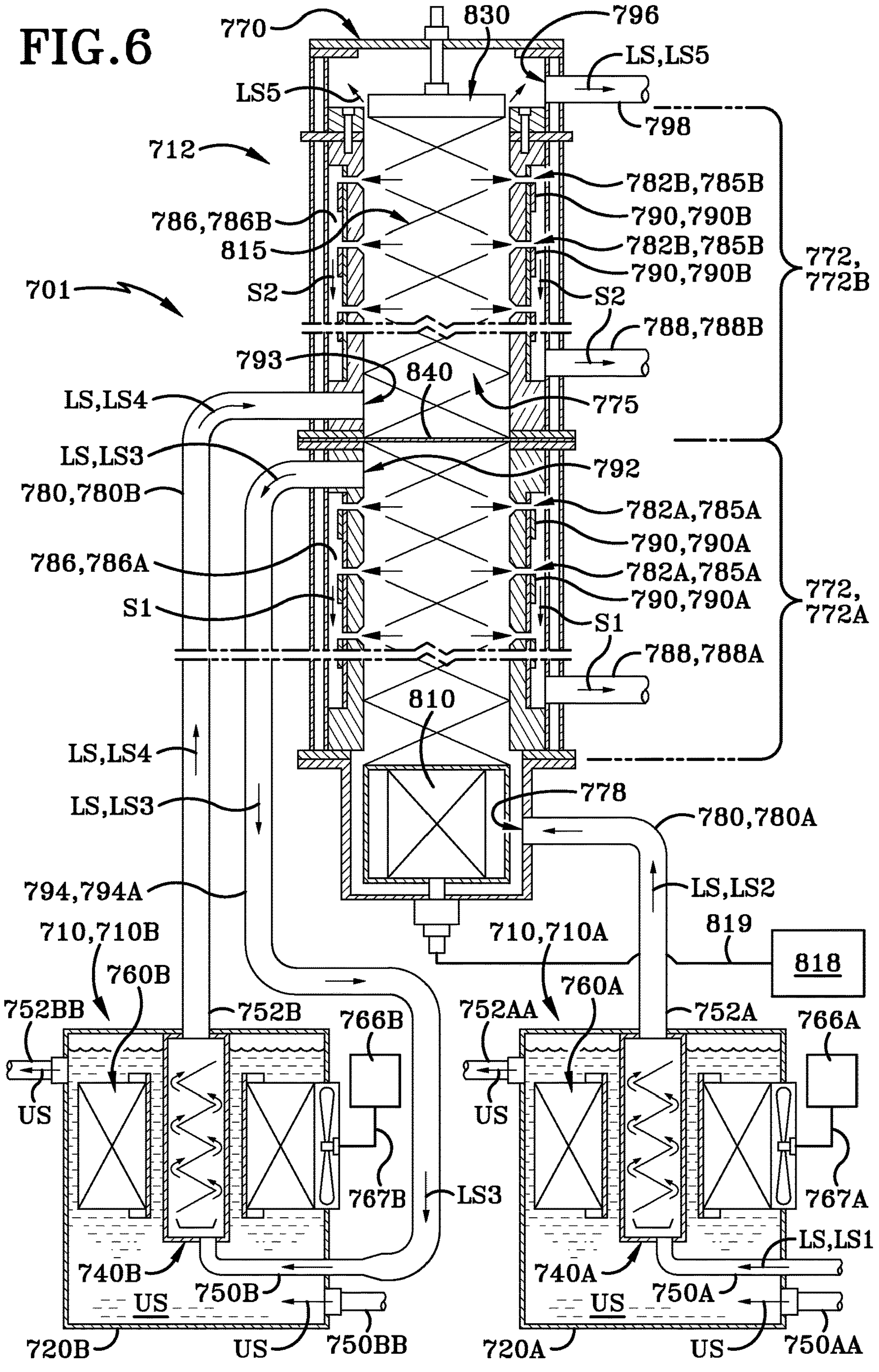
FIG. 6 is a diagrammatic sectional view of another fluid cleaning system having first and second SDAs operably engaged with a SSA.

FIG. 6 illustrates another fluid treatment system 701 having a first SDA 710A and a second SDA 710B operably engaged with at least one SSA 712. The first and second SDA 710A, 710B are substantially similar to the SDA 10 of the fluid treatment system 1 described above and illustrated in FIGS. 1A-1B, 2, 3, and 4A-4B, expect as detailed hereinafter. The SSA 712 is also substantially similar to the SSA 12 of the fluid treatment system 1 described above and illustrated in FIGS. 1A-1B, 2, 3, and 4A-4B, expect as detailed hereinafter.

It should be understood that FIG. 6 is diagrammatic only for the fluid treatment system 701 and do not illustrate exact and precise dimensions of any component, assembly, or apparatus provided herein. Such diagrammatic illustrations of the at least one SDA 710 and the at least one SSA 712 of the fluid treatment system 701 shown in FIG. 6 should not limit the exact positioning, orientation, or location of the at least one SDA 710 and the at least one SSA 712 relative to one another.

As illustrated in FIG. 6, the first SDA 710A includes a housing 720A, an insert 740A operably engaged with the housing 720A inside said housing 720A, a first inlet connection 750A operably engaged with the housing 720A and the insert 740A where the first inlet connection 750A directs a continuous fluid stream "LS" into the insert 740A, a second inlet connection 750AA operably engaged with the housing 720A where the second inlet connection 750AA directs a continuous sonic optimization fluid stream "US" into the housing 720A, a first outlet connection 752A operably engaged with the housing 720A and the insert 740A where the first outlet connection 752A directs the fluid stream "LS" out from the insert 740A, a second outlet connection 752AA operably engaged with the housing 720A where the second outlet connection 752AA directs the continuous sonic optimization fluid stream "US" from the housing 720A, and a transducer 760A operably engaged with the housing 720A inside said housing 720A and disposed about the insert 740A.

Similarly, the second SDA 710B includes a housing 720B, an insert 740B operably engaged with the housing 720B inside said housing 720B, a first inlet connection 750B operably engaged with the housing 720B and the insert 740B where the first inlet connection 750B directs a continuous fluid stream "LS" into the insert 740B, a second inlet connection 750BB operably engaged with the housing 720B where the second inlet connection 750BB directs a continuous sonic optimization fluid stream "US" into the housing 720B, a first outlet connection 752B operably engaged with the housing 720B and the insert 740B where the first outlet connection 752B directs the fluid stream "LS" out from the insert 740B, a second outlet connection 752BB operably engaged with the housing 720B where the second outlet connection 752BB directs the continuous sonic optimization fluid stream "US" from the housing 720B, and a transducer 760B operably engaged with the housing 720B inside said housing 720B and disposed about the insert 740B.

Still referring to FIG. 6, the SSA 712 includes a tower 770 having at least a first stage 772A and a second stage 772B. In the first stage 772A of the tower 770, a first fluid stream inlet 778 is defined in the tower 770 for providing fluid access into the tower 770, specifically into a chamber 775 defined by the tower 770. Additionally, a first inlet connection 780A operably engages with the first SDA 710A and the SSA 712 to provide fluid communication between said first SDA 710A and said SSA 712. In the illustrated embodiment, the first inlet connection 780A and the at least one outlet connection 752A are separate connections that are operably engaged with one another. In one exemplary embodiment, a first inlet connection of a tower and at least one outlet connection of a first SDA are a single, unitary member providing fluid communication between the tower and the first SDA.

Still referring to FIG. 6, the first stage 772A of the tower 770 defines a first set of ports 782A substantially similar to the first set of ports 82A defined in the first stage 72A of the tower 70 in the fluid cleaning system 1 described above. Additionally, the first stage 772A of the tower 770 also defines a first set of passageways 785A between the first set of ports 782A and a first effluent outlet 786A defined in the first stage 772A of the tower 770. Such configuration between the first set of ports 782A, the first set of passageways 785A, and the first effluent outlet 786A is substantially similar to the configuration between the first set of ports 82A, the first set of passageways 85A, and the first effluent outlet 86A of the first stage 72A of the tower 70 in the fluid cleaning system 1 described above. A first effluent outlet connection 788A may be also be operably engaged with the tower 770 to provide fluid communication between the first effluent outlet 786A and an output device or facility for delivering dissociated solids and effluent fluids. Moreover, a first set of shutters 790A may be operably engaged with the first stage 772A of the tower to control the flow rate of the fluid stream "LS" flowing through the first stage 772A of the tower 770; the first set of shutters 790A are substantially similar to the first set of shutters 90A of the first stage 72A of the tower 70 in the fluid cleaning system 1 described above.

Referring to FIG. 6, the tower 770 also defines a first stream outlet 792 that provides fluid communication to the first stage 772A. The first stream outlet 792 also allows a first transfer connection 794A to operably engage with the tower 770 to transfer fluid from the first stage 772A of the tower 770 to the second SDA 710B. Such transferring of fluid from the first stage 772A of the tower 770 to the second SDA 710B is described in more detail below.

Similarly, a second fluid stream inlet 793 is defined in the tower 770 for providing fluid access into the tower 770. Additionally, a second inlet connection 780B operably engages with the second SDA 710B and the SSA 712 to provide fluid communication between said second SDA 710B and said SSA 712. Additionally, the second stage 772B of the tower 770 defines a second set of ports 782B substantially similar to the second set of ports 82B defined in the second stage 72B of the tower 70 in the fluid cleaning system 1 described above. Additionally, the second stage 772B of the tower 770 also defines a second set of passageways 785B between the second set of ports 782B and a second effluent outlet 786B defined in the second stage 772B of the tower 770. Such configuration between the second set of ports 782B, the second set of passageways 785B, and the second effluent outlet 786B is substantially similar to the configuration between the second set of ports 82B, the second set of passageways 85B, and the second effluent outlet 86B of the second stage 72B of the tower 70 in the fluid cleaning system 1 described above. A second effluent outlet connection 788B may be also be operably engaged with the tower 770 to provide fluid communication between the second effluent outlet 786B and an output device for delivering dissociated solids and effluent fluids. Moreover, a second set of shutters 790B may be operably engaged with the second stage 772B of the tower to control the flow rate of the fluid stream "LS" flowing through the second stage 772B of the tower 770; the second set of shutters 790B are substantially similar to the second set of shutters 90B of the second stage 72B of the tower 70 in the fluid cleaning system 1 described above.

Moreover, the SSA 712 also includes an adjustable transducer 810, an adjustable reflector 830, and an adjustable diaphragm 840 for fine tuning and precisely adjusting the standing sonic wave 816 inside of the tower 770. The adjustable transducer 810, adjustable reflector 830, and adjustable diaphragm 840 are substantially similar to the adjustable transducer 110, adjustable reflector 130, and adjustable diaphragm 140 of the SSA 12 in the fluid cleaning apparatus 1 described above.

Having now described the components and assemblies of the fluid cleaning system 701, the method of use is described in more detail below. The method of using the fluid cleaning system 701 is substantially similar to the method of using the fluid cleaning system 1 described above, except as detailed below.

Similar to fluid cleaning system 1, a continuous fluid stream "LS" in a first state, which is generally referred to as "LS1" via arrows in FIG. 6, is pumped into the first SDA 710A, via the first inlet connection 750A, to provide continuous dissociation and disintegration of complex substances and solids found in the fluid steam "LS1". Once the complex substances and solids provided in the fluid stream "LS" are dissociated by the first SDA 710A, the continuous fluid stream "LS" of the first state "LS1" transitions to a continuous fluid stream of a second state, which is generally referred to as "LS2" via arrows in FIG. 6, containing dissociated substances and solids. Such dissociation of the complex substances and solids occurs via the operation of the transducer 760A is substantially similar to the operations performed by the transducer 60 described above.

Still referring to FIG. 6, the continuous fluid stream "LS2" is then pumped into the first stage 772A of the tower 770 via the first fluid steam inlet connection 780A. Once inside of the first stage 772A of the tower 770, a first plurality of dissociated solids "S1" is separated from the continuous fluid stream "LS2" through the first set of ports 782A, the first set of passageways 785A, and the first effluent outlet 786A. The first plurality of dissociated solids "S1" is denoted by arrows labeled "S1" in FIG. 6. Once the first plurality of dissociated solids "S1" is separated, the continuous fluid stream of the second state "LS2" transitions to a continuous fluid stream of a third state, which is generally referred to as "LS3" via arrows in FIG. 6.

Still referring to FIG. 6, the continuous fluid stream "LS3" is then pumped from the first stage 772A of the tower 770 and into the second SDA 7106 via the first transfer connection 794A; the first transfer connection 794A provides fluid communication between the first stage 772A of the tower 770 and the second SDA 710B. Similar to the first SDA 710A, the second SDA 710B provides an additional continuous dissociation and disintegration of complex substances and solids that may still be provided in the continuous fluid steam "LS3". Once the complex substances and solids provided in the continuous fluid stream "LS3" are dissociated by the second SDA 710B, the continuous fluid stream of the third state "LS3" transitions to a continuous fluid stream of a fourth state, which is generally referred to as "LS4" via arrows in FIG. 6, containing dissociated substances and solids. Such dissociation of the complex substances and solids occurs via the operation of the transducer 760B is substantially similar to the operations performed by the transducer 60 described above.

As such, this configuration of the fluid cleaning system 701 allows a continuous fluid stream to experience two operations of dissociation and disintegration in a single pass through the fluid cleaning system 701 via the use of the first and second SDAs 710A, 710B. With this configuration, any complex substances that may have remained associated or integrated during the first dissociation and disintegration operation and/or remained with the continuous fluid stream during the separation operation may now be fully dissociated and disintegrated before entering the second stage 772B of the tower 770.

Still referring to FIG. 6, the continuous fluid stream "LS4" is then pumped into the second stage 772B of the tower 770 via the second inlet connection 780B; the second inlet connection 780B provides fluid communication between the second SDA 710B and the second stage 772B of the tower 770. Once inside of the second stage 772B of the tower 770, a second plurality of dissociated solids "S2" is separated from the continuous fluid stream "LS4" through the second set of ports 782B, the second set of passageways 785B, and the first effluent outlet 786A. The second plurality of dissociated solids is denoted by arrows labeled "S2" in FIG. 6. Once the second plurality of dissociated solids "S2" is separated, the continuous fluid stream of the fourth state "LS4" transitions to a continuous fluid stream of a fifth state, which is generally referred to as "LS5" via arrows in FIG. 6. The continuous fluid stream "LS5" is then pumped from the second stage 772B of the tower 770 to a clean fluid container or vessel via at least one cleaned fluid outlet 796 defined in the tower 770 and at least one cleaned fluid outlet connection 798 operably engaged with the tower 770 and the clean fluid container or vessel.

While first and second SDAs 710A, 710B are used with a single SSA 712 described above, any suitable number of SDAs may be used with any suitable number of SSAs for dissociating complex substances and separating these dissociated complex substances to produce clean fluid. Additionally, while the first and second SDAs 710A, 710B of the fluid cleaning system 701 were similar to the SDA 10 of the fluid cleaning system 1 described above, any suitable SDA described and illustrated herein may be used such as SDA 10, SDA 210, SDA 310, SDA 410, SDA 510, and SDA 610.

Figure 7:
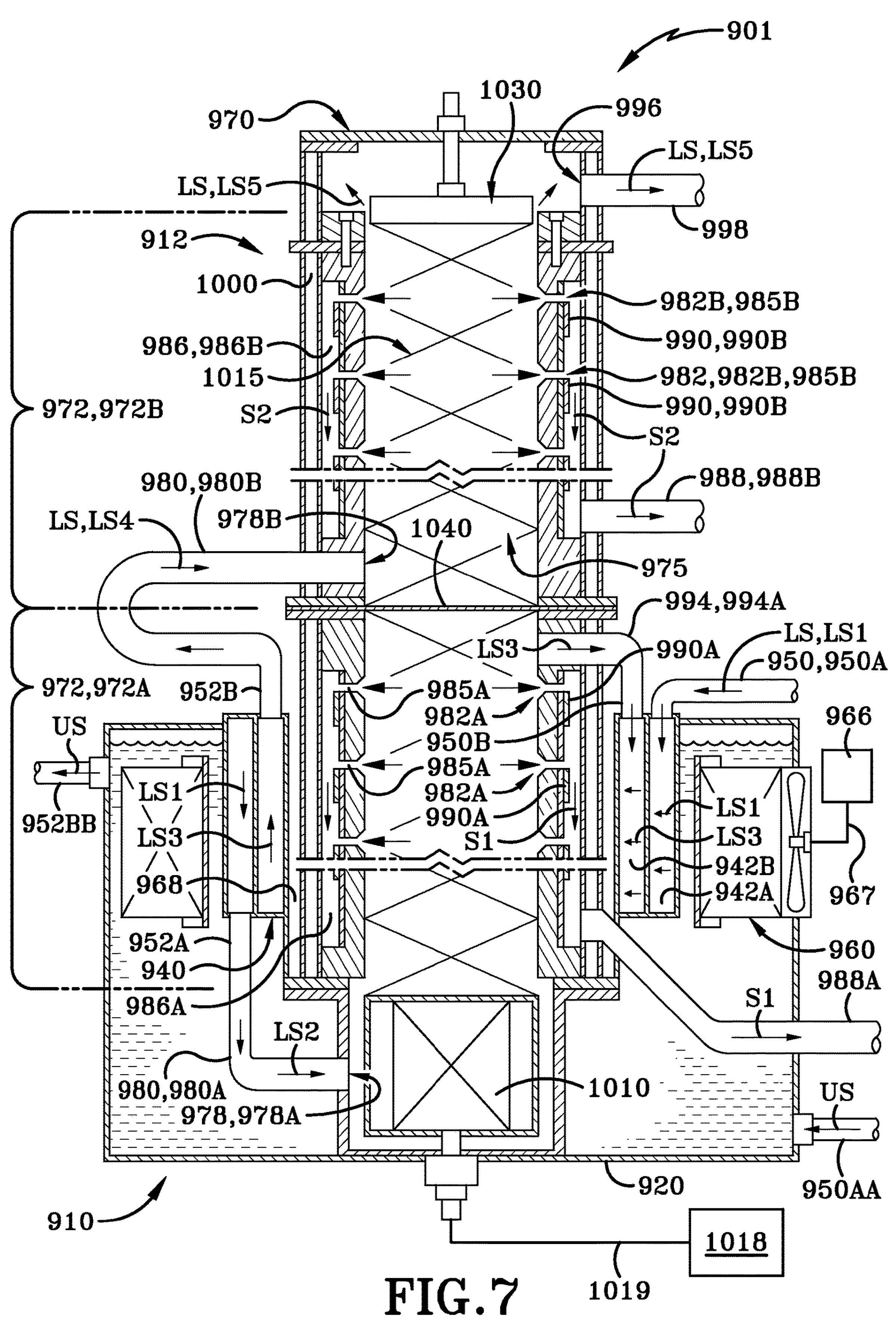
FIG. 7 is a diagrammatic sectional view of another fluid cleaning system having a SDA operably engaged with a SSA, wherein a portion of the SSA is provided inside of the SDA.

FIG. 7 illustrates another fluid treatment system 901 having at least one SDA 910 and operably engaged with at least one SSA 912. The at least one SDA 910 is substantially similar to the SDA 510 of the fluid treatment system 501 described above and illustrated in FIGS. 5D-5E, expect as detailed hereinafter. The SSA 912 is also substantially similar to the SSA 12 of the fluid treatment system 1 described above and illustrated in FIGS. 1A-1B, 2, 3, and 4A-4B, expect as detailed hereinafter.

It should be understood that FIG. 7 is diagrammatic only for the fluid treatment system 901 and do not illustrate exact and precise dimensions of any component, assembly, or apparatus provided herein. Such diagrammatic illustrations of the at least one SDA 910 and the at least one SSA 912 of the fluid treatment system 901 shown in FIG. 7 should not limit the exact positioning, orientation, or location of the at least one SDA 910 and the at least one SSA 912 relative to one another.

As illustrated in FIG. 7, a single SDA 910 is used in the fluid treatment system 901. The SDA 910 includes a housing 920, an insert 940 operably engaged with the housing 920 inside said housing 920. As shown in FIG. 7, the insert 940 has a first or outer fluid passage 942A and a second or inner fluid passage 942B substantially similar to the insert 540 that has outer and inner fluid passages 542A, 542B in SDA 510. Additionally, first and second flow directors (not illustrated) are provided inside the outer and inner fluid passages 942A, 942B to direct the continuous fluid stream “LS” from the insert 940 and into the tower 970 of the SSA 912. The SDA 910 also includes a first inlet connection 950A and a first outlet connection 952A operably engaged with the inlet 940 where the first inlet connection 950A and the first outlet connection 952A are in fluid communication with the outer fluid passage 942A. The SDA 910 also includes a second inlet connection 950B and a second outlet connection 952B operably engaged with the inlet 940 where the second inlet connection 950A and the second outlet connection 952A are in fluid communication with the inner fluid passage 942B. The SDA 910 also includes a third inlet connection 950AA and third outlet connection 952BB to provide a continuous sonic optimization fluid stream “US” through the housing 920 for cavitation operations (described previously). Additionally, the SDA 910 includes a transducer 960 to provide dissociation of complex substances and compounds provided in a continuous fluid stream “LS” traveling through the insert 940.

Still referring to FIG. 7, the SDA 910 defines an air gap 968 between the insert 940 and the SSA 912. The air gap 968 between the SDA 910 and the SSA 912 isolates the traveling sonic wave (not illustrated) transmitted by the transducer 960 of the SDA 910 from the any sonic wave transmitted by a device in the SSA 912 during operation of the fluid treatment system 901, which is described in more detail below.

Still referring to FIG. 7, the SSA 912 includes a tower 970 having at least at one stage 972. In the illustrated embodiment, the tower 970 includes a first stage 972A and a second stage 9726. In the first stage 972A of the tower 970, at least one fluid steam inlet 978 and at least one fluid stream outlet 980 is defined in the tower 970. As illustrated in FIG. 7, a first fluid stream inlet 978A is defined in the tower 970 for providing fluid access into the tower 970, specifically into the chamber 975 defined by the tower 970. Additionally, a first inlet connection 980A operably engages with the SDA 910A and the SSA 912 to provide fluid communication between said first SDA 910A and said SSA 912. In the illustrated embodiment, the first inlet connection 980A and the first outlet connection 952A are separate connections that are operably engaged with one another. In one exemplary embodiment, a first inlet connection of a tower and at least one outlet connection of a SDA are a single, unitary member providing fluid communication between the tower and the SDA.

Still referring to FIG. 7, the first stage 972A of the tower 970 defines a first set of ports 982A substantially similar to the first set of ports 82A defined in the first stage 72A of the tower 70 in the fluid cleaning system 1 described above. Additionally, the first stage 972A of the tower 970 also defines a first set of passageways 985A between the first set of ports 982A and a first effluent outlet 986A defined in the first stage 972A of the tower 970. Such configuration between the first set of ports 982A, the first set of passageways 985A, and the first effluent outlet 986A is substantially similar to the configuration between the first set of ports 82A, the first set of passageways 85A, and the first effluent outlet 86A of the first stage 72A of the tower 70 in the fluid cleaning system 1 described above. A first effluent outlet connection 988A may be also be operably engaged with the tower 970 to provide fluid communication between the first effluent outlet 986A and an output device or facility for delivering dissociated solids and effluent fluids. Moreover, a first set of shutters 990A may be operably engaged with the first stage 972A of the tower 970 to control the flow rate of the fluid stream “LS” flowing through the first stage 972A of the tower 970; the first set of shutters 990A are substantially similar to the first set of shutters 90A of the first stage 72A of the tower 70 in the fluid cleaning system 1 described above.

Similarly, a second fluid stream inlet 978B is defined in the tower 970 for providing fluid access into the tower 970, specifically the chamber 975 defined by the tower 770. Additionally, a second inlet connection 980B operably engages with the second SDA 910B and the SSA 912 to provide fluid communication between said second SDA 910B and said SSA 912. In the illustrated embodiment, the second inlet connection 980B and the second outlet connection 952B are separate connections that are operably engaged with one another. In one exemplary embodiment, a second inlet connection of a tower and second outlet connection of a SDA are a single, unitary member providing fluid communication between the tower and the SDA.

Additionally, the second stage 972B of the tower 970 defines a second set of ports 982B substantially similar to the second set of ports 82B defined in the second stage 72B of the tower 70 in the fluid cleaning system 1 described above. Additionally, the second stage 972B of the tower 970 also defines a second set of passageways 985B between the second set of ports 982B and a second effluent outlet 986B defined in the second stage 972B of the tower 970. Such configuration between the second set of ports 982B, the second set of passageways 985B, and the second effluent outlet 986B is substantially similar to the configuration between the second set of ports 82B, the second set of passageways 85B, and the second effluent outlet 86B of the second stage 72B of the tower 70 in the fluid cleaning system 1 described above. A second effluent outlet connection 988B may be also be operably engaged with the tower 970 to provide fluid communication between the second effluent outlet 986B and an output device for delivering dissociated solids and effluent fluids. Moreover, a second set of shutters 990B may be operably engaged with the second stage 972B of the tower to control the flow rate of the fluid stream "LS" flowing through the second stage 972B of the tower 970; the second set of shutters 990B are substantially similar to the second set of shutters 90B of the second stage 72B of the tower 70 in the fluid cleaning system 1 described above.

Still referring to FIG. 7, the tower 970 of the SSA 912 also defines at least one cleaned fluid outlet 996 defined in the tower 770 for pumping the cleaned fluid stream from the tower 970. The SSA 912 also includes at least one cleaned fluid outlet connection 998 operably engaged with the tower 970 and a clean fluid container or vessel to direct the cleaned fluid stream from the tower 970.

Still referring to FIG. 7, the SSA 912 also includes at least one air space 1000 defined in the tower 970 that extends from the first stage 972A to the second stage 972B. Such use of the at least one air space 1000 is substantially similar to the at least one air space 100 of the SSA 12 in the fluid treatment system 1 where the at least one air space 1000 isolates the traveling sonic wave (not illustrated) transmitted by the transducer 960 of the SDA 910 from the standing sonic wave 1015 transmitted by the transducer 1010 of the SSA 912 during operation of the fluid treatment system 901.

Moreover, the SSA 912 also includes an adjustable transducer 1010, an adjustable reflector 1030, and an adjustable diaphragm 1040 for fine tuning and precisely adjusting the standing sonic wave 1016 inside of the tower 970. The adjustable transducer 1010, adjustable reflector 1030, and adjustable diaphragm 1040 are substantially similar to the adjustable transducer 110, adjustable reflector 130, and adjustable diaphragm 140 of the SSA 12 in the fluid cleaning apparatus 1 described above.

In the fluid treatment system 901, a portion of the SSA 912 is operably engaged inside of the SDA 910 to maximize the overall footprint of the fluid treatment system 901. In particular, a portion of the tower 970 (specifically a portion of the first stage 972A) along with the transducer 1010 of the SSA 912 is provided inside of the housing 920 of the SDA 910. While the transducer 960 of the SDA 910 surrounds the tower 970 and the transducer 1010 of the SSA 912, the at least one air space 1000 of the SSA 912 isolates the sonic waves generated by the transducer 960 of the SDA 910 from the sonic waves generated by transducer 1010 of the SSA 912 during operation of the fluid treatment system 901. This configuration is considered advantageous at least because the fluid treatment system 1 is provided in a single, integrated member as compared to the other fluid treatment systems, particularly fluid treatments 1, 701, where the SDA and the SSA in other fluid treatment systems are positioned away from one another.

Having now described the components and assemblies of the fluid cleaning system 901, the method of use is described in more detail below. The method of using the fluid cleaning system 901 is substantially similar to the method of using the fluid cleaning systems 1, 701 described above, except as detailed below.

Similar to fluid cleaning systems 1, 701, a continuous fluid stream in a first state, which is generally referred to as "LS1" via arrows in FIG. 7, is pumped into the outer fluid passage 942A of insert 940 of the SDA 910 to provide continuous dissociation and disintegration of complex substances and solids found in the continuous fluid steam "LS1". Once pumped into the outer fluid passage 942A, the continuous fluid stream "LS1" is directed inside of the outer fluid passage 942A via a first flow director (not illustrated) based on the directional arrows labeled "LS1" in FIG. 7. In the illustrated embodiment, the first flow director provides the continuous fluid stream "LS1" in a non-laminar flow state for a longer dwell time inside of the insert 940; such purpose of a longer dwell time is described above. Once the complex substances and solids found in the continuous fluid stream "LS1" are dissociated by the SDA 910, via the transducer 960, the continuous fluid stream of the first state "LS1" transitions to a continuous fluid stream of a second state, which is generally referred to as "LS2" via arrows in FIG. 7, containing dissociated substances and solids.

Still referring to FIG. 7, the continuous fluid stream "LS2" is then pumped into the first stage 972A of the tower 970 via the first outlet connection 952A and the first fluid steam inlet connection 980A. Once inside of the first stage 972A of the tower 970, a first plurality of dissociated solids is separated from the continuous fluid stream "LS2" through the first set of ports 982A, the first set of passageways 985A, and the first effluent outlet 986A. The first plurality of dissociated solids is denoted by arrows labeled "S1" in FIG. 7. Once the first plurality of dissociated solids "S1" is separated, the continuous fluid stream of the second state "LS2" transitions to a continuous fluid stream of a third state, which is generally referred to as "LS3" via arrows in FIG. 7.

Still referring to FIG. 7, the continuous fluid stream "LS3" is then pumped from the first stage 972A of the tower 970 into the second SDA 910B via the second inlet connection 950A and a first transfer connection 994A; the first transfer connection 994A provides fluid communication between the first stage 972A of the tower 970 and the inner fluid passage 942B of the SDA 910. In the illustrated embodiment, the second inlet connection 950B and the first transfer connection 994A are separate connections that are operably engaged with one another. In one exemplary embodiment, a second inlet connection of a SDA and a first transfer connection of a tower are a single, unitary member providing fluid communication between the SDA and the tower.

The SDA 910 then provides an additional continuous dissociation and disintegration of complex substances and solids found in the continuous fluid steam "LS3". The continuous fluid stream "LS3" is directed inside of the inner fluid passage 942B via a second flow director (not illustrated) based on the directional arrows labeled "LS3" in FIG. 7. Once the complex substances and solids provided in the continuous fluid stream "LS3" are further dissociated by the SDA 910, the continuous fluid stream of the third state "LS3" transitions to a continuous fluid stream of a fourth state, which is generally referred to as "LS4" via arrows in FIG. 7, containing further dissociated substances and solids. As such, this configuration of the fluid cleaning system 901 allows a continuous fluid stream to experience two operations of dissociation and disintegration in a single pass through the fluid cleaning system 901 via the use of outer and inner fluid passages 942A, 942B of a single insert 940 of the SDA 910. With this configuration, any complex substances that may have remained associated or integrated during the first dissociation and disintegration operation and/or remained with the continuous fluid stream during the separation operation may now be fully dissociated and disintegrated.

Still referring to FIG. 7, the continuous fluid stream "LS4" is then pumped into the second stage 972B of the tower 970 via the second outlet connection 952B and the second inlet connection 980B. Once inside of the second stage 972B of the tower 970, a second plurality of dissociated solids is separated from the continuous fluid stream "LS4" through the second set of ports 982B, the second set of passageways 985B, and the first effluent outlet 986A. The second plurality of dissociated solids is denoted by arrows labeled "S2" in the FIG. 7 Once the second plurality of dissociated solids "S2" is separated, the continuous fluid stream of the fourth state "LS4" transitions to a continuous fluid stream of a fifth state, which is generally referred to as "LS5" via arrows in FIG. 7. The continuous fluid stream "LS5" is then pumped from the second stage 972B of the tower 970 to a clean fluid container or vessel for use.

While a single SDA 910 was used with a single SSA 712 described above, any suitable number of SDAs may be used with any suitable number of SSAs for dissociating complex substances and separating these dissociated complex substances to produce clean fluid. Additionally, while the SDA 910 of the fluid cleaning system 901 was similar to the SDA 510 of the fluid cleaning system 501 described above, any suitable SDA described and illustrated herein may be used such as SDA 10, SDA 210, SDA 310, SDA 410, and/or SDA 610.

As provided herein, SDAs 10, 210, 310, 410, 510, 610, 710A, 710B, 910 are free from using any ancillary chemicals, membrane filtration or other additives to dissociate and disintegrate complex substances and solids provided in a continuous fluid stream. In other words, SDAs 10, 210, 310, 410, 510, 610, 710A, 710B, 910 only use sonic waves to dissociate and disintegrate complex substances and solids provided in a continuous fluid stream as compared to common operations and practices using ancillary chemicals, membrane or other additives. Additionally, SSAs 12, 712, 912 are also free from using any ancillary chemicals, membrane or other additives to remove and separate dissociated substances and solids from the continuous fluid stream. In other words, SSAs 12, 712, 912 only use sonic waves to remove and separate dissociated substances and solids from the continuous fluid stream as compared to common operations and practices using ancillary chemicals, membrane or other additives.

It should be understood that any transducer described and illustrated herein may transmit sonic and/or ultrasonic frequencies to create standing waves in a SDA described and illustrated or traveling waves in a SSA described and illustrated herein. Additionally, the transducers described and illustrated herein may transmit waves from sonic frequencies that are within or below the audible frequencies.

Moreover, it should be understood that generator output signals outputted to transducers described and illustrated herein may be at any frequencies when transmitting traveling waves into SDAs described and illustrated and when transmitting standing waves into SSAs described and illustrated herein. In one exemplary embodiment, generator output signals outputted to transducers described and illustrated herein may be at fixed frequencies at desired fixed frequencies and amplitudes when transmitting traveling waves into SDAs described and illustrated and when transmitting standing waves into SSAs described and illustrated herein. In one exemplary embodiment, generator output signals outputted to transducers described and illustrated herein may be at modulated frequencies over a desired range of frequencies and amplitudes when transmitting traveling waves into SDAs described and illustrated and when transmitting standing waves into SSAs described and illustrated herein.

Figure 8:
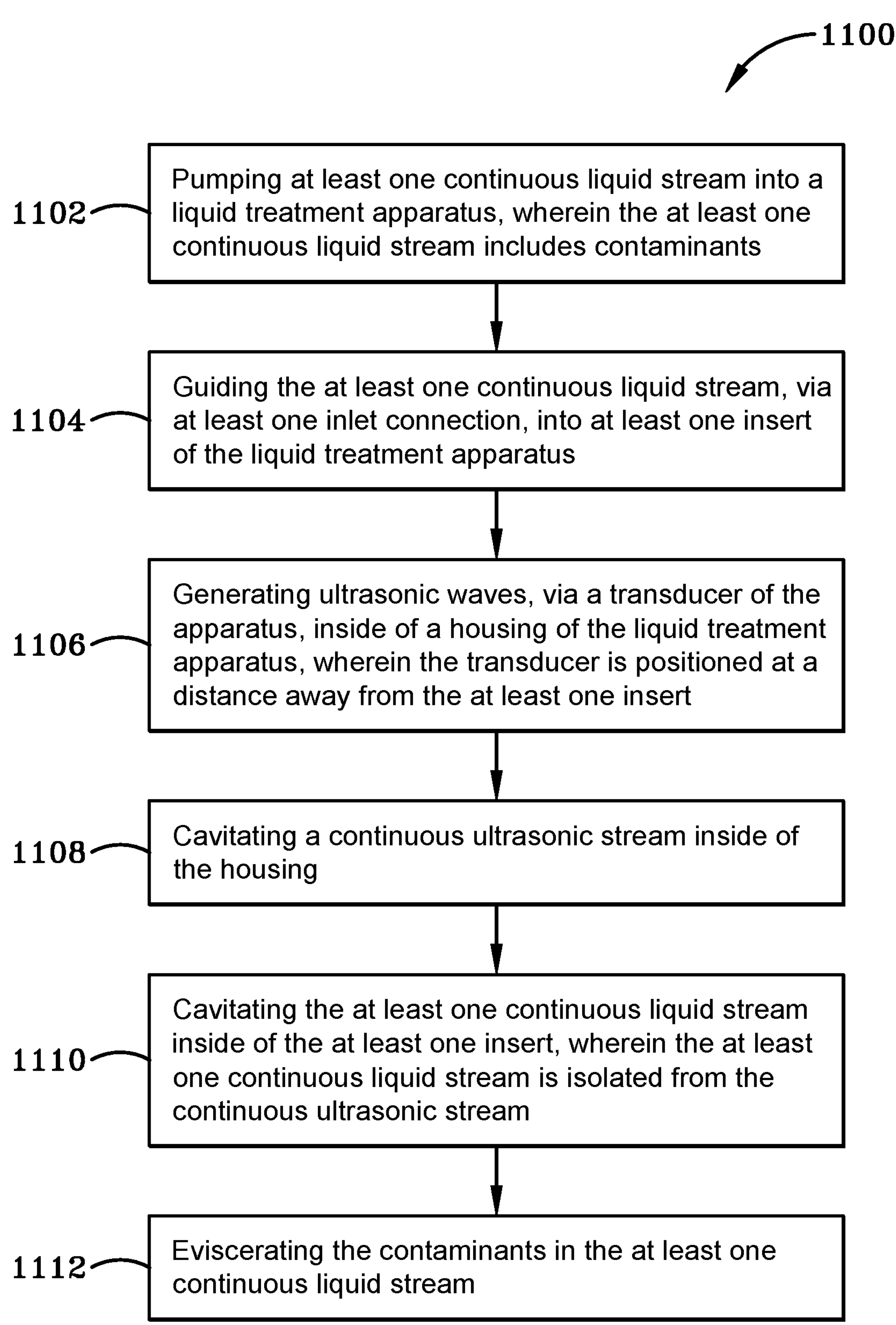
FIG. 8 is a method flowchart of eviscerating contaminants in a continuous fluid stream.

FIG. 8 illustrates a method 1100 of eviscerating contaminants in a continuous fluid stream. An initial step 1102 of method 1100 comprises pumping at least one continuous fluid stream into a fluid treatment apparatus, wherein the at least one continuous fluid stream includes contaminants. Another step 1104 comprises guiding the at least one continuous fluid stream, via at least one inlet connection, into at least one insert of the fluid treatment apparatus. Another step 1106 comprises generating sonic waves, via a transducer of the apparatus, inside of a housing of the fluid treatment apparatus, wherein the transducer is positioned at a distance away from the at least one insert. Another step 1108 comprises cavitating a continuous sonic stream inside of the housing. Another step 1110 comprises cavitating the at least one continuous fluid stream inside of the at least one insert, wherein the at least one continuous fluid stream is isolated from the continuous sonic stream. Another step 1112 comprises eviscerating the contaminants in the at least one continuous fluid stream.

In an exemplary embodiment, method 1100 may include additional steps of eviscerating contaminants in a continuous fluid stream. An optional step includes directing the at least one continuous fluid stream with eviscerated contaminants, via at least one outlet connection, to at least one output device. An optional step includes directing the at least one continuous fluid stream with eviscerated contaminants, via a second outlet connection, to a second output device. Optional steps include pumping a second continuous fluid stream into the fluid treatment apparatus, wherein the second continuous fluid stream includes one of contaminants and eviscerated contaminants; guiding the second continuous fluid stream, via a second inlet connection, into a second insert of the fluid treatment apparatus; cavitating the second continuous fluid stream inside of the at least one insert, wherein the at least one continuous fluid stream is isolated from the continuous sonic stream; eviscerating one of the contaminants and the eviscerated contaminants in the second continuous fluid stream; and directing the second fluid stream with eviscerated contaminants, via a second outlet connection, to a second output device. An optional step includes directing the at least one continuous fluid stream, via at least one director, in one of a non-laminar flow and a laminar flow.

Figure 9:
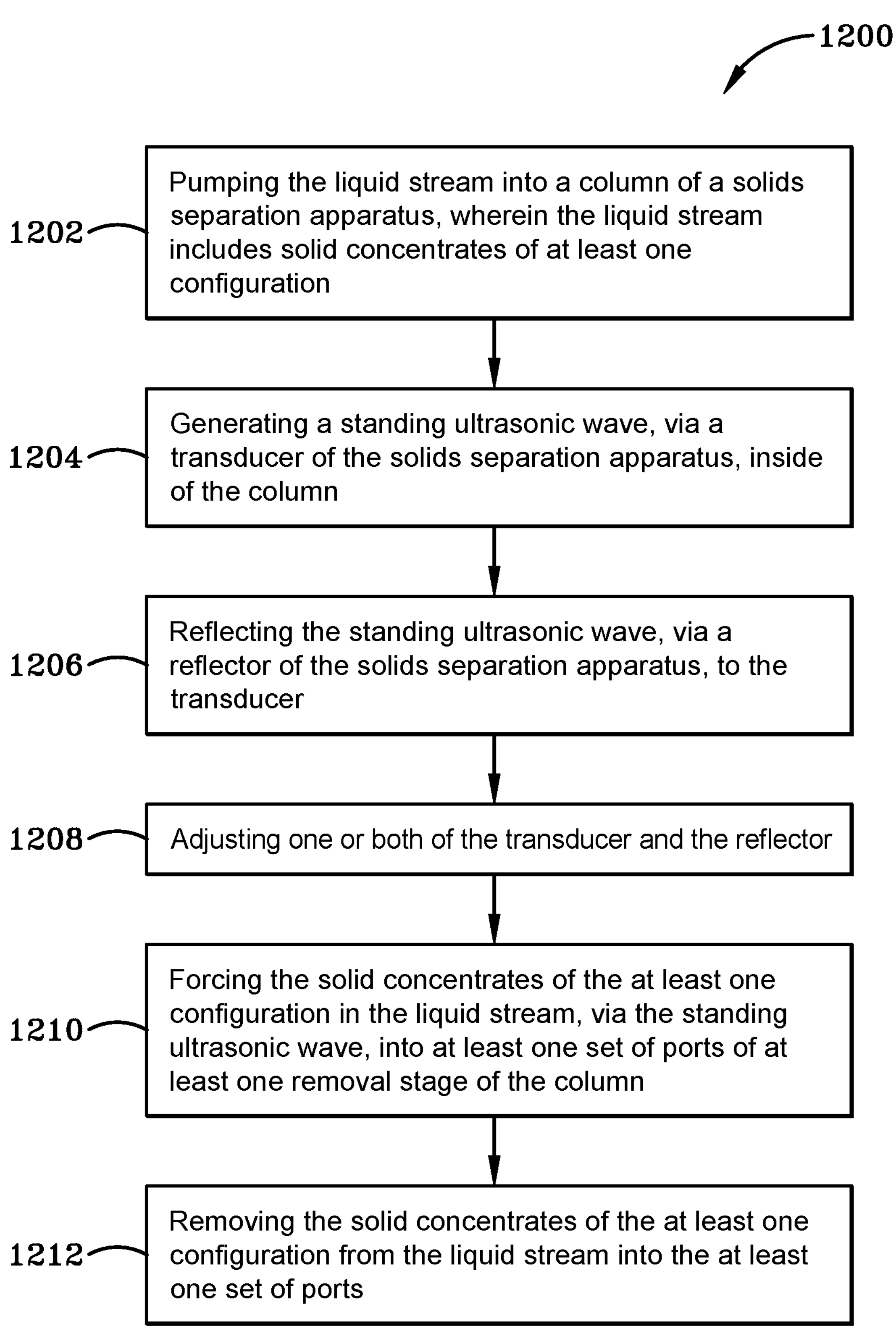
FIG. 9 is a method flowchart of removing solid concentrates from a fluid stream.

FIG. 9 illustrates a method 1200 a method of removing solid concentrates from a fluid stream. An initial step 1202 of method 1200 comprises pumping the fluid stream into a tower of a solids separation apparatus, wherein the fluid stream includes solid concentrates of at least one configuration. Another step 1204 comprises generating a standing sonic wave, via a transducer of the solids separation apparatus, inside of the tower. Another step 1206 comprises reflecting the standing sonic wave, via a reflector of the solids separation apparatus, to the transducer. Another step 1208 comprises adjusting one or both of the transducer and the reflector. Another step 1210 comprises forcing the solid concentrates of the at least one configuration in the fluid stream, via the standing sonic wave, into the at least one set of ports of at least one removal stage of the tower. Another step 1212 comprises removing the solid concentrates of the at least one configuration from the fluid stream into the at least one set of ports.

In an exemplary embodiment, method 1200 may include additional steps of removing solid concentrates from a fluid stream. An optional step comprises directing the solid concentrates of the at least one configuration, via an effluent outlet, from the tower to at least one effluent output. An optional step comprises transferring the standing sonic wave, via a diaphragm, from the at least one solids removal stage to a second solids removal stage of the tower. An optional step comprises directing the fluid stream, via at least one plumbing member, from the first solids separation stage of the tower to a second solids separation stage of the tower. An optional step comprises moving at least one set of shutters along an interior wall of the tower to control the flow rate of the fluid stream in the tower. Optional steps comprise forcing solid concentrates of a second configuration in the fluid stream, via the standing sonic wave, into a second set of ports of the second stage of the tower, wherein the solid concentrates of a second configuration are smaller than the solid concentrates of the at least one configuration; and removing the solid concentrates of the second configuration from the fluid stream into second set of ports. An optional step comprises directing the solid concentrates of the second configuration, via a second effluent outlet, from the tower to a second effluent output. An optional step comprises that wherein the step of adjusting the one or both of the transducer and the reflector further includes anti-nodes of the standing sonic wave transmitted by the transducer are aligned with at least one set of ports defined in the tower.

Figure 10:
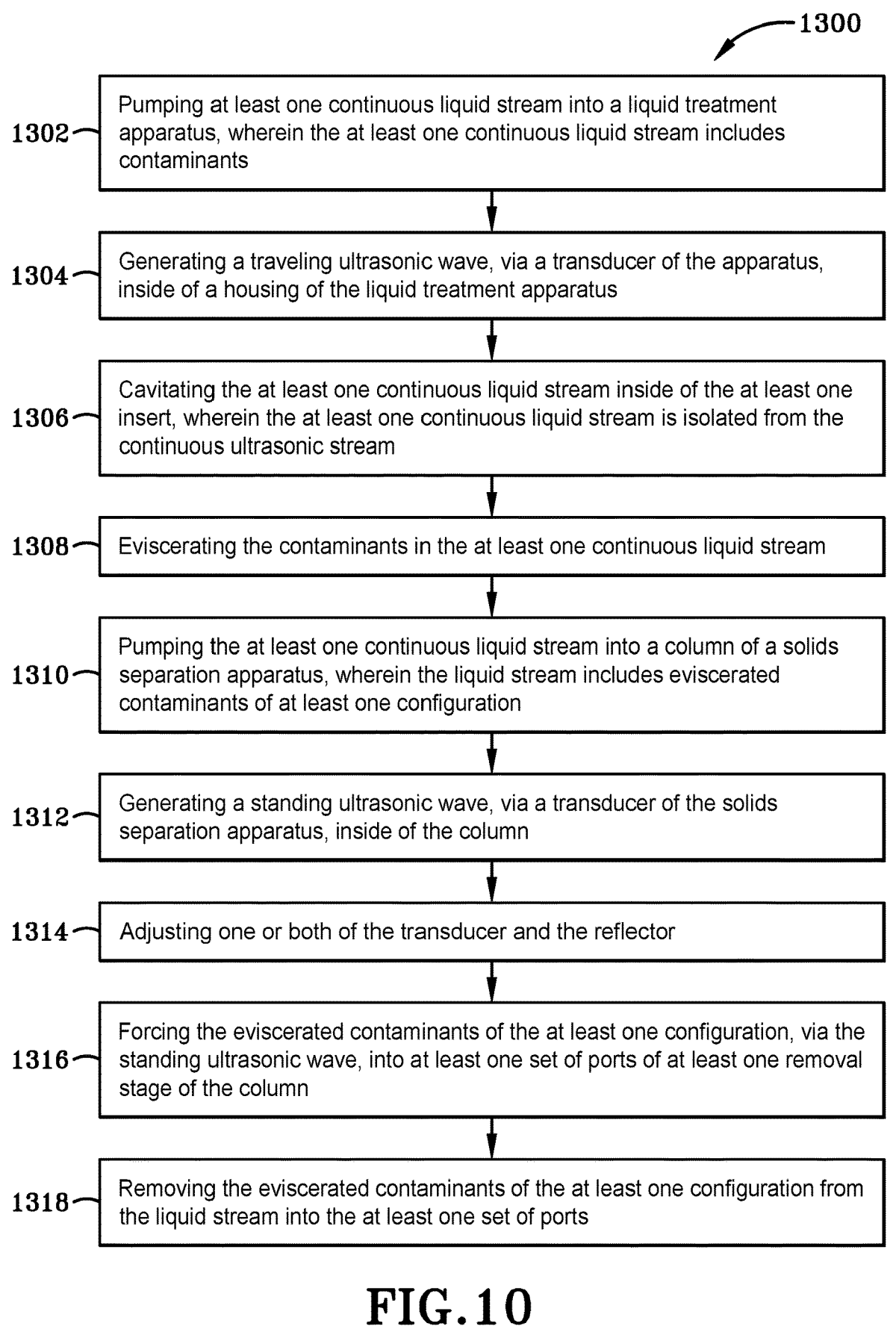

FIG. 10 illustrates a method 1300 of separating contaminants from a continuous fluid. An initial step 1302 of the method 1300 comprises pumping at least one continuous fluid stream into a fluid treatment apparatus, wherein the at least one continuous fluid stream includes contaminants. Another step 1304 comprises generating a traveling sonic wave, via a transducer of the apparatus, inside of a housing of the fluid treatment apparatus. Another step 1306 comprises cavitating the at least one continuous fluid stream inside of the at least one insert, wherein the at least one continuous fluid stream is isolated from the continuous sonic stream. Another step 1308 comprises eviscerating the contaminants in the at least one continuous fluid stream. Another step 1310 comprises pumping the at least one continuous fluid stream into a tower of a solids separation apparatus, wherein the fluid stream includes eviscerated contaminants of at least one configuration. Another step 1312 comprises generating a standing sonic wave, via a transducer of the solids separation apparatus, inside of the tower. Another step 1314 adjusting one or both of the transducer and the reflector. Another step 1316 comprises forcing the eviscerated contaminants of the at least one configuration, via the standing sonic wave, into the at least one set of ports of at least one removal stage of the tower. Another step 1318 comprises removing the eviscerated contaminants of the at least one configuration from the fluid stream into the at least one set of ports.

In an exemplary embodiment, method 1200 may include additional steps of separating contaminants from a continuous fluid. Optional steps may include pumping the at least one continuous fluid stream into a second fluid treatment apparatus; generating a second traveling sonic wave, via a second transducer of the second fluid treatment apparatus, inside of a second housing of the second fluid treatment apparatus; cavitating the at least one continuous fluid stream inside of a second insert, wherein the at least one continuous fluid stream is isolated from a second continuous sonic stream; and eviscerating the contaminants in the at least one continuous fluid stream. An optional step may include transferring the standing sonic wave, via a diaphragm, from the at least one solids removal stage to a second solids removal stage of the tower. An optional step may include directing the fluid stream, via at least one plumbing member, from the first solids separation stage of the tower to a second solids separation stage of the tower. Optional steps may include forcing eviscerated contaminants of a second configuration in the fluid stream, via the standing sonic wave, into a second set of ports of the second stage of the tower, wherein the eviscerated contaminants of a second configuration are smaller than the eviscerated contaminants of the at least one configuration; and removing the eviscerated contaminants of the second configuration from the fluid stream into second set of ports. An optional step comprises that wherein the step of adjusting the one or both of the transducer and the reflector further includes anti-nodes of the standing sonic wave transmitted by the transducer are aligned with at least one set of ports defined in the tower.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface.

Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of," "consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A solids dissociation apparatus, comprising:

a housing;

at least one insert operably engaged with the housing, wherein the at least one insert is adapted to receive a continuous fluid stream, the at least one insert further comprises:

an outer wall extending between a first wall and an opposing second wall of the at least one insert; and an inner wall extending between the first wall and the second wall of the at least one insert; wherein at least one fluid passage is defined between the outer wall and the inner wall; and wherein the at least one fluid passage is adapted to isolate cavitation of the continuous fluid stream with contaminants inside of the at least one insert remote from a transducer;

wherein the transducer is operably engaged with the housing and disposed about the at least one insert at a distance away from the at least one insert inside of the housing, wherein the transducer is configured to create cavitation inside of the housing, via sonic waves, to eviscerate the contaminants in the continuous fluid stream flowing through the at least one insert; and a pressurized chamber defined by the housing, wherein the pressurized chamber is configured to hold a continuous sonic optimization fluid to allow the transducer to generate cavitation in the continuous sonic optimization fluid.

2. A solids dissociation apparatus, comprising:

a housing;

at least one insert operably engaged with the housing, wherein the at least one insert is adapted to receive a continuous fluid stream;

a transducer operably engaged with the housing and disposed about the at least one insert relative to a longitudinal axis of said at least one insert at a distance away from the at least one insert inside of the housing, wherein the transducer is configured to create cavitation inside of the housing and circumferentially about the at least one insert, via sonic waves, to eviscerate contaminants in the continuous fluid stream flowing through the at least one insert;

a pressurized chamber defined by the housing, wherein the pressurized chamber is configured to hold a continuous sonic optimization fluid to allow the transducer to generate cavitation in the continuous sonic optimization fluid; and at least one fluid passage defined by the at least one insert, wherein the at least one fluid passage is adapted to eviscerating the contaminants in the continuous fluid stream inside of the at least one insert isolated from the pressurized chamber and remote from the transducer.

3. The solids dissociation apparatus of claim 2, wherein the distance measured between the at least one insert and the transducer is about at least one-half wavelength of a frequency of the sonic waves transmitted by said transducer.

4. The solids dissociation apparatus of claim 2, wherein the transducer further comprises:

a first end;

an opposing second end; and a passageway defined therebetween, wherein the passageway is adapted to house a portion of the at least one insert inside of the passageway, and wherein the at least one insert is free from contacting the transducer.

5. The solids dissociation apparatus of claim 4, further comprising:

a first longitudinal axis defined by the at least one insert; and a second longitudinal axis defined by the transducer; wherein the at least one insert and the transducer are coaxial with one another.

6. The solids dissociation apparatus of claim 2, further comprising:

at least one inlet connection operably engaged with the housing and the at least one insert, wherein the at least one inlet connection is adapted to allow the continuous fluid stream with contaminants to flow into the at least one insert; and at least outlet connection operably engaged with the housing and the at least one insert, wherein the at least one outlet connection is adapted to allow a continuous fluid stream with eviscerated contaminants to flow out from the at least one insert to at least one output device having a column defining a chamber to receive the continuous fluid stream having the eviscerated contaminants.

7. The solids dissociation apparatus of claim 6, further comprising:

a second inlet connection operably engaged with the housing, wherein the second inlet connection is adapted to allow the continuous sonic optimization fluid to flow into the pressurized chamber; and a second outlet connection operably engaged with the housing, wherein the second outlet connection is adapted to allow the continuous sonic optimization fluid to flow out from the pressurized chamber.

8. The solids dissociation apparatus of claim 7, further comprising:

a third outlet connection operably engaged with the housing and the at least one insert, wherein the third outlet connection is adapted to allow a continuous fluid stream with eviscerated contaminants to flow out from the at least one insert to a second output device having a column defining a chamber to receive the continuous fluid stream having the eviscerated contaminants.

9. The solids dissociation apparatus of claim 2, wherein the at least one insert is made of a flexible material to allow the sonic waves generated by the transducer to transfer into the at least one insert to create cavitation inside of the at least one insert.

10. The solids dissociation apparatus of claim 2, further comprising:

a first director operably engaged with a first wall of the at least one insert; and a second director operably engaged with an opposing second wall of the at least one insert; wherein the first director and the second director is configured to direct the continuous fluid stream with contaminants in a laminar flow inside of the at least one insert.

11. The solids dissociation apparatus of claim 2, wherein the at least one insert further comprises:

an outer wall extending between a first wall and an opposing second wall of the at least one insert; and an inner wall extending between the first wall and the second wall of the at least one insert; wherein the at least one fluid passage is defined between the outer wall and the inner wall; and wherein the at least one fluid passage is adapted to isolate cavitation of the continuous fluid stream with contaminants inside of the at least one insert remote from the transducer.

12. The solids dissociation apparatus of claim 11, further comprising:

a second fluid passage defined by the inner wall of the at least one insert, wherein the second fluid passage is adapted to isolate cavitation of a second continuous fluid stream inside of the inner wall of the at least one insert remote from the transducer and remote from the at least one fluid passage.

13. The solids dissociation apparatus of claim 12, further comprising:

a first flow director operably engaged with the at least one insert inside of the at least one fluid passage; and a second flow director operably engaged with the at least one insert inside of the second fluid passage; wherein the first flow director and the second flow director are configured to direct the continuous fluid stream and the second continuous fluid stream in a non-laminar flow inside of the at least one insert;

wherein one of the continuous fluid stream and the second continuous stream includes the contaminants and the other of the continuous fluid stream and the second continuous stream includes the eviscerated contaminants.

14. The solids dissociation apparatus of claim 2, wherein the frequency of the sonic waves generated by the transducer is between about 3 kHz up to about 200 KHZ.

15. The solids dissociation apparatus of claim 2, wherein the at least one insert is offset to a centerline axis of the housing extending between a first end of the housing and a second end of the housing.

16. The solids dissociation apparatus of claim 2, wherein the at least one insert is intersected by a centerline axis of the housing extending between a first end of the housing and a second end of the housing.

17. The solids dissociation apparatus of claim 2, wherein the pressurized chamber is one of greater than a surrounding atmospheric pressure, less than the surrounding atmospheric pressure, and substantially equal to the surrounding atmospheric pressure.

18. A solids dissociation apparatus, comprising:

a housing;

at least one insert operably engaged with the housing, wherein the at least one insert is adapted to receive a continuous fluid stream;

a transducer operably engaged with the housing and disposed about the at least one insert relative to a longitudinal axis of said at least one insert at a distance away from the at least one insert inside of the housing, wherein the transducer is configured to create cavitation inside of the housing and circumferentially about the at least one insert, via sonic waves, to eviscerate contaminants in the continuous fluid stream flowing through the at least one insert; and at least one director operably engaged with the at least one insert; wherein the at least one director is configured to direct the continuous fluid stream with contaminants in a non-laminar flow inside of the at least one insert.

19. The solids dissociation apparatus of claim 18, wherein the at least one director is positioned inside of the at least one insert.

20. The solids dissociation apparatus of claim 18, wherein the at least one director is offset to the transducer.

* * * * *